(12) United States Patent
Wang et al.

(10) Patent No.: US 12,274,351 B2
(45) Date of Patent: Apr. 15, 2025

(54) ELECTRONIC EQUIPMENT ACCESSORY

(71) Applicant: Shenzhen Lanhe Technologies Co., Ltd., Shenzhen (CN)

(72) Inventors: Lei Wang, Shenzhen (CN); Zewu Zhang, Shenzhen (CN); Jinhong Xie, Shenzhen (CN); Xunzhong Wu, Shenzhen (CN); Donglin Wang, Shenzhen (CN); Wendong Li, Shenzhen (CN); Yonggang Deng, Shenzhen (CN); Qing Han, Shenzhen (CN); Jianhua Liu, Shenzhen (CN); Zhuoting Ye, Shenzhen (CN); Yong Chen, Shenzhen (CN)

(73) Assignee: Shenzhen Lanhe Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/925,088

(22) Filed: Oct. 24, 2024

(65) Prior Publication Data

US 2025/0040688 A1    Feb. 6, 2025

Related U.S. Application Data

(63) Continuation of application No. PCT/CN2023/130316, filed on Nov. 7, 2023.

(30) Foreign Application Priority Data

Sep. 8, 2022  (CN) .......................... 202222409530.4
Nov. 23, 2022 (CN) .......................... 202223132854.4
(Continued)

(51) Int. Cl.
*A45F 5/10*   (2006.01)
*A45C 11/00*  (2006.01)
*A45F 5/00*   (2006.01)

(52) U.S. Cl.
CPC ................ *A45F 5/00* (2013.01); *A45C 11/00* (2013.01); *A45C 11/002* (2025.01);
(Continued)

(58) Field of Classification Search
CPC ................... Y10S 224/93; F16M 13/04; A45F 2200/0516; A45F 2200/0525; A45F 5/10; H04B 1/385; H04B 2001/3861
(Continued)

(56) References Cited

U.S. PATENT DOCUMENTS 9,723,910 B2 *  8/2017  Due ......................... A45F 5/00
10,581,480 B1 * 3/2020  Kim ........................ A45F 5/00
(Continued)

FOREIGN PATENT DOCUMENTS

CN      203214578 U     9/2013
CN      104468891 B     12/2017
(Continued)

OTHER PUBLICATIONS

CN-212298409-U Translation (Year: 2021).*
CN-217063804-U Translation (Year: 2022).*
CN217063804 Translation (Year: 2022).*

*Primary Examiner* — Adam J Waggenspack
(74) *Attorney, Agent, or Firm* — Andrew C. Cheng

(57) ABSTRACT

An electronic equipment accessory includes an accessory body and a holder assembly connected to the accessory body. The holder assembly includes a support member and a base. The base is rotatably connected to the accessory body. The support member is rotatable relative to the base between an extended position and a folded position. At the extended position, an included angle is formed between the support member and the base to thereby allow the accessory body to be supported on a support surface. The support member is rotatable relative to the base in one direction and (Continued)

the base is rotatable relative to the accessory body in another direction, thus the support member of the electronic equipment accessory can be adjusted with respect to the accessory body in multiple directions to thereby allow the electronic equipment accessory to support electronic equipment on a support surface at multiple different directions or tilted angles.

15 Claims, 74 Drawing Sheets

(30) Foreign Application Priority Data

| Dec. 9, 2022 | (CN) | 202223320471.X |
|---|---|---|
| Dec. 9, 2022 | (CN) | 202223329092.7 |
| Dec. 28, 2022 | (CN) | 202223518786.5 |
| Feb. 28, 2023 | (CN) | 202320423347.1 |
| Mar. 24, 2023 | (CN) | 202320672060.2 |
| May 30, 2023 | (CN) | 202321352733.2 |
| Jun. 30, 2023 | (CN) | 202321701125.8 |

(52) U.S. Cl.
CPC ....... *A45C 11/003* (2025.01); *A45F 2005/002* (2013.01); *A45F 5/1516* (2025.01); *A45F 5/1525* (2025.01)

(58) Field of Classification Search
USPC .......................................... 224/217–218, 930
See application file for complete search history.

(56) References Cited

U.S. PATENT DOCUMENTS

| 10,784,914 | B1* | 9/2020 | Kim | H04M 1/185 |
|---|---|---|---|---|
| 10,953,943 | B2* | 3/2021 | Maguire | F16M 13/02 |
| 11,342,800 | B2* | 5/2022 | Oro | H04B 5/70 |
| 11,552,667 | B2* | 1/2023 | Balderston | A45F 5/00 |
| 11,710,988 | B2* | 7/2023 | Larsson | H02J 50/005 |
| | | | | 320/108 |
| 11,784,675 | B2* | 10/2023 | Zhang | H04M 1/04 |
| | | | | 455/575.1 |
| 2018/0220782 | A1* | 8/2018 | Mody | A45F 5/00 |
| 2018/0332153 | A1* | 11/2018 | Brown | H04M 1/04 |
| 2019/0118501 | A1 | 4/2019 | Smith | |
| 2019/0208046 | A1* | 7/2019 | Gluck | H04M 1/21 |
| 2020/0336580 | A1* | 10/2020 | Lee | H04M 1/04 |

FOREIGN PATENT DOCUMENTS

| CN | 208424485 | U | | 1/2019 |
|---|---|---|---|---|
| CN | 209313892 | U | | 8/2019 |
| CN | 212298409 | U | * | 1/2021 |
| CN | 213661696 | U | | 7/2021 |
| CN | 214405451 | U | | 10/2021 |
| CN | 215378997 | U | | 12/2021 |
| CN | 215499103 | U | | 1/2022 |
| CN | 215990992 | U | | 3/2022 |
| CN | 216565231 | U | | 5/2022 |
| CN | 216844025 | U | | 6/2022 |
| CN | 216976289 | U | | 7/2022 |
| CN | 217057043 | U | | 7/2022 |
| CN | 217063804 | U | * | 7/2022 |
| CN | 217283028 | U | | 8/2022 |
| CN | 217406585 | U | | 9/2022 |
| CN | 217415650 | U | | 9/2022 |
| CN | 217590870 | U | | 10/2022 |
| CN | 217684029 | U | | 10/2022 |
| CN | 217789725 | U | | 11/2022 |
| CN | 217985135 | U | | 12/2022 |

* cited by examiner

ELECTRONIC EQUIPMENT ACCESSORY

CROSS-REFERENCE TO RELATED APPLICATIONS

This application is a continuation of International Patent Application No. PCT/CN2023/130316 filed on Nov. 7, 2023, which claims priority of China Patent Application No. 202223320471.X, filed on Dec. 9, 2022; China Patent Application No. 202320423347.1, filed on Feb. 28, 2023; China Patent Application No. 202223518786.5, filed on Dec. 28, 2022; China Patent Application No. 202223329092.7, filed on Dec. 9, 2022; China Patent Application No. 202222409530.4, filed on Sep. 8, 2022; China Patent Application No. 202321701125.8, filed on Jun. 30, 2023; China Patent Application No. 202223132854.4, filed on Nov. 23, 2022; China Patent Application No. 202320672060.2, filed on Mar. 24, 2023; and China Patent Application No. 202321352733.2, filed on May 30, 2023, the entire disclosures of which are hereby incorporated by reference.

TECHNICAL FIELD

The application relates to the technical field of portable accessories, and more particularly to a portable electronic equipment accessory.

RELATED ART

As the functionality of electronic devices becomes increasingly powerful, the range of application scenarios for the electronic devices also gradually expands. For instance, users can utilize an electronic device to view photos/videos, capture photos, record videos and so on. In order to liberate hands of the user, the electronic device is needed to be supported on a supporting surface for example a desktop. Electronic equipment accessories with supporting function such as supporting brackets are designed to hold the electronic device in place on the supporting surface. However, current electronic equipment accessories with supporting function are only capable of supporting the electronic device in a single fixed direction and fail to function when support in different directions is required, which cannot satisfy the demands of diverse placement environments.

Therefore, there is a need to provide an improved electronic equipment accessories for electronic devices.

SUMMARY OF THE INVENTION

In order to overcome at least part of the defect in the prior art, the present application provides an electronic equipment accessory, which can offer multi-directional and multi-angle support for electronic devices.

Specifically, the application provides an electronic equipment accessory, which comprises an accessory body and a holder assembly connected to the accessory body. The holder assembly comprises a support member, and a base. The base is rotatably connected to the accessory body to allow the assembled base and support member to rotate with respect to the accessory body in a first direction. The support member is rotatable relative to the base in a second direction between an extended position and a folded position.

Preferably, the first direction is at a first plane and the second direction is at a second plane perpendicular to the first plane.

In some embodiments, the base is rotatable about a first rotation axis relative to the accessory body, the support member is rotatable about a second rotation axis relative to the base, and the first rotation axis and the second rotation axis are perpendicular to each other.

In some embodiments, the accessory body is formed with an accommodation trough, and the base is received in the accommodation trough and the base is rotatable about a center of the accommodation trough, the support member being stacked on the base at the folded position, the support member forming a preset angle with respect to the base in the extended position.

In some embodiments, the electronic equipment accessory further comprises a first connecting member configured to retain the base in the accommodation trough and prevent the base escaping from the accommodation trough.

In some embodiments, the accommodation trough and the base are both of an annular form, the accommodation trough comprising an outer side wall and an inner side wall opposite to each other, the base comprising an outer joining surface and an inner joining surface that are respectively arranged adjacent to the outer side wall and the inner side wall. The first connecting member is connected to the outer side wall or the outer joining surface, or the first connecting member is connected to the inner side wall or the inner joining surface.

In some embodiments, the base is formed with a first retention groove and the accommodation trough is formed with a second retention groove, groove openings of the first retention groove and the second retention groove being arranged to face each other, the first connecting member being arranged in the first retention groove and the second retention groove.

In some embodiments, the first connecting member is a circular ring, a C-shaped ring, or rollers.

In some embodiments, the electronic equipment accessory further comprises a second connecting member configured to pivotably connected the support member and the base. The second connecting member comprises an axle about which the support member is pivotable with respect to the base; and the base provides mounting holes in which the axle is received.

In some embodiments, the base comprises a pair of blocking portions facing opposite ends of the axle respectively for limiting movement of the axle in an axis direction of the axle.

In some embodiments, the base comprises a recessed portion for accommodating the support member when the support member is located at the folded state.

In some embodiments, the second connecting member comprises a first mounting portion connected to the support member and a second mounting portion is connected to a side of the base, and the recessed portion is formed on another side of the base opposite to said side of the base.

In some embodiments, the support member has a ring shape with an outer circumferential surface, and a flatted portion is formed at a position of the outer circumferential surface corresponding to the second connecting member.

In some embodiments, a partition member is attached on a side of base opposite to the support member, the base and the partition member being made of different materials.

In some embodiments, the electronic equipment accessory further comprises a positioning structure, the positioning structure comprises a position-limiting part and a positioning part cooperating with each other, and one of the position-limiting part and the positioning part is arranged on the base, while another one of the position-limiting part and the positioning part is arranged on the accessory body.

In some embodiments, a magnetic attraction member is arranged on the support member, the support member is of a circular shape or an annular form, wherein the magnetic attraction member is of an arc shape, and the magnetic attraction member comprises a plurality of magnetic segments arranged on the support member in a circumferential direction.

In some embodiments, the second connecting member comprises a first mounting portion connected to the support member and a second mounting portion connected to the base, the first mounting portion comprises a sleeve sleeved on the axle, and the sleeve comprises an outer circumferential surface with flatted sections.

In another aspect, the application provides another electronic equipment accessory, which comprises an accessory body and an attraction-attaching assembly rotatably connected to the accessory body, the attraction-attaching assembly comprising a magnetic attraction member.

In some embodiments, the accessory body is formed with an accommodation trough, and the attraction-attaching assembly is at least partly received in the accommodation trough, and the attraction-attaching assembly is rotatable about a center of the accommodation trough.

In some embodiments, a first connecting member and/or a positioning structure is arranged between the attraction-attaching assembly and the accommodation trough.

In some embodiments, the attraction-attaching assembly comprises a support member and a base, the base is rotatably received in the accommodation trough, the support member is rotatably connected to the base, the magnetic attraction member is disposed at one of the base and the support member, and a protruding part is provided at a location of the base connected with the support member.

In some embodiments, the base and the support member are connected via a mounting portion, the protruding part and the mounting portion are respectively stacked on opposite sides of the base in a thickness direction of the base.

The above technical solution possesses one or multiple advantages as follows: the application provides an electronic equipment accessory which comprises an accessory body and a holder assembly connected to the accessory body. The holder assembly comprises a support member and a base being rotatably connected to the accessory body. The support member is rotatable relative to the base between an extended position and a folded position. At the extended position, an included angle is formed between the support member and the base, and when the electronic equipment accessory is placed on a support surface, the support member and the accessory body cooperatively support the electronic equipment accessory on the support surface. The included angle between the support member and the base is adjustable, together with a rotation connection arranged between the base and the accessory body, so that the support member can be adjusted in multiple directions with respect to the accessory body to thereby allow the electronic equipment accessory to support electronic equipment on a support surface at multiple different directions and/or tilted angles.

DESCRIPTION OF THE DRAWINGS

To more clearly describe the technical solutions of embodiments of the application, a brief description will be given to the drawings that are necessary for the illustration of the embodiments. Obviously, the drawings described below show only some of the embodiments of the application. For those having ordinary skill in the art, other drawings can be envisaged, without paying creative endeavor, from the attached drawings.

FIG. 4b is an enlarged view showing region B of FIG. 4a.

FIG. 12b is an enlarged view showing region D of FIG. 12a.

DETAILED DESCRIPTION

Figure 1:
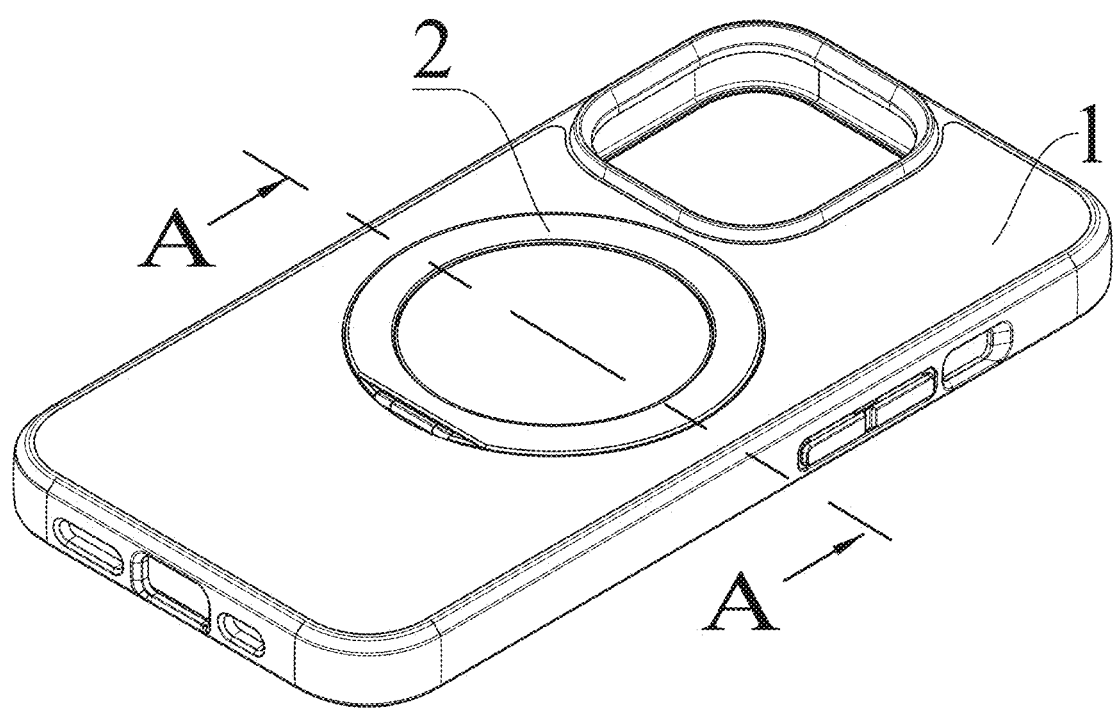
FIG. 1 is an isometric view of an electronic equipment accessory according to a first embodiment of the application in a folded position.
Figure 2:
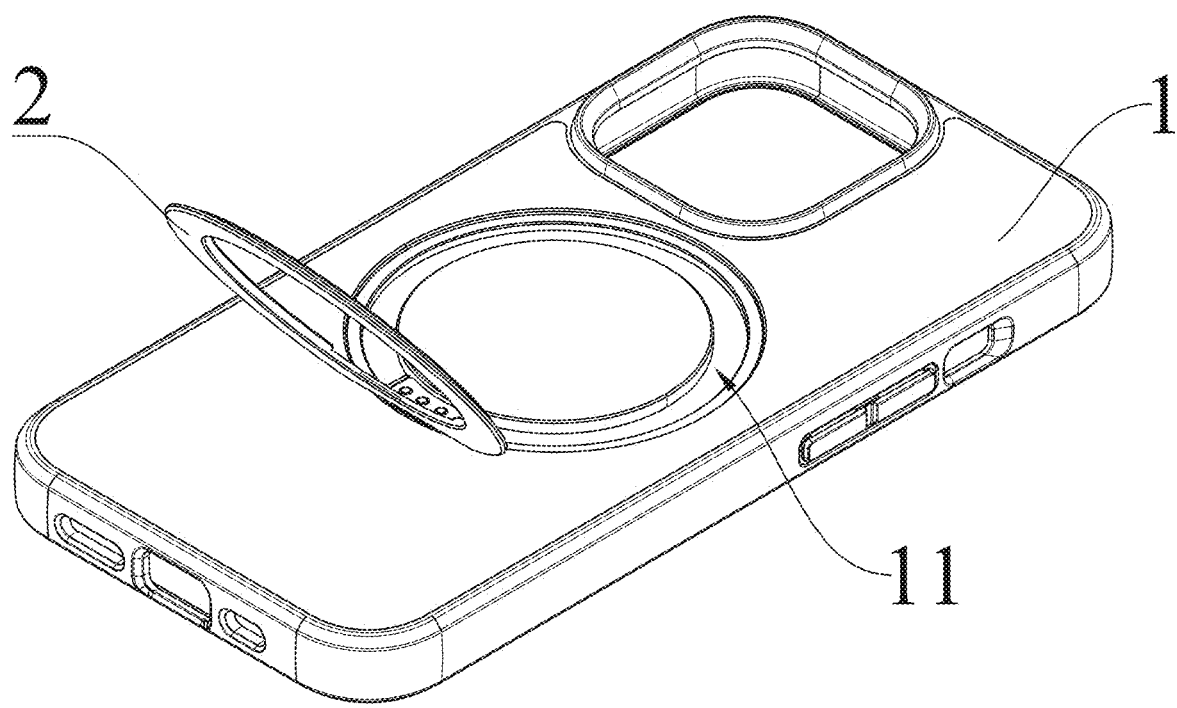
FIG. 2 shows the electronic equipment accessory illustrated in FIG. 1 at an extended position.
Figure 3:
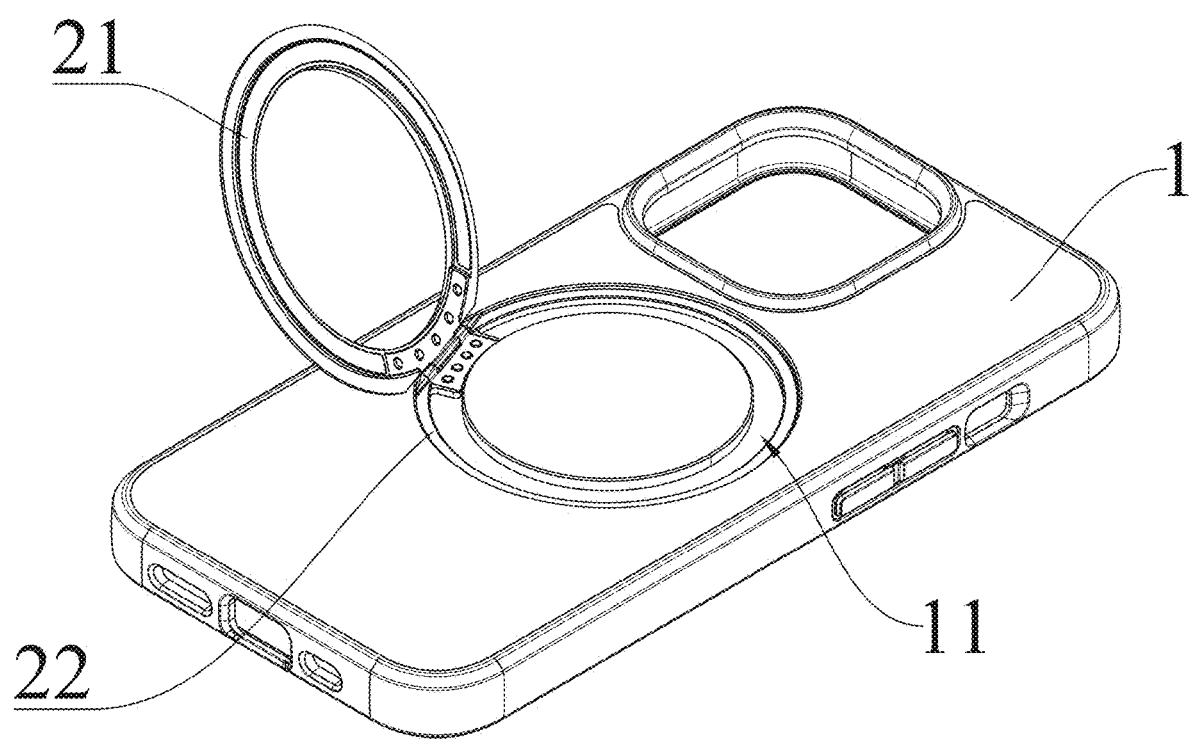
FIG. 3 shows the electronic equipment accessory of FIG. 1 in the extended position at another supporting angle.

To make the above objectives, features, and advantages of the application more apparent and easier to understand, a detailed description of the embodiments of the application is provided below, with reference to the attached drawings. In the following description, various specifics are explained for fully understanding of the application. However, the application can be implemented in various ways that are different from what described herein, and skilled artisans of the field may contemplate similar improvement without departing from the contents of the application, and thus, the application is not limited to the embodiment disclosed hereinafter.

In the description of embodiments of the application, it is appreciated that the terms, such as "center", "longitudinal", "transverse", "length", "width", "thickness", "up", "down", "front", "rear", "left", "right", "vertical", "horizontal", "top", "bottom", "inner", "outer", "clockwise", "counterclockwise", "axial", "radial", and "circumferential", as used herein for indicating directional or positional relationships are based on the directional or positional relationships illustrated in the attached drawings and are provided only for easily illustrating the embodiments of the application and simplifying the illustration, rather than implying or suggesting a device or element so indicated must possess a specific direction, or structured and operated in a specific direction, and should thus not be construed as limiting to the application.

Further, the terms "first", "second" are simplify for illustration purpose, and should not be construed as indicating or suggesting relative importance or implicitly indicating the number of the technical feature so indicated. Thus, features that carry "first" and "second" explicitly or implicitly include at least one such feature. In the description of the application, "plural" means at least two, such as two and three, unless otherwise specifically indicated.

In the application, unless otherwise specifically set and defined, the terms "mounting", "interconnecting", "connecting", and "fixing" should be interpreted in a broad way, such as fixedly connecting or detachably connecting, or integrating as one piece; and can be mechanically connecting or electrically connecting; and can be directly connecting or indirectly connecting with an intermediate medium, communicating between interiors of two elements or an interacting relationship between two elements, unless otherwise specifically indicated. For those having ordinary skill in the field, specific meaning of the above terms in the application can be interpreted according to specific conditions.

In the application, unless otherwise specifically set and defined, a first feature being "above" or "below" a second feature can be that the first and second features are in direct contact, or the first and second features are in indirect contact with an intermediate medium. Further, the first feature is located "upward of", "above" and "on" the second feature can be that the first feature is exactly above or obliquely above the second feature, or only indicating that a horizontal level of the first feature is higher than the second feature. The first feature is located "downward of", "under" and "below" the second feature can be that the first feature is exactly below or obliquely below the second feature, or only indicating that a horizontal level of the first feature is lower than the second feature.

It is noted that when an element is referred to as being "fixed to" or "arranged on" another element, it can be directly on said another element or there may be an intermediate medium present. When an element is referred to as being "connected to" another element, it can be directly connected to said another element or there may be an intermediate medium present simultaneously. Description made with terms "vertical", "horizontal", "up", "down", "left", "right" and the likes as used herein is only for illustration purpose, not to indicate an only way of implementation.

First Embodiment

Referring to FIGS. 1-5, a first embodiment of the application provides an electronic equipment accessory which is illustrated by taking an electronic equipment protection case as an example for protecting electronic equipment, such as a mobile phone, a tablet computer, a portable power supply device, and a wireless charging device. The electronic equipment accessory comprises an accessory body 1 and a holder assembly 2. The accessory body 1 has a back surface in which an accommodation trough 11 is formed. The holder assembly 2 comprises a support member 21, a base 22, and a first connecting member 4. The base 22 is received in the accommodation trough 11 and the base 22 is rotatable about a center of the accommodation trough 11. The first connecting member 4 is connected between the base 22 and the accommodation trough 11. The support member 21 is rotatable relative to the base 22 between an extended position and a folded position. At the folded position, the support member 21 is stacked on the base 22. Optionally, at the folded position, the support member 21 is partly or fully received in the accommodation trough 11, and at the extended position, the support member 21 is set at a predetermined angle with respect to the back surface of the accessory body 1, and under this condition, a user may use the support member 21 of the holder assembly 2 to support the electronic equipment on, for example, a planar surface for operation.

Specifically, the accessory body 1 is, for example, a rectangular frame protection case, which is fit over for example a back shell of a mobile phone or other portable electronic equipment to protect the electronic equipment. Alternatively, the accessory body 1 may be a shell of an electronic equipment for example a portable power supply device. Optionally, the accessory body 1 comprises an accommodating chamber formed at another side thereof opposite to the side where the support member 21 is attached. When the accessory body 1 is fit over a mobile phone or other portable electronic equipment, the mobile phone or other portable electronic equipment is accommodated in the accommodating chamber. The first connecting member 4 is arranged on an internal wall of the accommodation trough 11, and the first connecting member 4 is located between a side wall of the base 22 and the internal wall of the accommodation trough 11, so that the base 22 is mounted in the accommodation trough 11 in a manner of being rotatable relative to the center of the accommodation trough 11. Taking the embodiment illustrated as an example, the center of the accommodation trough 11 is the center position of a circular or annular form of the accommodation trough 11, which is also the position where the rotation axis about which the base 22 is rotatable is located. The support member 21 is rotatable relative to the base 22 between the extended position and the folded position. At the folded position, the support member 21 is at least partly received in the accommodation trough 11 to ease the operation or stowage of the electronic equipment by the user, and at the extended position, the support member 21 is rotated away from the accommodation trough 11 and is at a predetermined angle with respect to the back surface of the accessory body 1.

Specifically, as shown in FIGS. 4a, 4b, 5, and 6, the support member 21 and the base 22 are both made in, for example, an annular form and are both of a circular ring structure. Provided at a central axis position of the accommodation trough 11 is, for example, a raised portion. The accommodation trough 11 comprises an outer side wall 111 that is formed as extending in a thickness direction of the accessory body 1. The thickness direction refers to an up-down direction for the embodiment shown in FIG. 4b. The base 22 comprises an outer joining surface 221 that is formed as extending in the thickness direction of the accessory body 1. The first connecting member 4 is arranged to, for example circumferentially surround an outer circumferential surface of the base 22, meaning the first connecting member 4 is located between the outer side wall 111 and the outer joining surface 221. It is appreciated that the accommodation trough 11 can be arranged as a circular counter bore or a circular through hole, and the base 22 can be of a solid circular form, provided the outer circumferential surface of the base 22 (the outer joining surface 221) is rotatably connected, by means of the first connecting member 4, to a trough wall of the accommodation trough 11 (the outer side wall 111); and the support member 21 can be correspondingly made in a solid circular form. Adopting a solid circular structure for the support member 21 and the base 22 can not only increase the strength, but may also achieve an effect of enhancing aesthetics.

Figure 7:
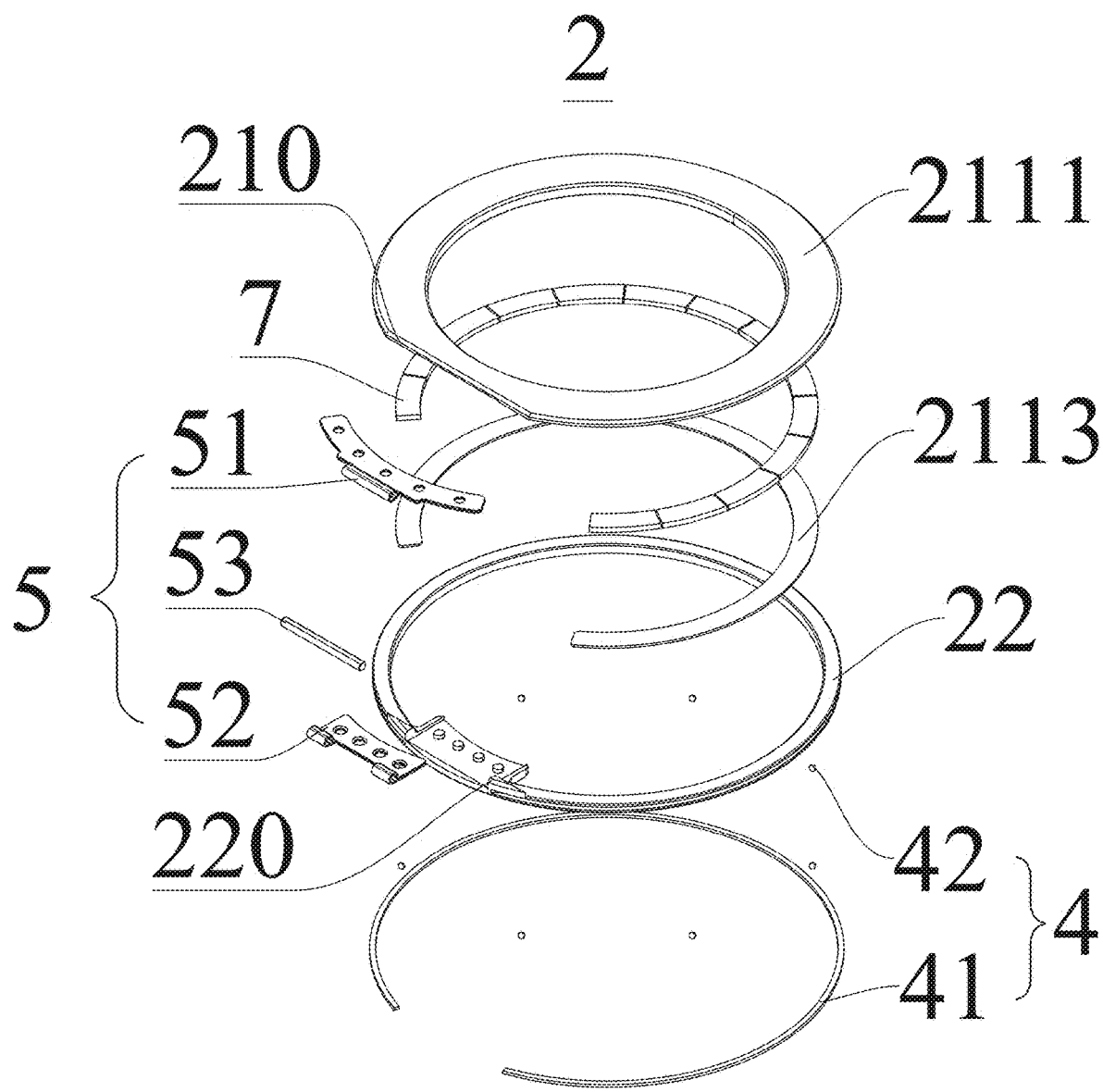
FIG. 7 is an exploded view of FIG. 6.

Further, the first connecting member 4 comprises a connecting ring 41 (as shown in FIG. 7). The connecting ring 41 is, for example, a C-shape ring made of an elastic material. The outer joining surface 221 is formed with a first retention groove 223 (FIG. 4b), and the connecting ring 41 is mounted in the first retention groove 223 and is deformable outwards due to elasticity thereof. When the connecting ring 41 is made to surround and locate in the first retention groove 223, the connecting ring 41 is caused by the elasticity thereof to extend, in a radial direction, out of the first retention groove 223. Further, the outer side wall 111 of the accommodation trough 11 is formed with a second retention groove 113, and groove openings of the first retention groove 223 and the second retention groove 113 are arranged to face each other. The connecting ring 41 is mounted in the first retention groove 223 and is deformed outwards by the elasticity thereof to fit into the second retention groove 113 so as to make the base 22, together with the support member 21, rotatable in the accommodation trough 11 relative to the accessory body 1. Further, the connecting ring 41 helps keep the base 22 in position to, for example, increase a frictional force for rotation of the base 22 in order to prevent undesired rotation thereof in the accommodation trough 11.

Figure 4A:
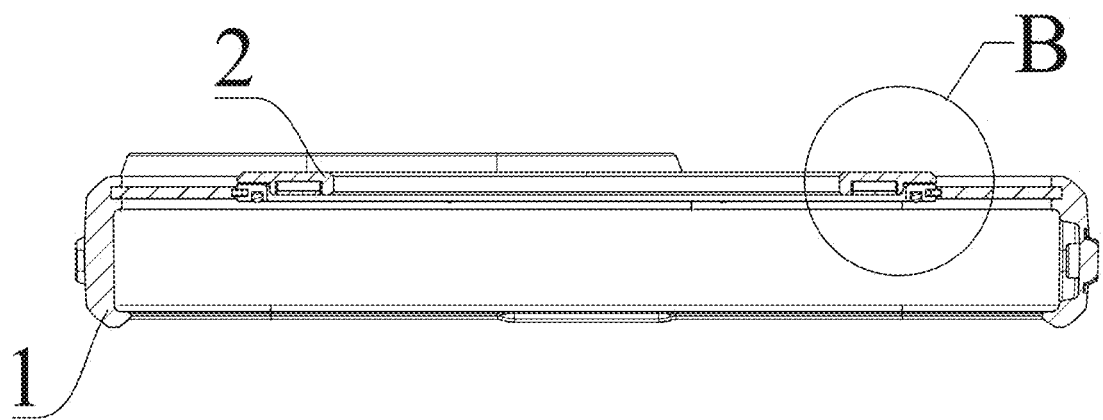
FIG. 4a is a schematic cross-sectional view of the electronic equipment accessory illustrated in FIG. 1 taken along line A-A.
Figure 4B:
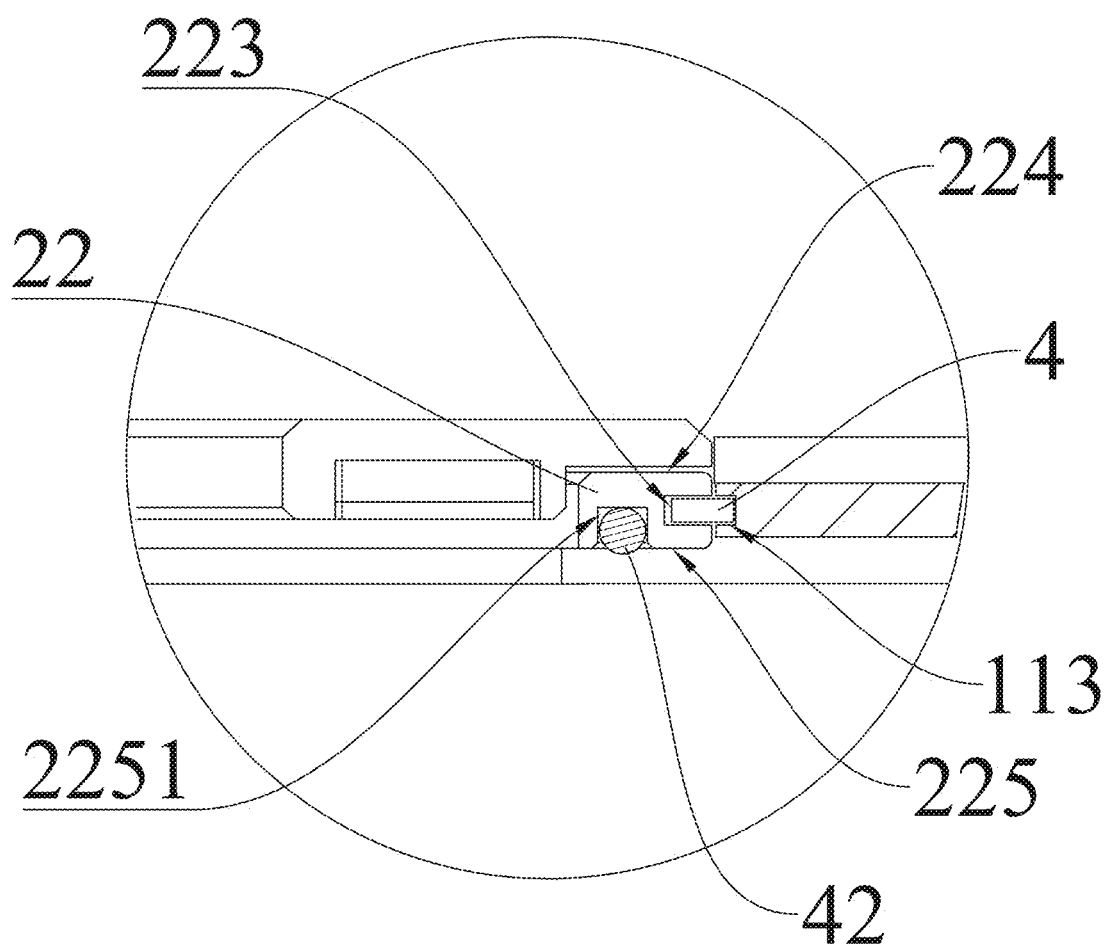

In other ways of implementation of the instant embodiment, as shown in FIG. 4b, the first connecting member 4 comprises a plurality of first rolling balls. A plurality of receiving holes is formed, at intervals, in the outer joining surface 221 (at the location of the first retention groove 223, see FIG. 4b), and the plurality of first rolling balls (at the location of the connecting ring 41, see FIG. 4b) are arranged to have a portion thereof received in the plurality of receiving holes, respectively, while another portion of the first rolling balls is located in the second retention groove 113 in order to be rolling when the base 22 is rotating relative to the accessory body 1, thereby enabling rotation of the base 22 relative to the accessory body 1. Adopting the first rolling balls may reduce a contact surface area for rotation so as to reduce the frictional resistance between the base 22 and side walls of the accommodation trough 11 during rotation, which is a preferred solution in some application scenarios where a reduced frictional resistance is desired.

In one embodiment of the application, as shown in FIG. 7, the holder assembly 2 further comprises a second connecting member 5. The second connecting member 5 comprises a first mounting portion 51, a second mounting portion 52, and a pivot axle 53. The support member 21 is fixedly connected, at one end of an outer edge thereof, to the first mounting portion 51, and the base 22 is fixedly connected, at one end of an outer edge thereof, to the second mounting portion 52, and the first mounting portion 51 and the second mounting portion 52 are made and arranged corresponding to each other. The first mounting portion 51 and the second mounting portion 52 are rotatably connected by means of the pivot axle 53 so that the support member 21 is rotatable relative to the base 22 for opening and closing to allow the support member 21 to switch between the folded position and the extended position. Further, the user may adjust a rotation angle between the first mounting portion 51 and the second mounting portion 52 so as to adjust a supporting angle of the support member 21 based on the conditions of practical uses. The base 22 comprises a pair of blocking portions 220 facing opposite ends of the pivot axle 53 respectively for limiting movement of the pivot axle in an axis direction of the pivot axle and blocking the pivot axle 53 escaping from the base 22. The support member 21 has a ring shape with an outer circumferential surface, and a flatted portion 210 is formed at a position of the outer circumferential surface corresponding to the second connecting member 5.

In one embodiment of the application, as shown in FIGS. 4a, 4b, 5, and 6, the accommodation trough 11 comprises a bottom wall 114, and the first connecting member 4 comprises partition members 42. In the illustrated embodiment, the partition members 42 are second rolling balls of which the number is plural. The plurality of second rolling balls are arranged between a base undersurface 225 of the base 22 and the bottom wall 114. Further, the base undersurface 225 is formed with a plurality of receiving holes 2251 arranged in a circumferential direction of the base 22, and the plurality of second rolling balls are respectively mounted, in a one-to-one manner, in the plurality of receiving holes 2251. The plurality of second rolling balls can be, for example, a plurality of smooth rolling balls and are rollable in the receiving holes 2251. The plurality of second rolling balls have a diameter that is greater than a depth of the plurality of receiving holes 2251, so that the second rolling balls may have a portion thereof contacting with and supported on the bottom wall 114 to allow the base 22 to rotate with respect to the accessory body 1 about the axis of the base 22 and to adjust a supporting direction of the support member 21.

In other embodiments of the application, the partition members 42 comprise one or more gaskets, and in this case, no second rolling balls are included. The gasket is fixed between the base undersurface 225 and the bottom wall 114. The gasket can be, for example, a wear-resistant material, so that when the base 22 is made contacting with and supported on for example the protection case or the electronic equipment, wearing of the base undersurface 225 resulting from friction induced by rotation can be prevented and also, friction can be increased to prevent undesired rotation of the base 22. The gasket has a shape that can be, for example, a C-shape, a circular ring shape, and a solid circular shape, and can alternatively be a number of arc segments arranged at intervals in a circumferential direction.

Figure 6:
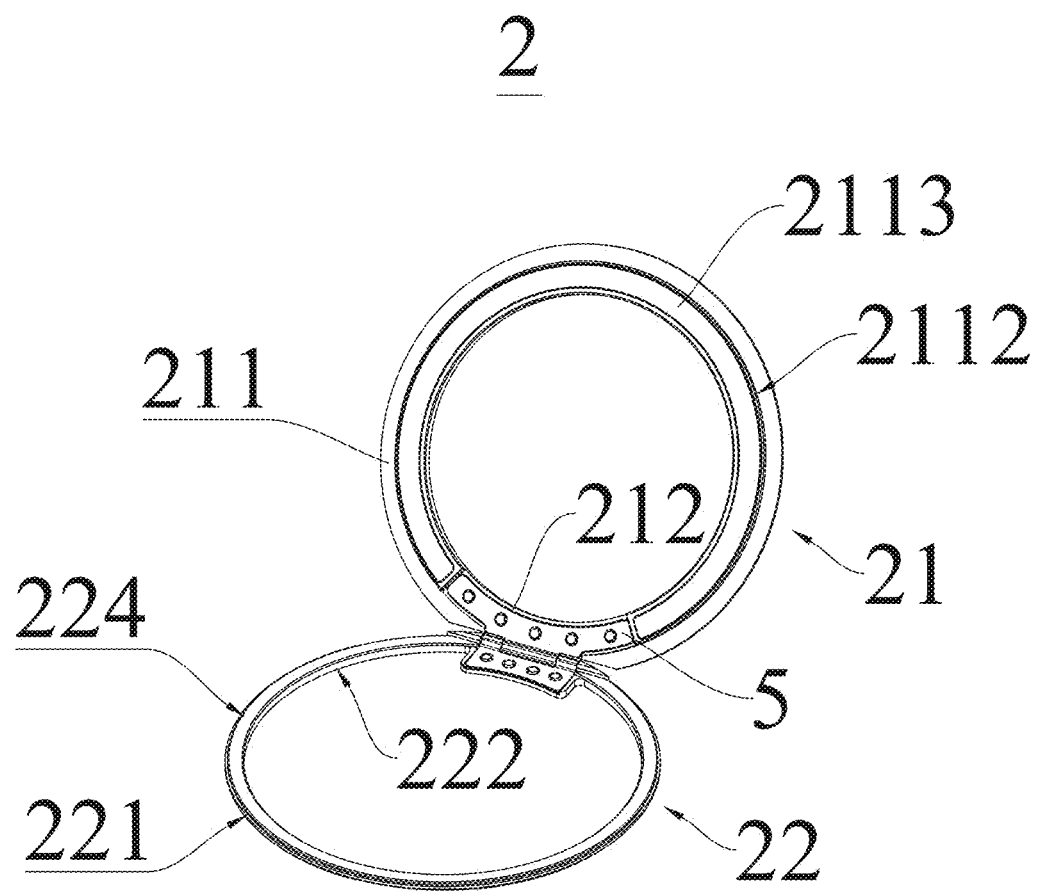
FIG. 6 illustrates a holder of the electronic equipment accessory of FIG. 1.

In one embodiment of the application, as shown in FIGS. 6 and 7, the support member 21 comprises a support member body portion 211, a support member connecting portion 212, and a magnetic attraction member 7. The support member connecting portion 212 is disposed at one end of the support member body portion 211. The support member body portion 211 comprises a support member housing 2111 and a support member cover 2113. The support member housing 2111, the magnetic attraction member 7, and the support member cover 2113 are all of, for example, a circular or arcuate ring structure. One end of the support member housing 2111 is connected with the first mounting portion 51. The support member housing 2111 is formed, in a side surface thereof that faces the base 22 when the support member 21 is at the folded position, with an annular groove 2112. The magnetic attraction member 7 is accommodated in the annular groove 2112. The support member cover 2113 is set on and covers a groove opening of the annular groove 2112 and encloses the magnetic attraction member 7. The support member cover 2113 can be for example a Mylar plate. The magnetic attraction member 7 can be for example a round ring-shaped permanent magnet that is formed of multiple sequentially arranged segmented magnets. When the electronic equipment accessory is mounted to the back surface of the electronic equipment, the magnetic attraction member 7 may become in mutual magnetic attraction with respect to for example a magnetic positioning element or a wireless charging element arranged in the interior of the electronic equipment, so as to have the support member 21 better attached to the base 22 by means of magnetic attraction at the folded position. In other ways of implementation of the instant embodiment, the magnetic attraction member 7 of the support member 21 can be substituted with for example a magnetically attractable member which is made of magnetically conductive materials for example iron or manganese, for which the instant embodiment imposes no limitation.

Figure 5:
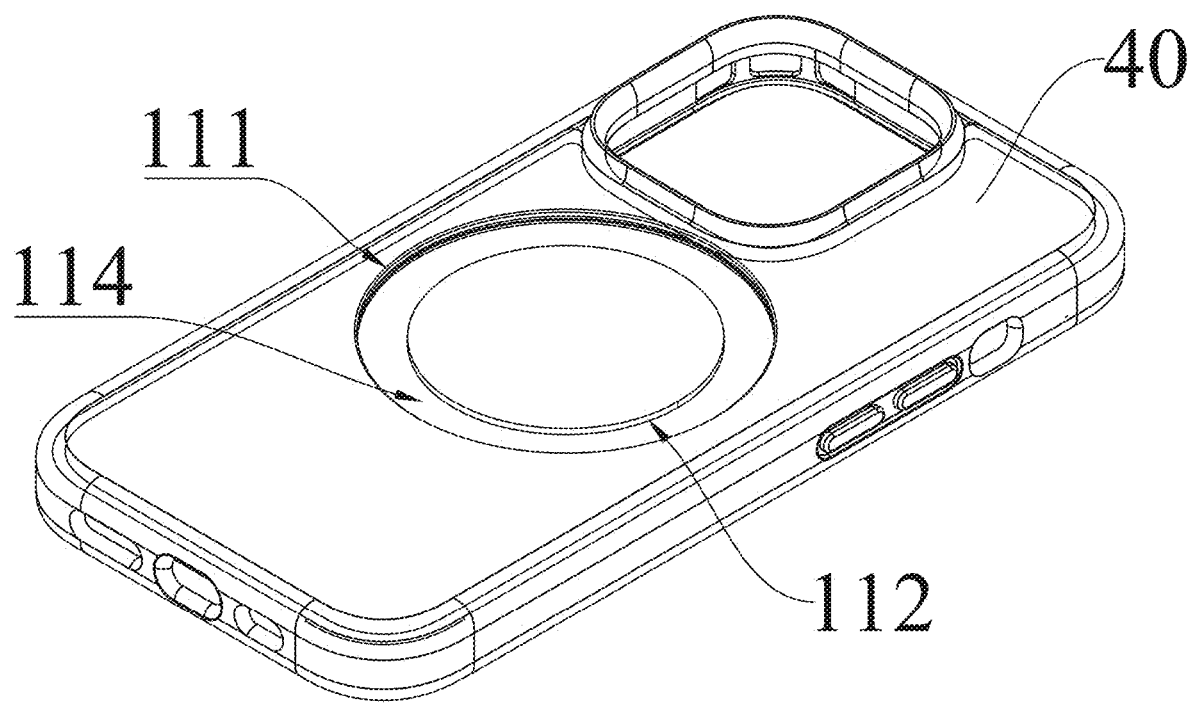
FIG. 5 illustrates a case of the electronic equipment accessory of FIG. 1.

In one embodiment of the application, as shown in FIGS. 5 and 6, the base 22, the support member 21, and the accommodation trough 11 are all of an annular form. The accommodation trough 11 comprises an outer side wall 111 and an inner side wall 112, and the base 22 comprises an outer joining surface 221 that is arranged adjacent to the outer side wall 111 and an inner joining surface 222 that is arranged adjacent to the inner side wall 112. The first connecting member 4 is arranged between the outer side wall 111 and the outer joining surface 221, or alternatively, the first connecting member 4 is arranged between the inner side wall 112 and the inner joining surface 222, so that at the folded position, a portion of the support member 21 contacts with and is supported on a base top surface 224 of the base 22, while another portion of the support member 21 is accommodated in the accommodation trough 11, meaning the support member 21 is set on and covers the base top surface 224, to make the assembled electronic equipment accessory and the electronic equipment more aesthetic for enhancing the use experience of user.

Figure 8:
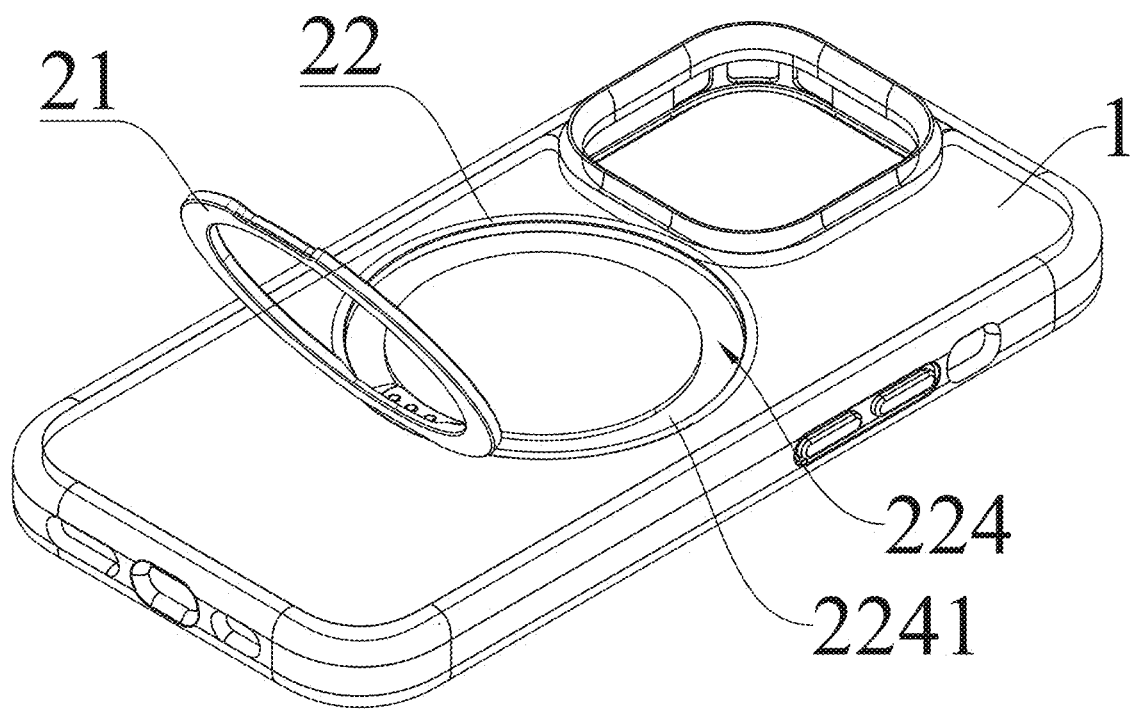
FIG. 8 illustrates another electronic equipment accessory provided in the first embodiment of the application in an extended position.
Figure 9:
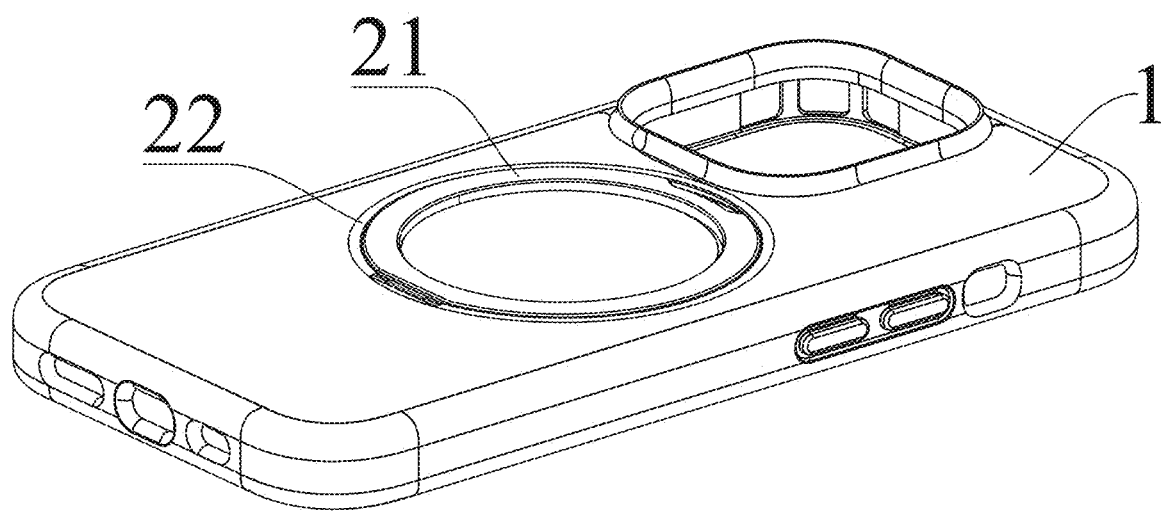
FIG. 9 illustrates the electronic equipment accessory of FIG. 8 in a folded position.

In one embodiment of the application, referring to FIGS. 8 and 9, each of the base 22 and the support member 21 is of an annular form, and the support member 21 and the base 22 are arranged coaxial. A surface of the base 22 that is opposite to the accessory body 1 (namely the base top surface 224) is recessed to form an avoidance recess 2241. The support member 21 is received in and covers the avoidance recess 2241 at the folded position, so as to reduce the thickness of the holder assembly 2 at the folded position for enhancing the use experience of user. At the folded position, the peripheral wall of the base 22 surrounds the support member 21.

To summarize the above, the embodiment of the application provides an electronic equipment accessory, in which by means of the arrangement of the support member, the base, and the first connecting member, the support member is rotatably connected to the base and is openable to form an included angle therebetween for supporting the accessory body, and the first connecting member is arranged to circumferentially surround the base, and the base is rotatably mounted in the accommodation trough by means of the first connecting member in order to adjust the support direction/angle of the holder assembly and also to reduce the thickness of the holder assembly in the vertical direction (perpendicular to the back surface of the accessory body) to avoid influence on effects of wireless charging of the electronic equipment and to allow for easy use by the user. Further, the base is provided, on the base undersurface, with rolling balls for contacting with and being supported in the accommodation trough of the accessory body, and the holder assembly is rotatable by means of rotation of the rolling balls. Further, the support member is also provided with a permanent magnet or a magnetically attractable member so as to have the support member and the base closely fit to each other at the folded position for stowage, and also to allow the user, during use of the electronic equipment accessory, to connect, through magnetic attraction force, devices, such as a wireless charging device, to the accessory body for charging the electronic equipment to which the electronic equipment accessory is mounted. Further, the support member can be made as a concentric structure with respect to the base, the base may define an avoidance recess. During stowage, the support member is set in and closes the avoidance recess of the base to further reduce the thickness of the electronic equipment accessory in the vertical direction, making the product more aesthetic, and enhancing the use experience of the user.

Second Embodiment

Figure 10:
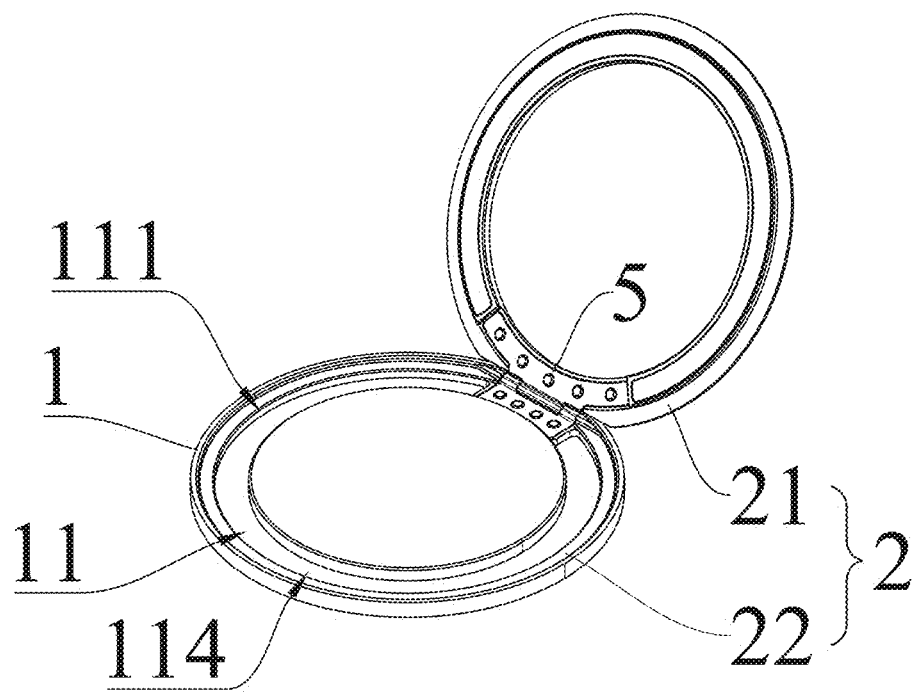
FIG. 10 illustrates an electronic equipment accessory according to a second embodiment of the application in an extended position.
Figure 11:
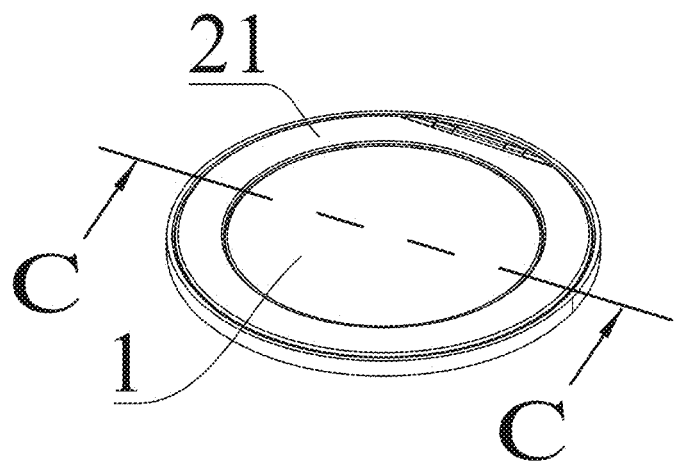
FIG. 11 illustrates the electronic equipment accessory of FIG. 10 in a folded position.

Referring to FIGS. 10, 11, 12a, and 12b, a second embodiment of the application provides an electronic equipment accessory, of which a main difference from the previous embodiment is that the accessory body 1 is made with a different structure. In the instant embodiment, the electronic equipment accessory is illustrated by taking an electronic equipment holder as an example. The electronic equipment holder is connected, directly or indirectly, to a piece of electronic equipment, such as a mobile phone, a tablet computer, a portable power supply device, and a wireless charging device to provide a changeable set-up angle supporting function. Specifically, the electronic equipment accessory comprises, for example, a support member 21, a base 22, a first connecting member 4, and an accessory body 1. The accessory body 1 is for example a circular bottom case. The support member 21 and the base 22 are both made in, for example, an annular form and are both of a round ring structure. The accessory body 1 is formed, for example, with an accommodation trough 11. The base 22 is received in the accommodation trough 11 and the base 22 is rotatable about a center of the accommodation trough 11. Taking the embodiment illustrated as an example, the center of the accommodation trough 11 is the geometry center of the circular/annular accommodation trough 11. The rotation axis about which the base 22 is rotatable passes through the center of the accommodation thought 11. The accommodation trough 11 comprises an outer side wall 111 that extends in a thickness direction of the accessory body 1. The first connecting member 4 is arranged to, for example circumferentially surround an outer circumference of the base 22. The base 22 comprises an outer joining surface 221 that extends in the thickness direction of the accessory body 1. The first connecting member 4 is located between the outer side wall 111 and the outer joining surface 221. One side of the accessory body 1 that is distant from the base 22 may be directly attached to an electronic equipment protection case or is directly attached to an electronic equipment back shell. The electronic equipment accessory is switchable between a folded position and an extended position. At the folded position, the support member 21 is contacting with and supported on a surface of the base 22, and at the extended position (as shown in FIG. 10), the support member 21 is rotatable relative to and forming an included angle with respect to the base 22 extended position for supporting so that a mobile phone or other electronic equipment can be conveniently supported on a supporting surface by the electronic equipment holder.

Figure 12A:
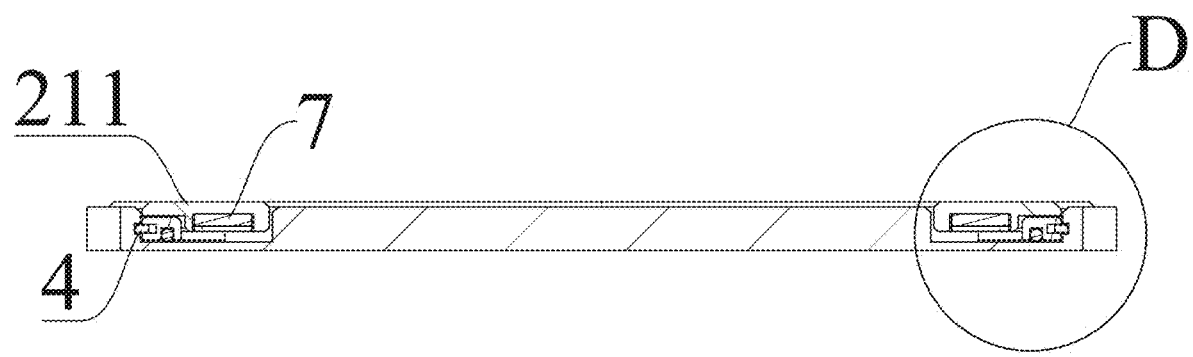
FIG. 12a is a cross-sectional view of the electronic equipment accessory illustrated in FIG. 11 taken along line C-C.
Figure 12B:
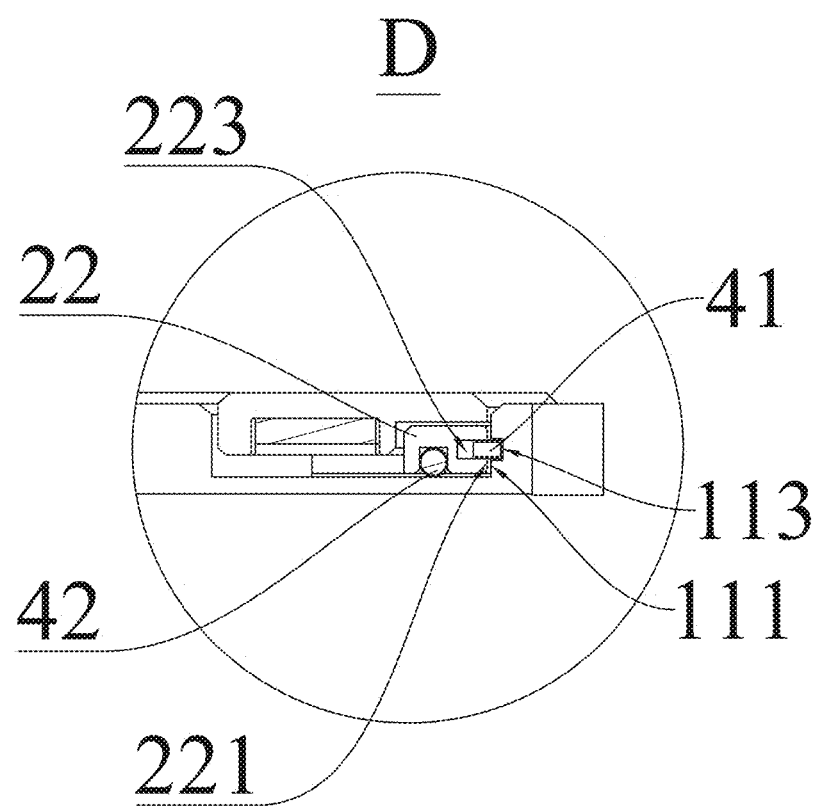
Figure 13:
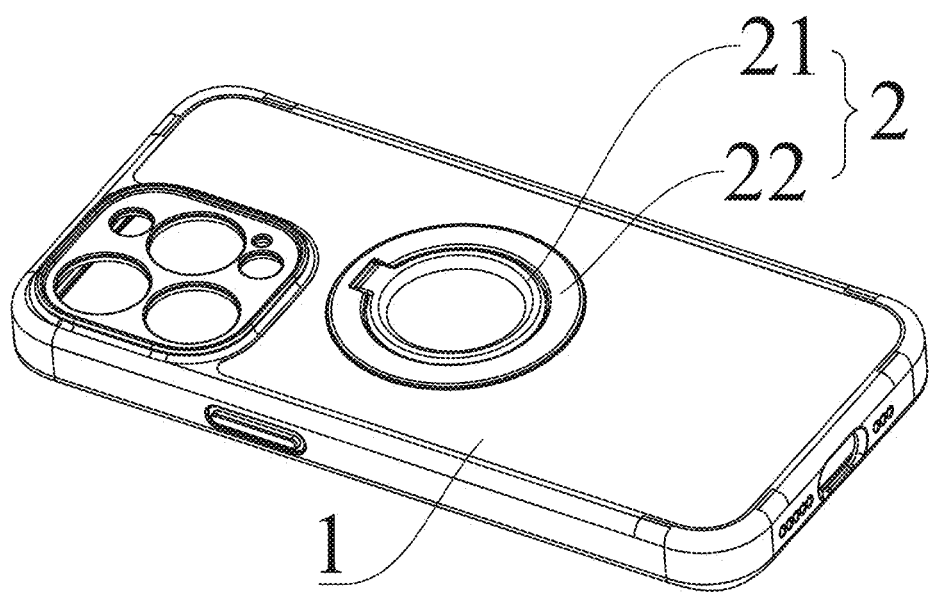
FIG. 13 illustrates an electronic equipment accessory according to a third embodiment of the application in a folded state.

Further, as shown in FIGS. 12a and 12b, the first connecting member 4 comprises a connecting ring 41. The outer joining surface 221 is formed with a first retention groove 223. The outer side wall 111 of the accommodation trough 11 is formed with a second retention groove 113. Groove openings of the first retention groove 223 and the second retention groove 113 are arranged to face each other. The connecting ring 41 is arranged between the first retention groove 223 and the second retention groove 113. The connecting ring 41 functions to, for example, fix the base 22 on the accessory body 1, and to increase a frictional force for rotation of the base 22 in order to prevent undesired rotation of the base 22 in the accommodation trough 11. In other ways of implementation of the instant embodiment, the first connecting member 4 does not include the connecting ring 41 and is instead provided with a plurality of first rolling balls. The plurality of first rolling balls are arranged to have a portion thereof received in a plurality of first retention grooves/holes 223, respectively, while another portion of each of the first rolling balls is contacting with and supported on the outer side wall 111, in order to be rolling when the support member 21 is rotating to help the support member 21 to rotate relative to the base 22.

In one embodiment of the application, as shown in FIGS. 10, 12a, and 12b, the accommodation trough 11 comprises a bottom wall 114, and the first connecting member 4 further comprises partition members 42. In the illustrated embodiment, the partition members 42 are second rolling balls of which the number is plural. The second rolling balls are arranged between a base undersurface 225 (see FIG. 4b) and the bottom wall 114. The second rolling balls function to help the base 22 to rotate in the accommodation trough 11 and to adjust a support direction of the support member 21 at the extended position. In other ways of implementation of the instant embodiment, the partition members 42 comprise one or multiple gaskets, and in this case, no second rolling balls are included. The gasket is arranged between the base undersurface 225 and the bottom wall 114. The gasket can be, for example, a wear-resistant material, so as to reduce wearing of the base undersurface 225 resulting from friction and to increase a frictional force to the base 22 during rotation to prevent undesired rotation thereof. Further, the base 22 defines a recess and the partition members 42 are received in the recess.

Further, similar to the previous embodiment (see FIGS. 6-7), in the instant embodiment, the support member 21 comprises a support member body portion 211, a support member connecting portion 212, and a magnetic attraction member 7. The support member connecting portion 212 is disposed at one end of the support member body portion 211. The support member body portion 211 comprises a support member housing 2111 and a support member cover 2113. The magnetic attraction member 7 can be for example a round ring-shaped magnet group formed of multiple sequentially arranged segmented magnets. The magnetic attraction member 7 is fixed on one side of the support member housing 2111 that faces the base 22, and when the support member 21 is at the folded position, the magnetic attraction member 7 is located in the accommodation trough 11. When the electronic equipment accessory is set at the folded position and is provided at the electronic equipment back shell or the electronic equipment protection case, the magnetic attraction member 7 may become in mutual magnetic attraction with respect to for example a magnetic positioning element or a wireless charging element arranged in the interior of the electronic equipment, so as to have the support member 21 better attached to the base 22 at the folded position under the action of the magnetic attraction. Further, when the user uses a magnetic wireless charging device to magnetically connect to the electronic equipment to implement wireless charging, the magnetic attraction force of the wireless charging device may be reduced due to exist of the electronic equipment protection case which is usually magnetically non-conductive, and under this condition, with the electronic equipment accessory being mounted to the electronic equipment protection case, the magnetic attraction member 7 of the electronic equipment accessory may function to magnetically connect with the wireless charging device to allow the user to implement wireless charging.

Third Embodiment

Referring to FIGS. 13-18, a third embodiment of the application provides an electronic equipment accessory, of which a main difference from the previous embodiments is that a connecting structure between the accessory body 1 and the holder assembly 2 is made different. In the instant embodiment, the electronic equipment accessory is still illustrated by taking an electronic equipment protection case as an example. The electronic equipment accessory comprises the accessory body 1 and a holder assembly 2. The holder assembly 2 comprises a support member 21 and a base 22. The accessory body 1 defines an accommodation trough 11. The base 22 is arranged in the accommodation trough 11, and a circumference of the base 22 is movably connected to a sidewall of the accommodation trough 11. The support member 21 is rotatably connected to the base 22 and is receivable in the base 22. Specifically, the accessory body 1 comprises a back plate 13 and a side frame 14. The back plate 13 and the side frame 14 surround and delimit a receiving compartment 15 for receiving a piece of electronic equipment therein. The accommodation trough 11 is formed in the back plate 13 and extends through two opposite sides therein in a thickness direction. In the instant embodiment, the accommodation trough 11 is of a circular structure to enable rotatable mating with the base 22.

Further, one of the sidewall of the accommodation trough 11 and the circumference of the base 22 is provided with a first connecting member 4, while the other of the accommodation trough 11 and the circumference of the base 22 is formed with a first retention groove 223 mating with the first connecting member 4.

In the instant embodiment, the first connecting member 4 is arranged at the sidewall of the accommodation trough 11, and the first retention groove 223 is formed in the circumference of the base 22. The first connecting member 4 and the first retention groove 223 are both a complete ring structure. Mating between the first connecting member 4 and the first retention groove 223, on the one hand, makes the base 22 rotatable relative to the accessory body 1 to adjust the extended position of the support member 21, and on the other hand, prevents detachment of the base 22 and the accessory body 1. In other embodiments, the first connecting member 4 may comprise multiple sections which jointly and circumferentially form the ring structure.

In one embodiment, the electronic equipment accessory further comprises a contact member 43. The contact member 43 is arranged between the first connecting member 4 and an internal wall of the first retention groove 223. When the base 22 rotates relative to the accessory body 1, by arranging the contact member 43 between the two, a contact area between the first connecting member 4 and the internal wall of the first retention groove 223 can be reduced to thereby reduce the degree of wearing between the first connecting member 4 and the internal wall of the first retention groove 223 and extend the service lives of the base 22 and the accessory body 1. Optionally, the contact member 43 is a metallic member.

In one embodiment, the base 22 is formed with a receiving groove, and the support member 21 is rotatable into the receiving groove. Specifically, the receiving groove is a blind groove. The support member 21 comprises a support body portion 211 and a support connecting portion 212 that are connected to each other. The receiving groove comprises a primary groove and a connection groove that are connected to each other. The support connecting portion 212 is rotatably connected to an internal wall of the connection groove. The support member 21 has a supporting state/position and a folded state/position, and in the supporting state/position, the support body portion 211 is located outside the primary groove, and the support body portion 211 and the base 22 form an included angle so that the support body portion 211 can cooperate with the accessory body 1 to support the accessory body 1 on a support surface, and in the folded state/position, the support body portion 211 is located inside the primary groove to reduce a height of protrusion of the support member 21 with respect to the back plate 13.

In one embodiment, the base 22 is of an annular structure that surrounds and delimits a receiving space 23. The support member 21 is rotatable into the receiving space 23. Specifically, the receiving space 23 extends through two opposite sides of the base 22 in the thickness direction of the base 22. The support member 21 comprises a support body portion 211 and a support connecting portion 212 that are connected to each other. The receiving space 23 comprises a primary space 231 and a connection space 232 that are connected to each other. The support connecting portion 212 is rotatably connected to an internal wall of the connection space 232. The support member 21 has a supporting state and a folded state/position, and in the supporting state, the support body portion 211 is located outside the primary space 231, and the support body portion 211 and the base 22 form an included angle for supporting the accessory body 1, and in the folded state/position, the support body portion 211 is located inside the primary space 231 to reduce a height of protrusion of the support member 21 with respect to the back plate 13.

Further, one of an internal circumference of the base 22 and the support member 21 is provided with a retaining block 226, while another one is provided with a retaining nick 213 that mates with the retaining block 226.

In the instant embodiment, the retaining block 226 is arranged on the internal circumference of the base 22, and the retaining nick 213 is formed in one side of the support member 21 that is adjacent to the receiving compartment 15. When the support member 21 is rotated from the supporting state to the folded state/position, the retaining block 226 and the retaining nick 213 are in retaining engagement with each other, the support member 21 is completely located inside the receiving space 23. The arrangement of the retaining block 226 and the retaining nick 213 effectively prevents connection between the support member 21 and the base 22 from being damaged due to over rotation of the support member 21.

In one embodiment, the electronic equipment accessory further comprises a pivot axle 53. The pivot axle 53 is inserted into a sidewall of the receiving groove. The support member 21 is rotatably connected to the pivot axle 53. Specifically, the pivot axle 53 comprises two pieces that are coaxially arranged. The two pivot axles 53 are respectively inserted into two opposite sidewalls of the connection groove. The two pivot axles 53 are both rotatably connected to the support connecting portion 212.

In one embodiment, the pivot axle 53 comprises an axle body 531 and an axle sleeve 532. One end of the axle body 531 is inserted into the sidewall of the receiving groove, and another end is provided with the axle sleeve 532. The support member 21 is sleeved on the axle sleeve 532 and is rotatably connected thereto. Specifically, the axle body 531 is of a cylindrical form having one end inserted into the sidewall of the connection groove, and the support connecting portion 212 is sleeved on the axle sleeve 532. Optionally, the axle sleeve 532 comprises polyformaldehyde (POM). The arrangement of the axle sleeve 532 between the axle body 531 and the support member 21 increases the rotation damping between the support member 21 and the base 22 to allow the support member 21 to be kept at a given rotation angle during supporting.

In one embodiment, the support member 21 is of an annular structure. When the support member 21 is at the folded state/position, the user may easily pull, through the internal circumference of the support member 21, the support member 21 out of the receiving space 23 for supporting.

In one embodiment, chamfering (such as an arc surface) is provided on edges of one side of each of the base 22 and the support member 21 that is distant from the receiving compartment 15 to provide a smoother hand feeling when the user grips the electronic equipment accessory to enhance comfort of use.

In one embodiment, the first connecting member 4 is of an elastic structure. As the first connecting member 4 has elasticity, the first connecting member 4 is deformable for easy insertion into the first retention groove 223 to implement assembling of the base 22 and the accessory body 1.

In one embodiment, the base 22 is removably arranged in the accommodation trough 11. It is noted that when a mobile phone is mounted with the electronic equipment accessory, the arrangement of the base 22 and the support member 21 may easily shield a wireless charging zone on the back of the mobile phone and thus affecting the wireless charging performance. In the instant embodiment, with the arrangement of the first connecting member 4 and the first retention groove 223 that mutually mate each other, the base 22 can be easily and efficiently removed out of the accommodation trough 11 to allow the wireless charging device to directly mount to the back of the mobile phone for implementing wireless charging.

The accessory body 1 of the present invention is provided with the accommodation trough 11, and the circumference of the base 22 is movably connected to the sidewall of the accommodation trough 11. The support member 21 is rotatable relative to the base 22 for being stowed inside the base 22. On the one hand, the base 22 and the accessory body 1 are movably connected to allow the user to do adjustment on the base 22 to adjust the extended position of the support member 21, and on the other hand, the base 22 is arranged in the accommodation trough 11, and the support member 21 is receivable in the base 22 to prevent, as much as possible, the base 22 and the support member 21 from protruding out of the accessory body 1 so as to alleviate the problems of an existing protruding annular finger fastener, which, on the one hand, causes irregularity when the electronic equipment is placed on a wireless charging base, and, on the other hand, increases the distance between a transmitting coil and a receiving coil during wireless charging to result in lowering of the charging efficiency and increasing of heat generated during charging.

Fourth Embodiment

Referring to FIGS. 19-32, a fourth embodiment of the application provides an electronic equipment accessory, of which a main difference from the previous embodiments is that the holder assembly 2 has a different structure. In the instant embodiment, the electronic equipment accessory is still illustrated by taking an electronic equipment protection case as an example. Specifically, the holder assembly 2 comprises a base 22 and a support member 21, and the base 22 and the support member 21 are rotatably connected by means of a second connecting member 5. The base 22 is provided with a reinforcing part corresponding to the second connecting member 5. By additionally providing the reinforcing part on the portion of the base 22 that receives an acting force from the second connecting member 5, increase of the holder assembly strength can be realized, and the damage rate of the holder assembly can be reduced.

The second connecting member 5 comprises a second mounting portion 52, a first mounting portion 51, and a pivot axle 53. The second mounting portion 52 and the first mounting portion 51 are rotatably connected by means of the pivot axle 53, and the first mounting portion 51 covers a surface of the reinforcing part. The base 22 is fixedly connected to the second mounting portion 52. The support member 21 is fixedly connected to the first mounting portion 51. The reinforcing part is arranged on a portion of the base 22 that is adjacent to the pivot axle 53 to specifically reinforce the strength of the rotating portion of the holder assembly. The base 22 comprises a pair of blocking portions 220 facing opposite ends of the pivot axle 53 respectively for limiting movement of the pivot axle in an axis direction of the pivot axle and blocking the pivot axle 53 escaping from the base 22.

In the instant embodiment, the second mounting portion 52 and the base 22 are separately formed and then assembled together. The first mounting portion 51 and the support member 21 are separately formed and then assembled together. In an alternative embodiment, the second mounting portion 52 and the first mounting portion 51 are integrally formed with the base 22 and the support member 21, respectively, and under this condition, the base 22 and the support member 21 are made in direct rotatable connection with each other by means of the pivot axle 53. In a further alternative embodiment, the base 22 is fixedly connected to the first mounting portion 51, and the support member 21 is fixedly connected to the second mounting portion 52, and the base 22 and the support member 21 are rotatably connected by means of the second mounting portion 52 and the first mounting portion 51.

Figure 23:
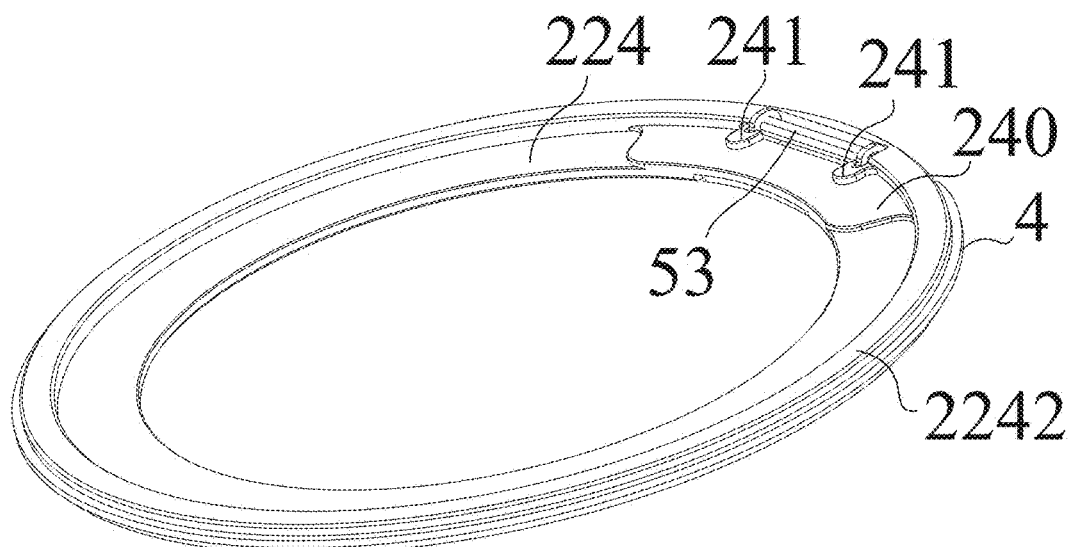
FIG. 23 illustrates a base, a mounting portion, and a pivot axle of the holder assembly of FIG. 21 at a first viewing angle.
Figure 24:
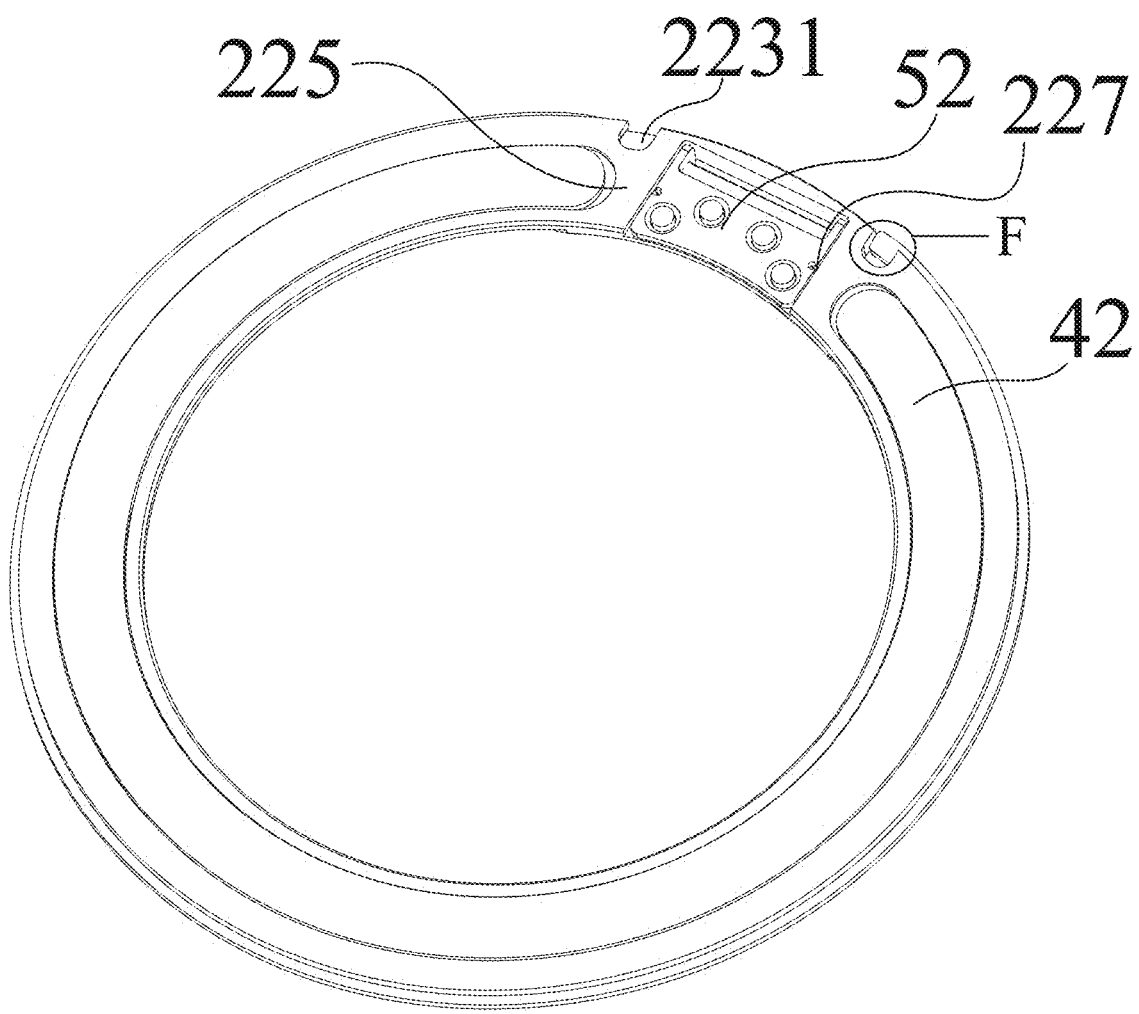
FIG. 24 illustrates the base, the second mounting portion, and the pivot axle of the holder assembly of FIG. 21 at a second viewing angle.
Figure 25:
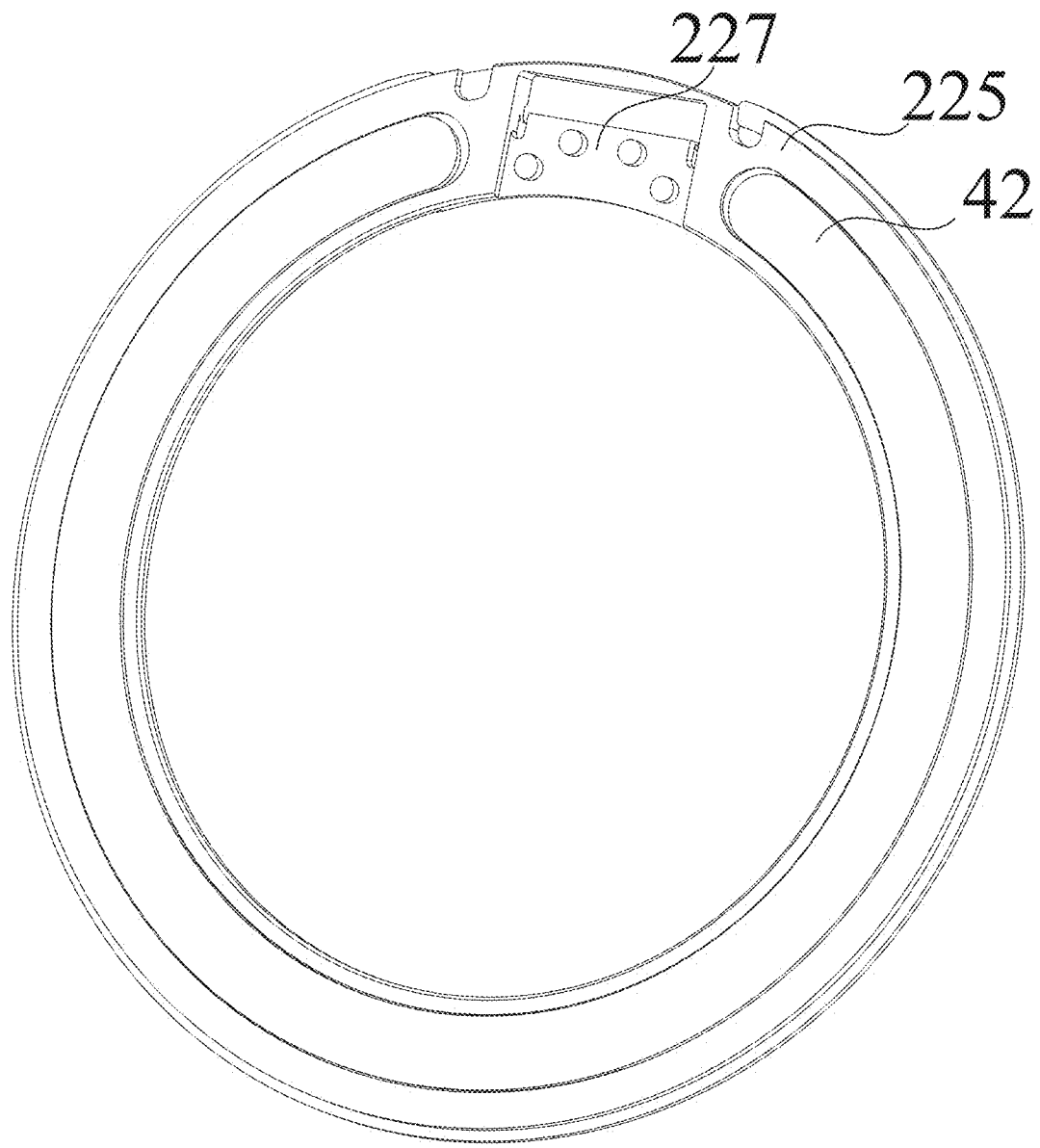
FIG. 25 illustrates the base of the holder assembly of FIG. 21.
Figure 26:
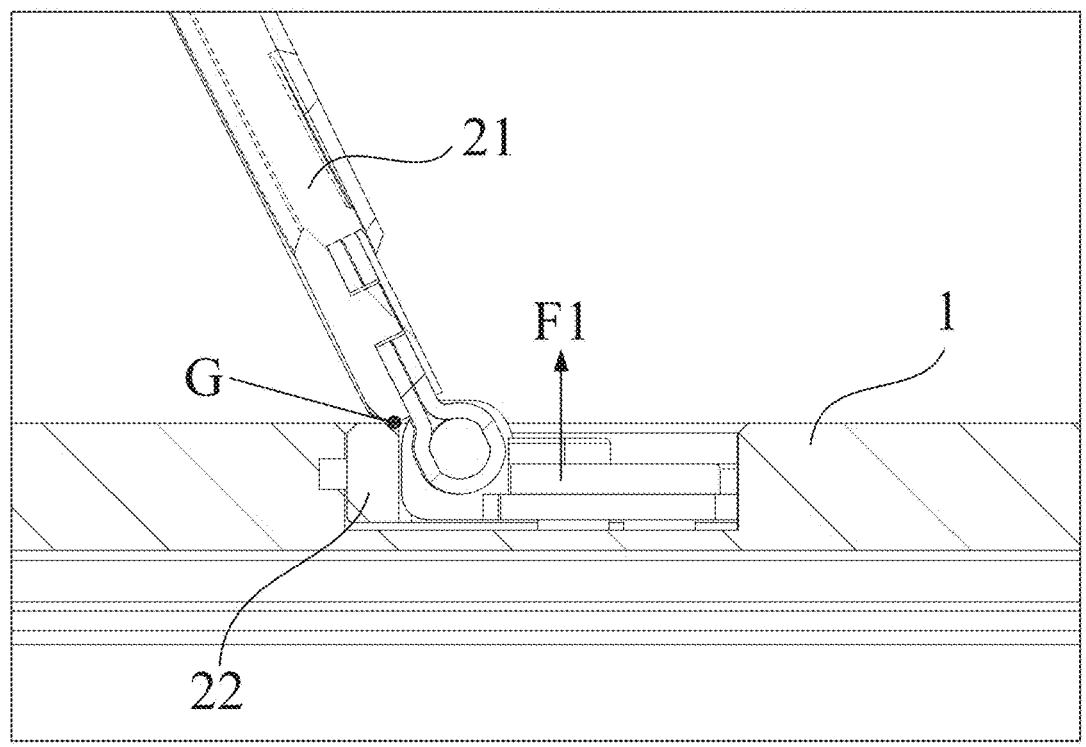
FIG. 26 is a cross-sectional view showing a connection portion of a holder assembly of the electronic equipment accessory illustrated in FIG. 19.

Referring also to FIGS. 23 and 24, the base 22 includes a base top surface 224 and a base undersurface 225 that are arranged opposite to each other. The support member 21 is rotatable to position on and cover the base top surface 224. Optionally, the base 22 comprises a recessed portion sunken from the base top surface 224 for accommodating the support member 21 when the support member 21 is located at the folded state. An end of the second mounting portion 52 is fixed to the base undersurface 225, and another end of the second mounting portion 52 is formed with a pivot axle mounting portion 521. The reinforcing part and the pivot axle mounting portion 521 are arranged adjacent to each other. Preferably, the reinforcing part is formed, in a protruding manner, on the base top surface 224 of the base 22. That is, the reinforcing part 240 is formed by a protruding part on the base top surface 224 of the base 22.

Further, the base undersurface 225 is formed with a mounting trough 227, and the base top surface 224 is formed with an opening that is in communication with the mounting trough 227. One end of the second mounting portion 52 is fixed in the mounting trough 227 via a connecting structure, and the pivot axle mounting portion 521 extends through the opening and is connected to the pivot axle 53. The connecting structure comprises multiple holes defined in the second mounting portion 52 and multiple posts extending from the end wall of the mounting trough 227 and riveted in the holes respectively. By disposing the second mounting portion 52 in the base undersurface 225 of the base 22, during a course that the support member 21 (or the first mounting portion 51) is being turned upward relative to the base top surface 224 of the base 22, the entirety of the base 22 provides a downward pressing force to the second mounting portion 52 to prevent the connection between the second mounting portion 52 and the base 22 from twisting and deforming.

Referring to FIGS. 22-26, in the instant embodiment, the reinforcing part comprises a first reinforcement portion 240 arranged to extend in a length direction of the pivot axle 53. Specifically, the base 22 is in the form of a circular ring, and the pivot axle 53 is located at one side of the base 22 and the pivot axle 53 is adjacent to an outer circumferential edge of the base 22, and the first reinforcement portion 240 is stacked on the surface of the base 22 and extends in the length direction of the pivot axle 53, and the first reinforcement portion 240 is of an arc form to match the circular ring of the base 22.

When the base 22 and the support member 21 are relatively rotated to a maximum angle, the base 22 abuts against the support member 21. An abutting portion of the base 22 against the support member 21 forms a supporting point or fulcrum (designated at G in FIG. 26). A portion of the base 22 that is connected to the second mounting portion 52 is subject to a relatively large acting force F1, and under the action of F1, the base 22 generates minute deformation, and under the condition of an extended period of action by the acting force, the minute deformation is gradually expanded to become significant deformation, causing damage to the holder assembly 2. The instant embodiment provides the first reinforcement portion 240 arranged on the base 22 in the length direction of the pivot axle 53 to increase the strength of the force receiving portion, reducing the rate of damage of the holder assembly 2 and extending the service life of the holder assembly 2. Preferably, the first reinforcement portion 240 has a length that is greater than or equal to a length of the pivot axle 53, and the first reinforcement portion 240 completely covers the second mounting portion 52, so as to achieve increase of the strength for the whole second mounting portion 52. The support member has a ring shape with an outer circumferential surface, and a flatted portion 210 is formed at a position of the outer circumferential surface corresponding to the second connecting member.

Further, the base 22 is provided, on an outer side, with a reinforcing rib 2242 arranged in a circumferential direction. The first reinforcement portion 240 and the reinforcing rib 2242 are connected to increase the overall strength of the base 22. The reinforcing rib 2242 has a thickness that is greater than a thickness of the first reinforcement portion 240.

Further, the reinforcing part further comprises second reinforcement portions 241 which are arranged to correspond to ends of the pivot axle 53. Specifically, the second reinforcement portions 241 are formed, in a protruding manner, on a surface of the first reinforcement portion 240, and the second reinforcement portions 241 are located on one side of the first reinforcement portion 240 that is opposite to the second mounting portion 52. The number of the second reinforcement portions 241 is two, and the two second reinforcement portions 241 are arranged to respectively correspond to the two ends of the pivot axle 53.

In one embodiment, the base 22 and the second mounting portion 52 are integrally formed, and the connection between the base 22 and the first mounting portion 51 can be achieved by a trough formed in an edge of the base 22, with a hole formed in each of two ends of a trough wall, and a pivot axle arranged between the two holes, and the first mounting portion 51 is rotatably connected to the pivot axle, and under this condition, the two ends of the trough wall of the base 22 are subject to relatively large forces acting thereon and as such, a second reinforcement portion 241 may be arranged at each of the two ends of the trough wall of the base 22. The way of connection between the base 22 and the first mounting portion 51 can be that a trough is formed in an edge of the first mounting portion 51, with a hole formed in each of two ends of a trough wall, and a pivot axle is arranged between the two holes, and the base 22 is rotatably connected to the pivot axle, and under this condition, a portion of the base 22 that is connected with the pivot axle is subject to relatively large forces acting thereon and as such, a second reinforcement portion 241 may be arranged at the portion of the base 22 that is connected with the pivot axle.

In another embodiment, the base 22 and the second mounting portion 52 are separately formed, and arrangement of the number and position of the second reinforcement portion 241 of the base 22 are primarily dependent on the positions and number of acting forces of the second mounting portion 52 acting on the base 22. For example, two ends of the second mounting portion 52 are rotatably connected by means of the pivot axle 53 to the first mounting portion 51, and this implies that the two ends of the second mounting portion 52 are points where the acting forces are applied, and thus, the portions of the base 22 that are adjacent to two ends of the second mounting portion 52 are each provided with one second reinforcement portion 241 to achieve reinforcement on each of the two points of acting force.

It is noted that the second reinforcement portion 241 is provided mainly for increasing the strength of the holder assembly, and thus, the arrangement of the number and position of the second reinforcement portion 241 are primarily dependent on the position and number of points of the base 22 that are subject to relatively large forces acting thereon. It is appreciated that the base 22 can be provided with only second reinforcement portion 241, while the first reinforcement portion 240 is omitted.

Materials of the base 22 and the support member 21 can be metallic materials, such as aluminum alloy, or can be plastic materials, or one component being metallic material, while the other component being plastic material. Preferably, the materials of the base 22 and the support member 21 are metallic materials so as to provide a better strength, making the holder assembly not readily damaged. Further, the reinforcing body can be formed on the metal-made base 22 by stamping or cutting.

Figure 27:
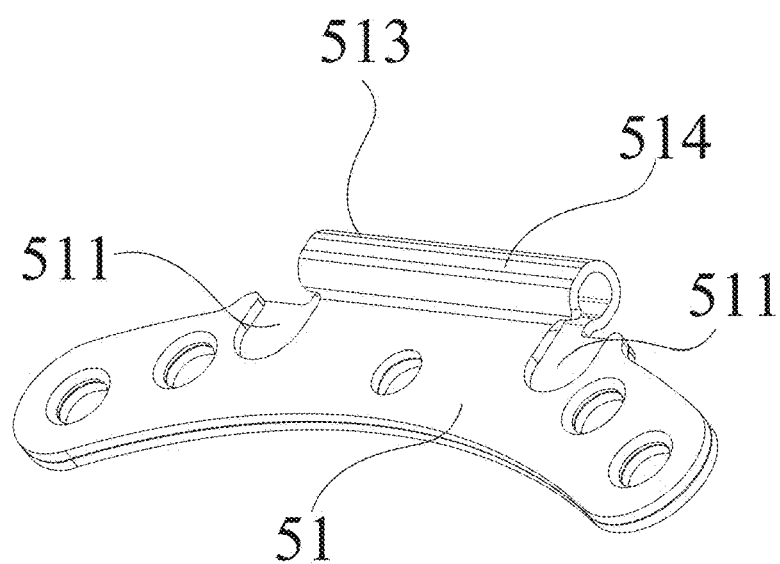
FIG. 27 illustrates a first mounting portion illustrated in FIG. 21.

Referring to FIG. 27, to increase the strength of an end of the first mounting portion 51 that is distant from the pivot axle 53, the end of the first mounting portion 51 that is distant from the pivot axle 53 adopts a multi-layer structure. Preferably, the end of the first mounting portion 51 that is distant from the pivot axle 53 adopts a dual-layer structure. The design of the dual-layer structure ensures the strength of the end of the first mounting portion 51 that is distant from the pivot axle 53, and also suits the need for a reduced thickness of the holder assembly 2. The first mounting portion 51 can be formed through folding a metal plate.

To increase the capability of deformation of the first mounting portion 51, the multi-layer structure of the first mounting portion 51 is provided with recesses corresponding to the reinforcing body. Specifically, in the instant embodiment, the first mounting portion 51 is provided, at portions thereof adjacent to the pivot axle 53, with buffering portions 511 (namely the multi-layer structure being provided with the buffering portions 511), and forming deformation portions of the first mounting portion 51 to increase the capability of deformation of the first mounting portion 51 at the portions thereof adjacent to the pivot axle 53, for providing buffering effect during rotation of the holder assembly 2 and extending the service life of the first mounting portion 51.

Further, the buffering portions 511 are recesses, and the recesses are arranged to correspond to the second reinforcement portions 241. Such a design allows the second reinforcement portion 241 to rotate in the buffering portions 511 when the base 22 and the support member 21 are closed on each other, and also allows the base 22 and the support member 21 can be perfectly closed on each other.

To increase the strength of the holder assembly 2, one end of the first mounting portion 51 that is distant from the pivot axle 53 extends toward two sides to form a circular arc shaped circumference, so as to make force more uniformly acting on the first mounting portion 51 when the holder assembly 2 is at the supporting state, improving the product strength. The first mounting portion 51 comprises a sleeve 513 sleeved on the axle 53, and the sleeve 513 comprises an outer circumferential surface with flatted sections 514 arranged in the circumferential direction of the sleeve 513. Each flatted section extends from one end of the sleeve to the opposite end of the sleeve in the axial direction of the sleeve.

Figure 28:
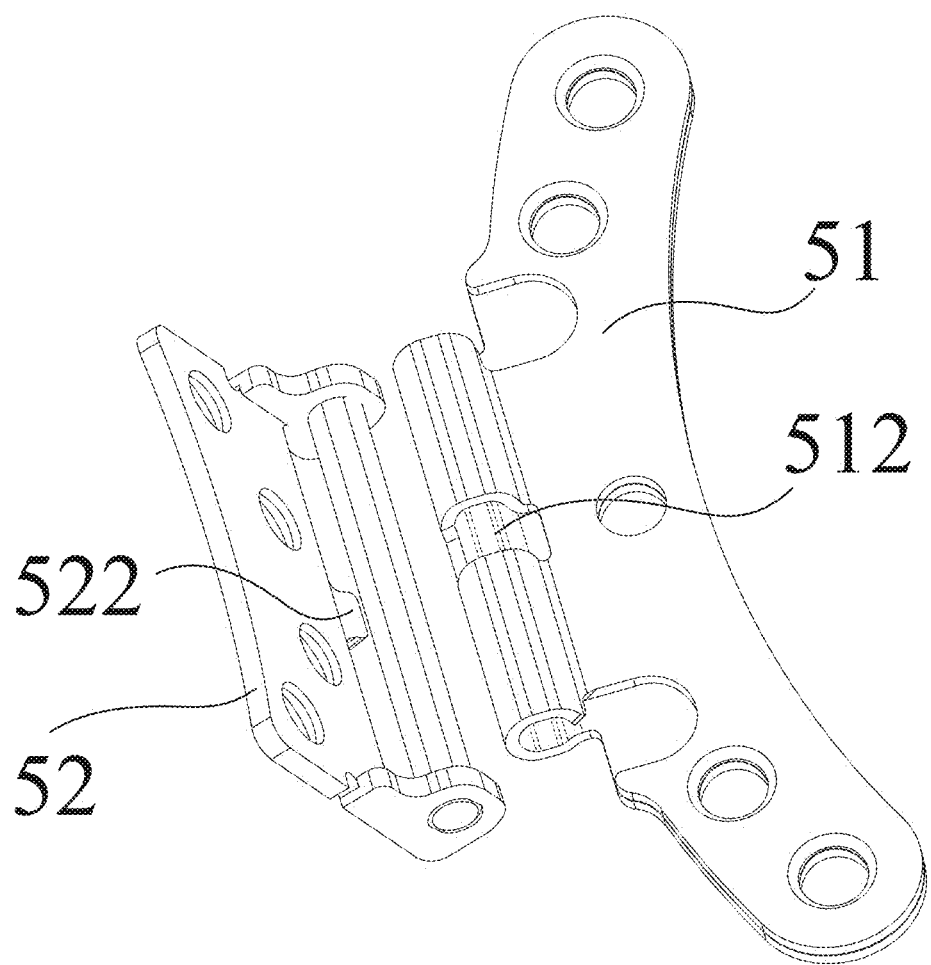
FIG. 28 is an exploded view showing another embodiment of the second connecting member of the holder assembly illustrated in FIG. 20.
Figure 29:
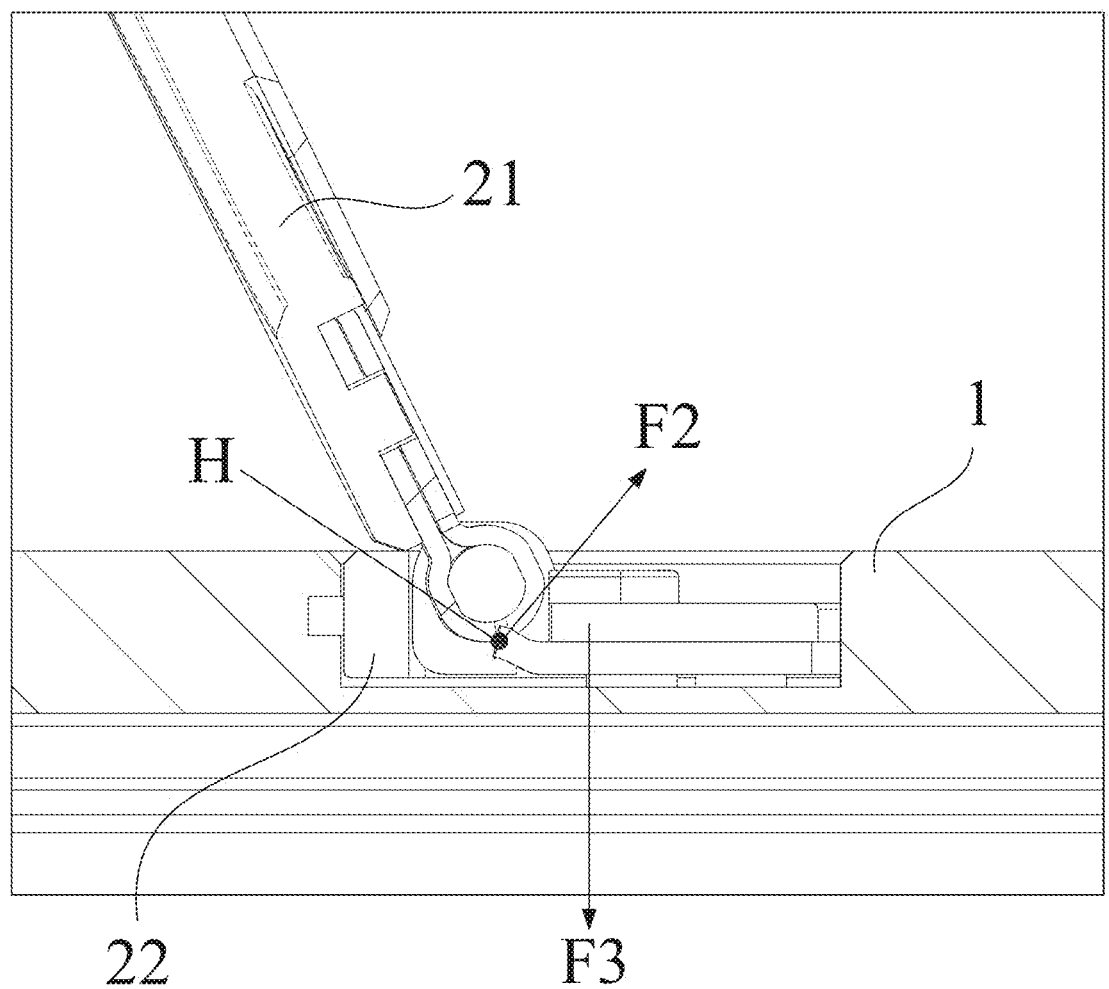
FIG. 29 is a cross-sectional view showing a connection portion of the holder assembly illustrated in FIG. 28.

In one embodiment, referring to FIGS. 28 and 29, one end of the first mounting portion 51 that is adjacent to the pivot axle 53 is formed with a position-limiting notch 512, and the base 22 is provided, on a portion thereof that corresponds to the position-limiting notch 512, with a position-limiting protrusion 522, or alternatively, one end of the first mounting portion 51 that is adjacent to the pivot axle 53 is formed with a position-limiting notch 512, and the second mounting portion 52 is provided, on a portion thereof that corresponds to the position-limiting notch 512, with a position-limiting protrusion 522. When the base 22 and the support member 21 are rotated relative to each other to a maximum angle, the position-limiting protrusion 522 abuts against the first mounting portion 51 in the position-limiting notch 512, and the arrangement of the position-limiting notch 512 and the position-limiting protrusion 522 makes the location of the supporting point changed from the supporting portion G of the base 22 for the support member 21 to the supporting portion H of the position-limiting protrusion 522 for the first mounting portion 51, changing the direction of force acting on the base 22, namely changing from the vertical direction F1 of FIG. 26 to the inclined direction F2 of FIG. 29 to thereby further improve the strength and service life of the base 22.

Further, the number of the position-limiting notch 512 can be plural, and the position of the position-limiting notch 512 can be set according to practical needs. For example, a left side of one end of the first mounting portion 51 that is adjacent to the pivot axle 53 is provided with one position-limiting notch 512, or a right side of one end of the first mounting portion 51 that is adjacent to the pivot axle 53 is provided with one position-limiting notch 512, or for balance of forces acting on the first end 6, it is possible to provide one position-limiting notch 512 on each of the left side and the right side of one end of the first mounting portion 51 that is adjacent to the pivot axle 53. Preferably, only one position-limiting notch 512 is provided, for simplifying the structure and reducing manufacturing difficulty, and the position of the position-limiting notch 512 is set at a middle of one end of the first mounting portion 51 that is adjacent to the pivot axle 53 to prevent damage of the first mounting portion 51 resulting from imbalance of force. It is noted that the above provides only examples of illustration of the number and position of the position-limiting notch 512, and the number and position of the position-limiting notch 512 can be set according to practical needs.

Figure 19:
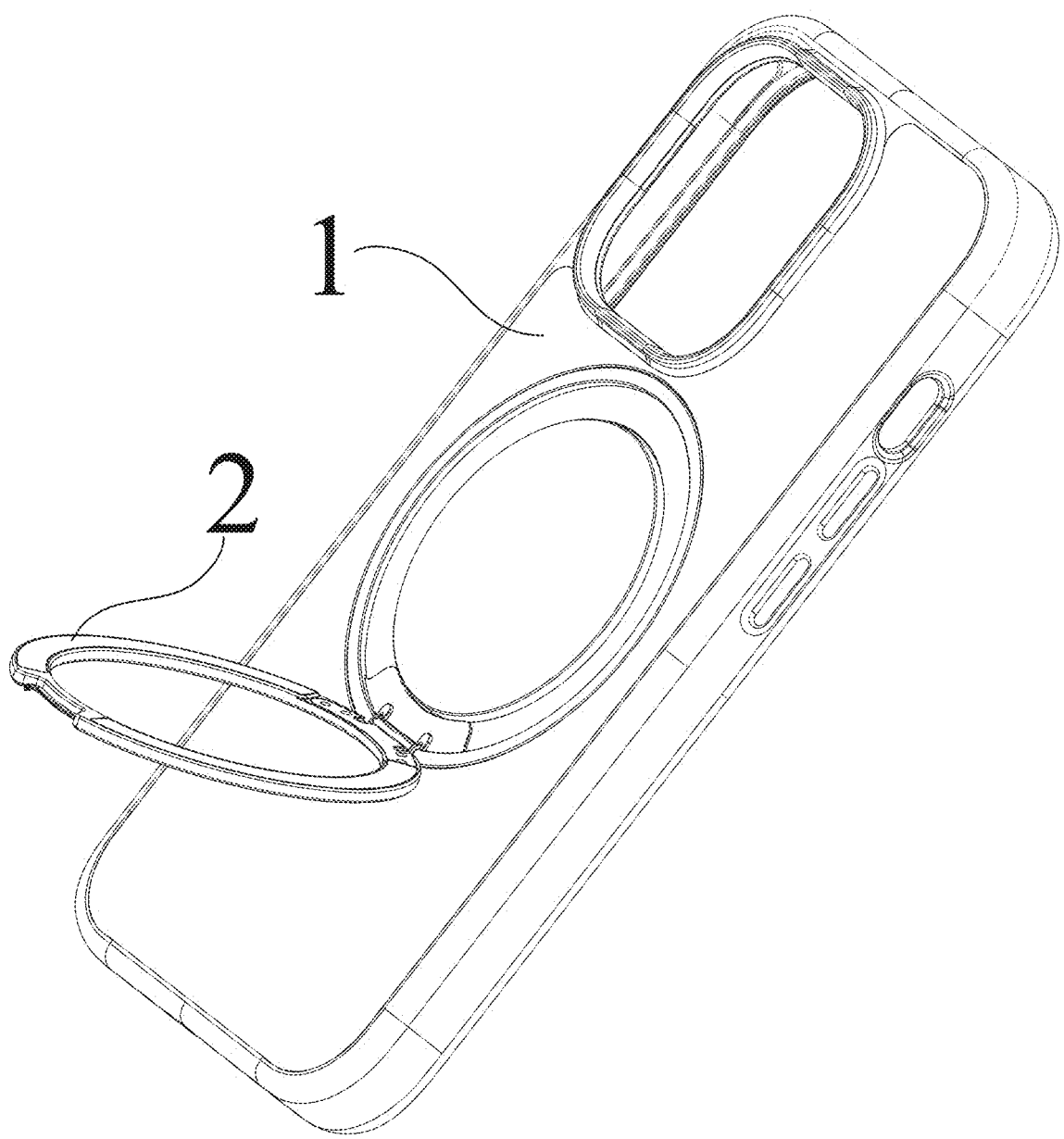
FIG. 19 illustrates an electronic equipment accessory according to a fourth embodiment of the application.
Figure 20:
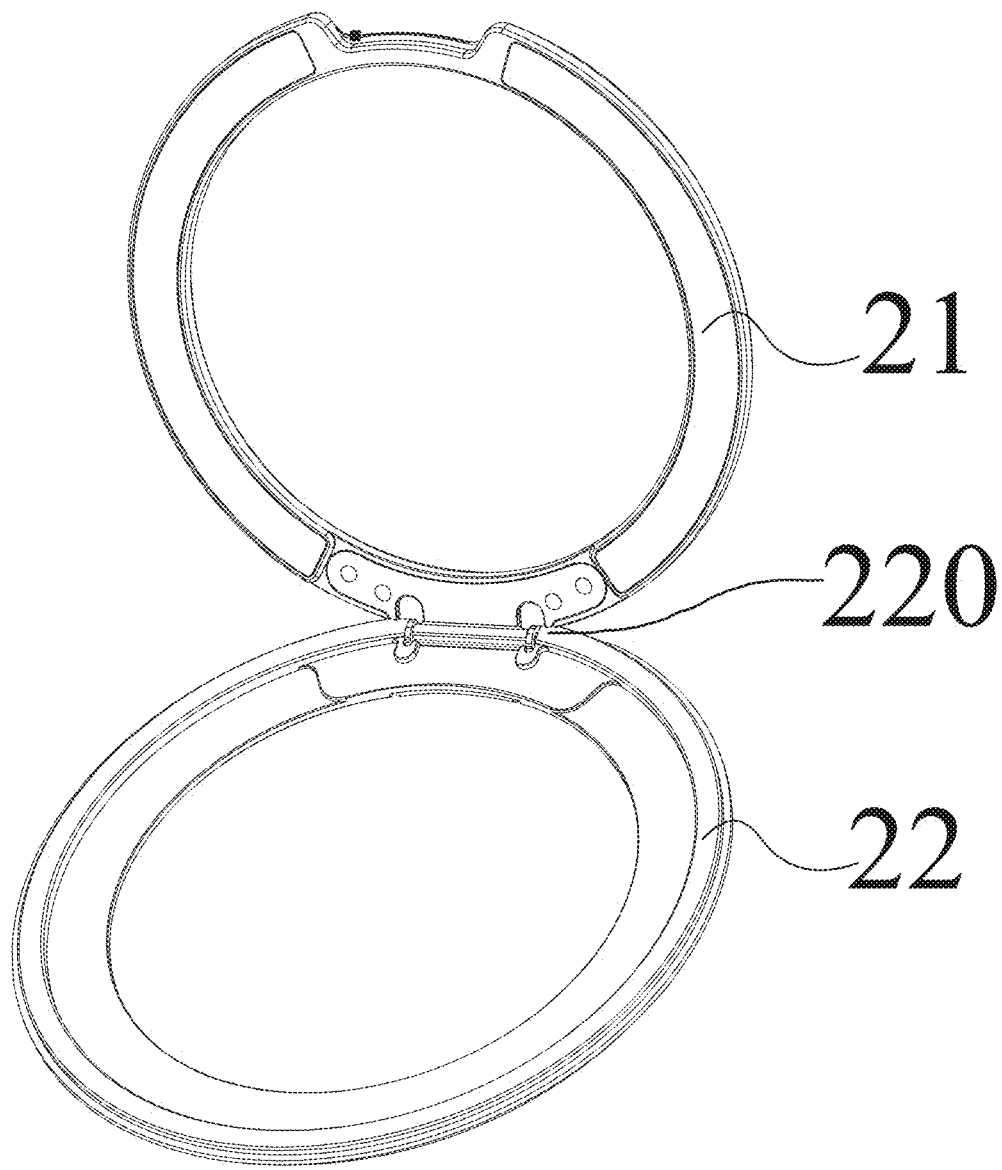
FIG. 20 illustrates a holder assembly of the electronic equipment accessory of FIG. 19.
Figure 21:
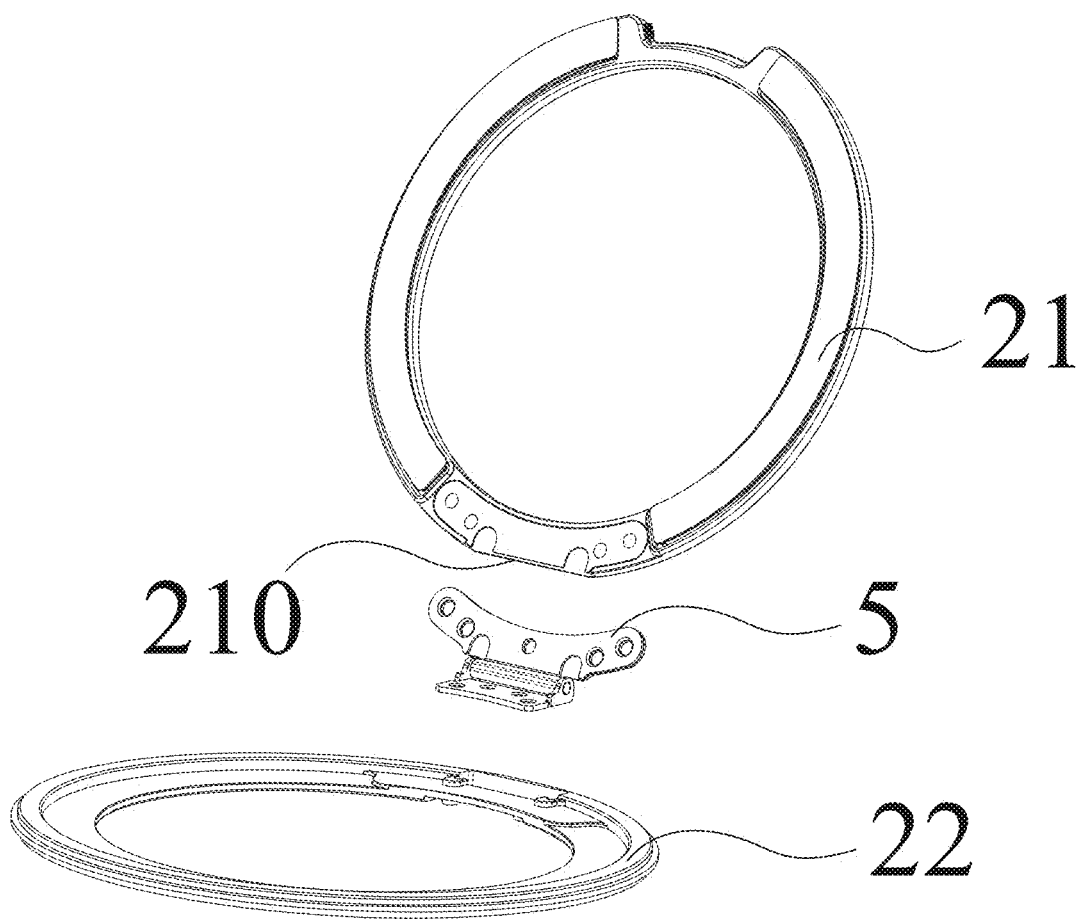
FIG. 21 is a schematic exploded view showing the holder assembly illustrated in FIG. 20.
Figure 22:
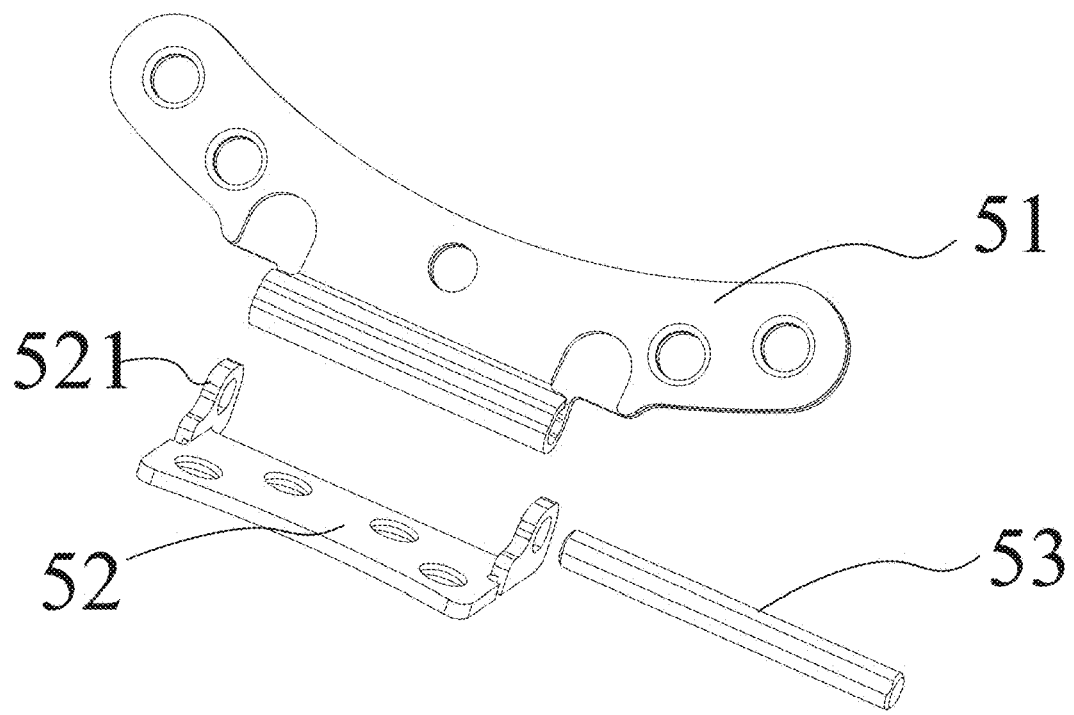
FIG. 22 is an exploded view showing a second connecting member illustrated in FIG. 21.

Referring to FIG. 19, in the instant embodiment, the electronic equipment accessory further comprises: an accessory body 1 and the holder assembly 2 of the previous embodiments, and the case is formed with a receiving compartment for receiving the electronic equipment, and the holder assembly 2 is connected to one side of the accessory body 1 that is opposite to the receiving compartment.

Referring jointly to FIG. 29, in the instant embodiment, the second mounting portion 52 is arranged on an underside of the base 22 and located between the base 22 and the accessory body 1, and compared with the solutions that the second mounting portion 52 is disposed on an upper side of the base 22, the connection of the second mounting portion 52 to the base 22 in the instant embodiment is made more stable, the second mounting portion 52 is not readily detached from the base 22. It is often that the accessory body 1 is of a plastic material, so that when the base 22 and the support member 21 are rotated relative to each other to the maximum angle, the accessory body 1 may cancel the acting force F3 on the base 22 at the position of the second reinforcement portion 241 to ensure the strength of the base 22.

Figure 30:
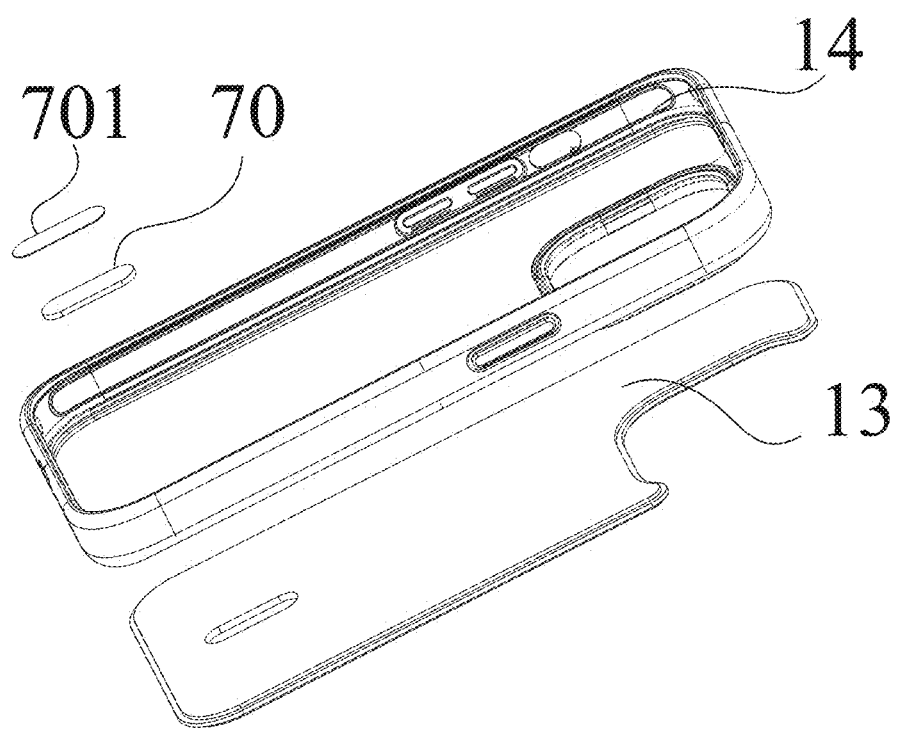
FIG. 30 is an exploded view showing an accessory body of the electronic equipment accessory illustrated in FIG. 19.
Figure 31:
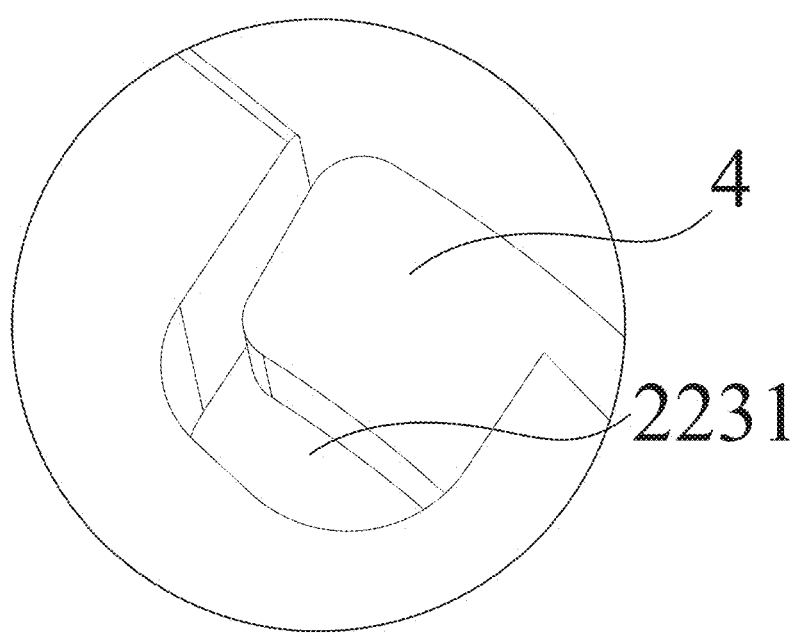
FIG. 31 is an enlarged view showing region F of FIG. 24.
Figure 32:
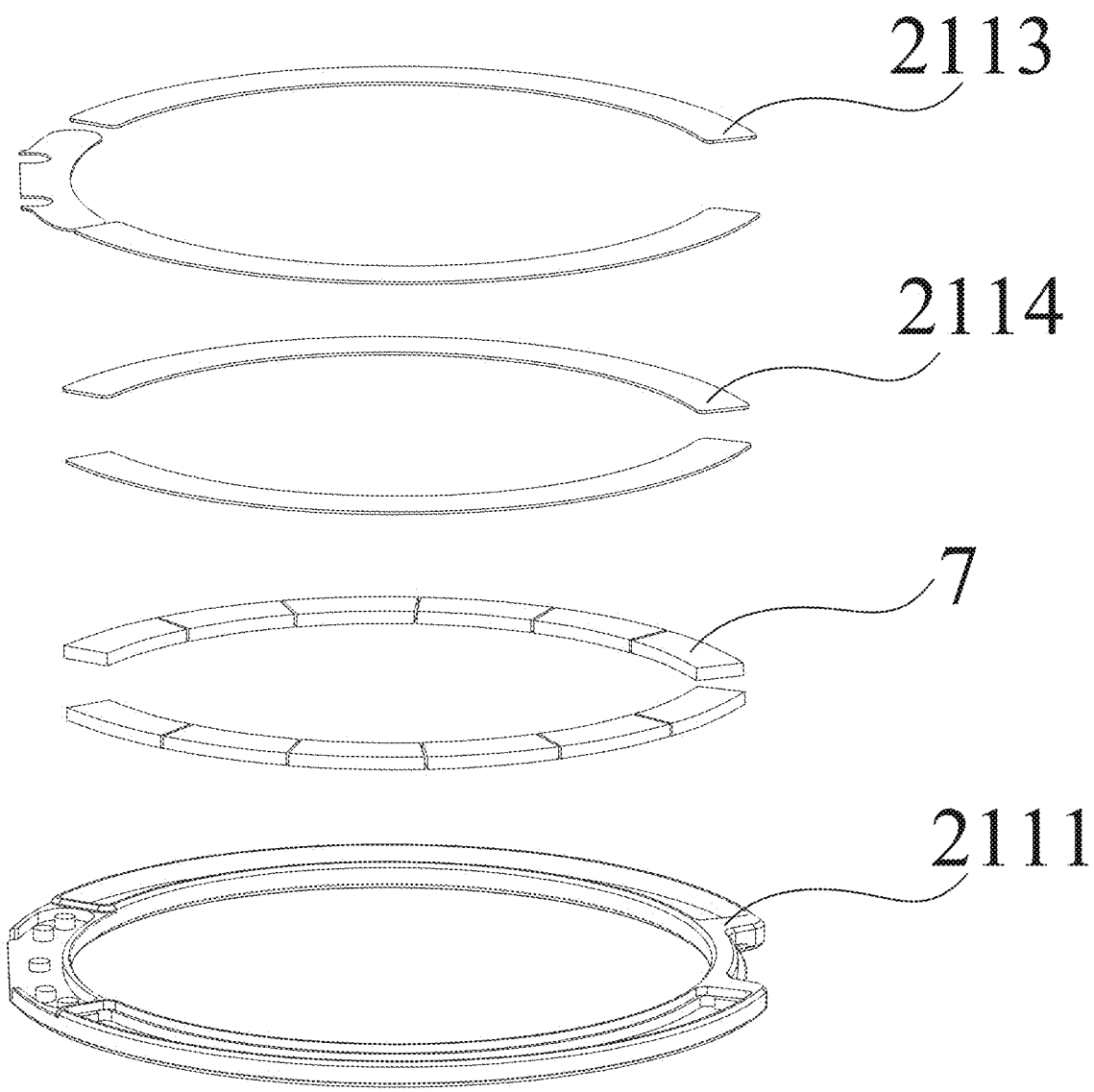
FIG. 32 is an exploded view showing a support member of FIG. 21.

Referring to FIGS. 30-32, the accessory body 1 comprises a back plate 13 and a side frame 14. The back plate 13 and the side frame 14 are fixedly connected to form a receiving compartment. The receiving compartment is shaped to conform to the electronic equipment, so that the accessory body 1 can be fit over the electronic equipment and to provide protection to the electronic equipment.

Further, the back plate 13 and the base 22 are fixedly connected, and the way of connection for the back plate 13 and the base 22 can adopt adhesive bonding and connecting with a connecting member. In the instant embodiment, a connecting member (such as a rivet) is adopted to connect the back plate 13 and the base 22. Compared with adhesive bonding, connecting with a connecting member is firmer and the holder assembly 2 is more difficult to detach from the accessory body 1.

Further, a retaining spring acting as the first connecting member 4 is used to connect the back plate 13 and the base 22, and the back plate 13 is formed with a concaved trough (for example, the accommodation trough 11 of the previous embodiments) to receive the holder assembly 2. The concaved trough is provided, on a wall surface thereof, with a groove (for example, the second retention groove 113 of the previous embodiments), and the base 22 is provided, corresponding to the groove, with a counterpart groove (for example, the first retention groove 223 of the previous embodiments), so that arranging the retaining spring in the groove and the counterpart groove may achieve a rotatable connection for the back plate 13 and the base 22 in the circumferential direction of the base 22 and fixed connection in the depth direction of the base 22, the structure being simple, and the connection strength being high.

Further, for easy detaching and servicing, detachment openings 2231 are arranged at two ends of the counterpart groove of the base 22, and the detachment openings 2231 adopt a straight surface design, and compared to an arc surface design, the straight surface design makes the retaining spring 4 not readily get jammed during a course of rotation of the holder assembly 2.

In the above, since the base 22 is often made of a metallic material, the back plate 13 is often made of a plastic material. During the course of rotation of the holder assembly 2, the base 22 causes wear and abrasion of the back plate 13. In the instant embodiment, a damper plate is adopted as the partition members 42 of the previous embodiments and provided between the base 22 and the back plate 13 to generate damping during the course of rotation of the holder assembly 2, in order to reduce wear and abrasion of the back plate 13 caused by the base 22. Further, the base 22 defines a recess and the partition members 42 are received in the recess.

It is noted that the above provides a description for the holder assembly 2 being connected by means of the base 22 to the accessory body 1, and the holder assembly 2 may be connected by means of the support member 21 to the accessory body 1, wherein the way of connecting and the corresponding structural design and the effect generated thereby are the same as those achieved with the holder assembly 2 being connected by means of the base 22 to the accessory body 1, and repeated description is omitted herein.

In the above, the material of the accessory body 1 can be an elastic material, which provides certain effect of buffering when the electronic equipment falls down, in order to reduce the damage rate of the electronic equipment. Preferably, the accessory body 1 uses a PC material, and the PC material has excellent impact resistance property and heat resistance property and may suit basic needs of the protection case.

To suit the need for wireless charging of the electronic equipment, in the instant embodiment, the structure of the electronic equipment protection case is further provided with a magnetic attraction device, in order to have a charging coil of the electronic equipment precisely positioned on the wireless charging device to ensure normal operation of wireless charging.

The magnetic attraction device comprises a magnetic attraction member 7 and a position correcting member 70. The position correcting member 70 is fixed on the back plate 13, and the position correcting member 70 is attractable by a magnetic element. The magnetic attraction member 7 is fixed on the holder assembly 2. Relative positioning between the electronic equipment and the wireless charging device is achieved with the magnetic attraction member 7, and subsequently, final positioning between the electronic equipment and the wireless charging device is achieved with the position correcting member 70.

To precisely positioning the wireless charging device, in the instant embodiment, the holder assembly 2 is of an annular structure, and the magnetic attraction member 7 also shows an annular form distributed in the interior of the holder assembly 2. The annular distributed magnetic attraction member 7 and the magnetic attraction member of the wireless charging device attract each other to thereby achieve relative positioning between the electronic equipment and the wireless charging device. It is noted that, the annular structure is only one of the structural designs of the holder assembly 2 and is not construed as limiting to the structure of the holder assembly 2.

To enhance product aesthetics and protection to surfaces of associated components, in the instant embodiment, the position correcting member 70 is provided, on a corresponding portion thereof, with a correcting member cover 701, and the magnetic attraction member 7 is provided, on a corresponding portion thereof, with a magnetism shielding member 2114. A surface of the support member 21 that is adjacent to the base 22 is provided with a support member cover 2113 (for example, the support member cover 2113 of the previous embodiments), and the arrangement of the support member cover 2113 not only provides an effect of aesthetics but also functions to cushion an impact force generated during closing the support member 21 and the base 22 on each other to thereby prevent the impact force from causing damage of the support member 21 and the base 22 and lowering noise of closing.

To easily operate the holder assembly 2, the instant embodiment further provides an ancillary opening in one end of the support member 21 that is distant from the first mounting portion 51 to allow the user to easily rotate the support member 21. Preferably, the ancillary opening is arranged in an arc form to more compliant to human finger and provide better comfortability.

Fifth Embodiment

Figure 33:
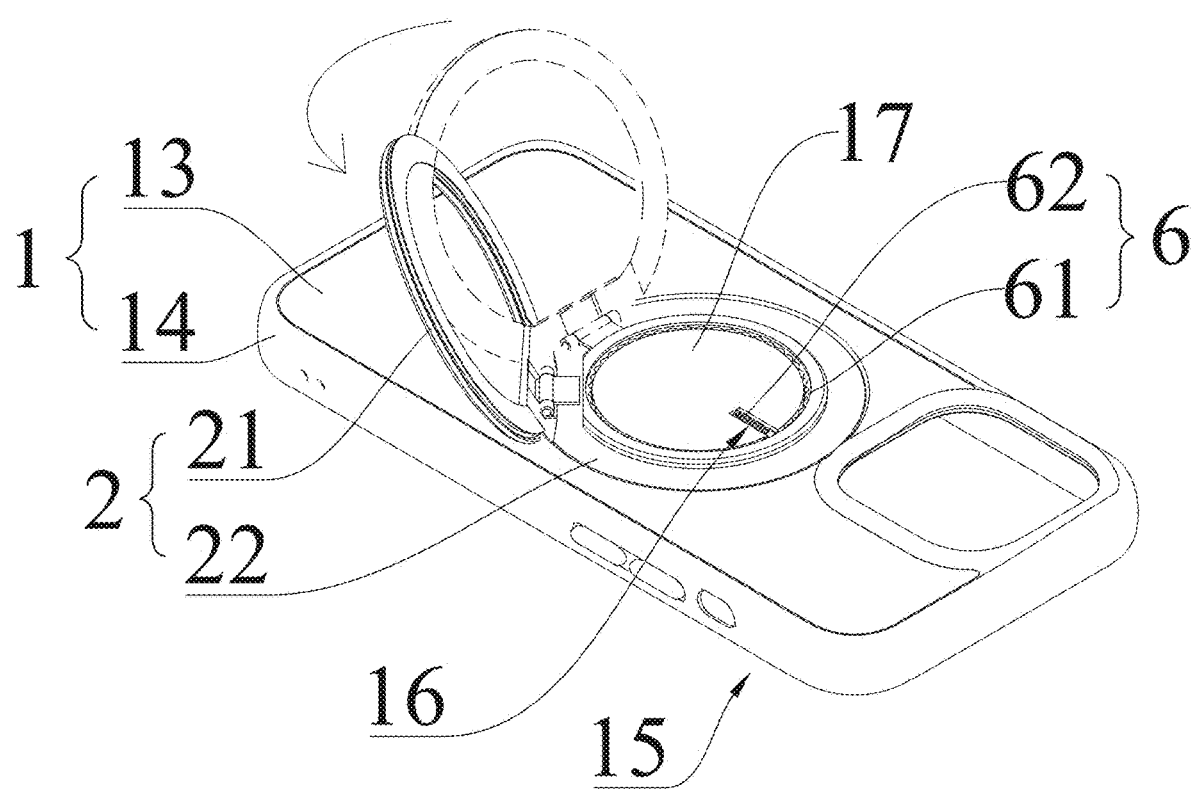
FIG. 33 illustrates a holder assembly of an electronic equipment accessory according to a fifth embodiment of the application rotating in a direction.
Figure 34:
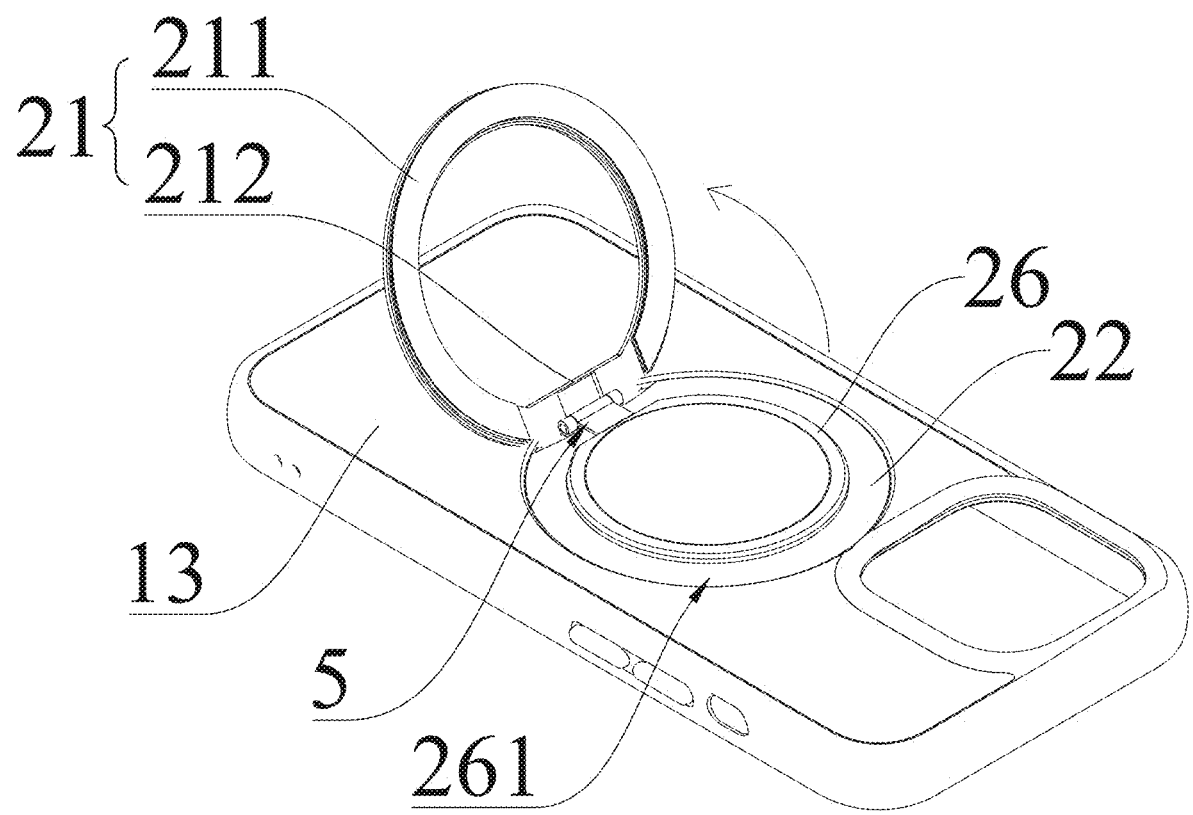
FIG. 34 illustrates the holder assembly of FIG. 33 rotating in another direction.
Figure 35:
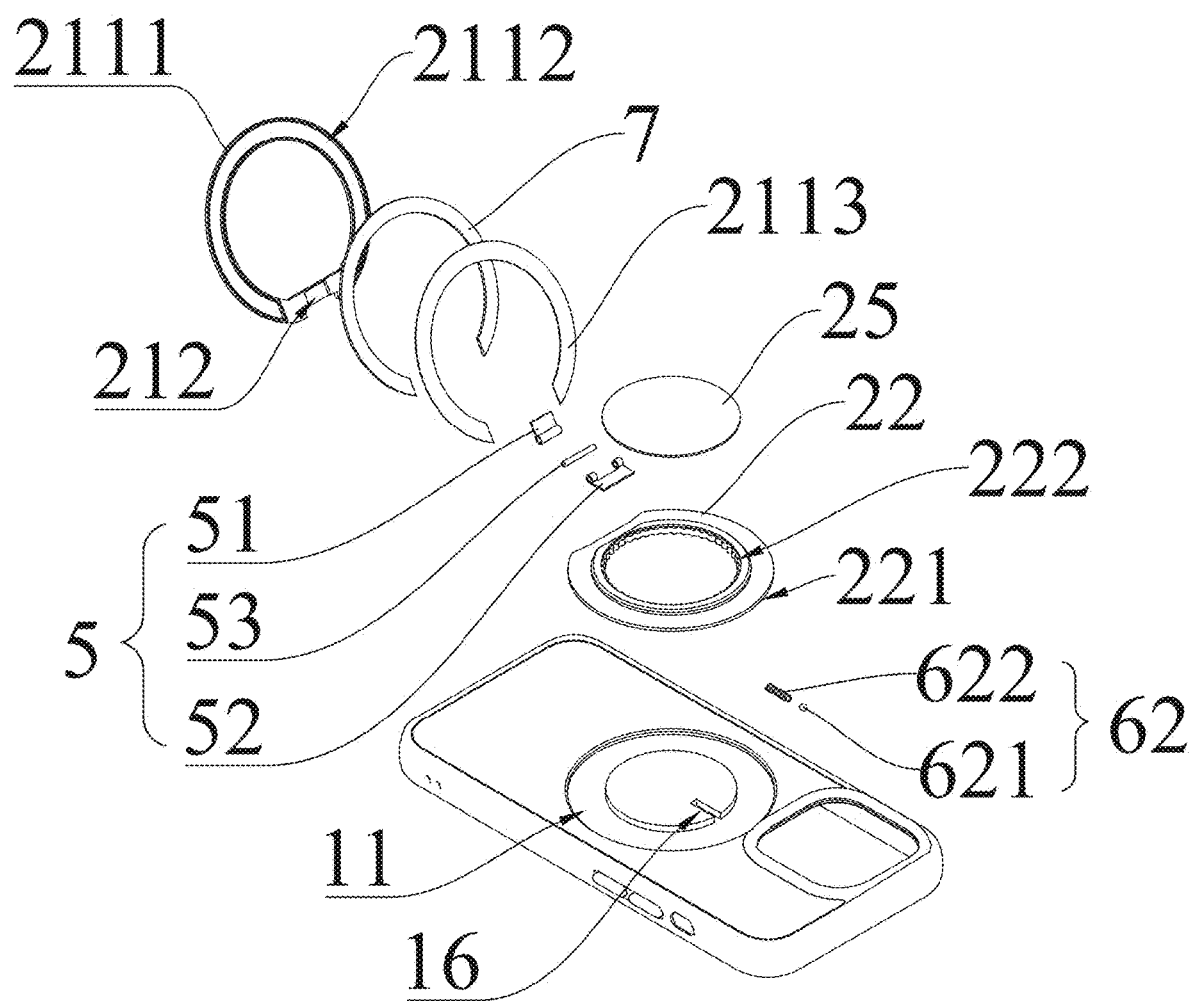
FIG. 35 is an exploded view showing the electronic equipment accessory illustrated in FIG. 33.
Figure 36:
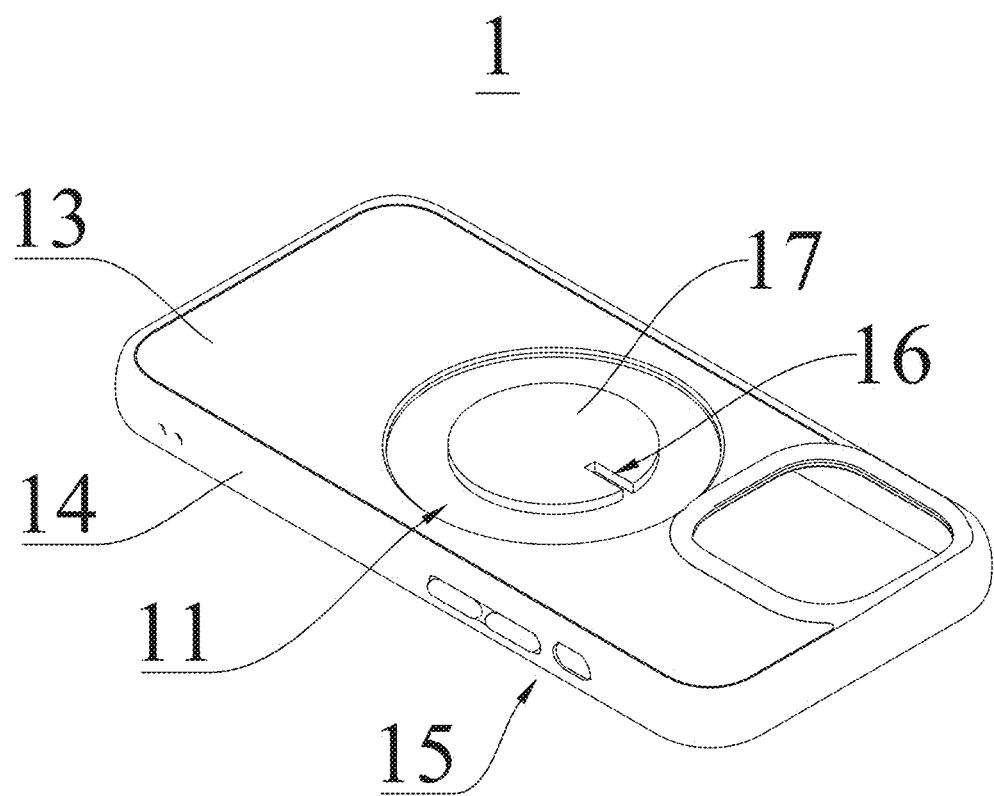
FIG. 36 illustrates an accessory body of the electronic equipment accessory of FIG. 35.

Referring to FIGS. 33 to 35, a fifth embodiment of the application provides an electronic equipment accessory, of which a main difference from the previous embodiments is that a positioning structure 6 is further included to locate between a holder assembly 2 and an accessory body 1. In the instant embodiment, the electronic equipment accessory is still illustrated by taking an electronic equipment protection case as an example. The electronic equipment accessory comprises a back plate 13, a side frame 14, a holder assembly 2, and a positioning structure 6. The back plate 13 and the side frame 14 surround and delimit a receiving compartment 15 for receiving a piece of electronic equipment therein. Further, the side frame 14 is further provided with, for example, recesses corresponding to a power button and a volume button of the electronic equipment and opening corresponding to a volume hole and a sound receiving hole, and the back plate 13 is provided with, for example, openings corresponding to camera lens and flashlight. The back plate 13 and the side frame 14 for example jointly form the accessory body 1 of the electronic equipment accessory. One side of the back plate 13 that is opposite to the receiving compartment 15 is formed with an accommodation trough 11 and a positioning part mounting trough 16, which are specifically recessed from the surface that is distant from the receiving compartment 15 in a direction toward the receiving compartment 15, for example. The positioning part mounting trough 16 and the accommodation trough 11 are in communication with each other. The accommodation trough 11 is arranged, for example, at a center position of the accessory body 1. The accommodation trough 11 can be for example a circular closed ring. A raised platform 17 is correspondingly formed in a middle of the accommodation trough 11. The positioning part mounting trough 16 can be for example a slit-like groove, and one end of the slit-like groove is connected to one of an inner joining surface 222 and an outer joining surface 221, namely the positioning part mounting trough 16 is arranged in the raised platform 17, or in a portion of the back plate 13 other than the raised platform 17.

The holder assembly 2 is arranged in the accommodation trough 11. The holder assembly 2 comprises a base 22 and a support member 21. The positioning structure 6 comprises a position-limiting part 61 and a positioning part 62. The base 22 is rotatably connected to the back plate 13 and is rotatable in the accommodation trough 11. Namely, the holder assembly 2 is rotatable about the raised platform 17 by 360°, and a user may rotate the holder assembly 2 to a desired direction according to the need of operation. The support member 21 is rotatably connected to the base 22, and is rotatable in a direction of being close to or away from the back plate 13. The support member 21 is specifically rotatable relative to the base 22 in the direction of the arrow depicted in FIG. 34. It is envisioned that the base 22 is rotatable relative to the position-limiting part 61 in the direction of the arrow depicted in FIG. 33. Applying a push force to the base 22 may drive the base 22 to rotate in the accommodation trough 11; or twisting the support member 21 that is rotated away from the base 22 may drive the base 22 to rotate in the accommodation trough 11. A support direction of the support member 21 is variable with change of the position where the second connecting member 5 is located.

Figure 38:
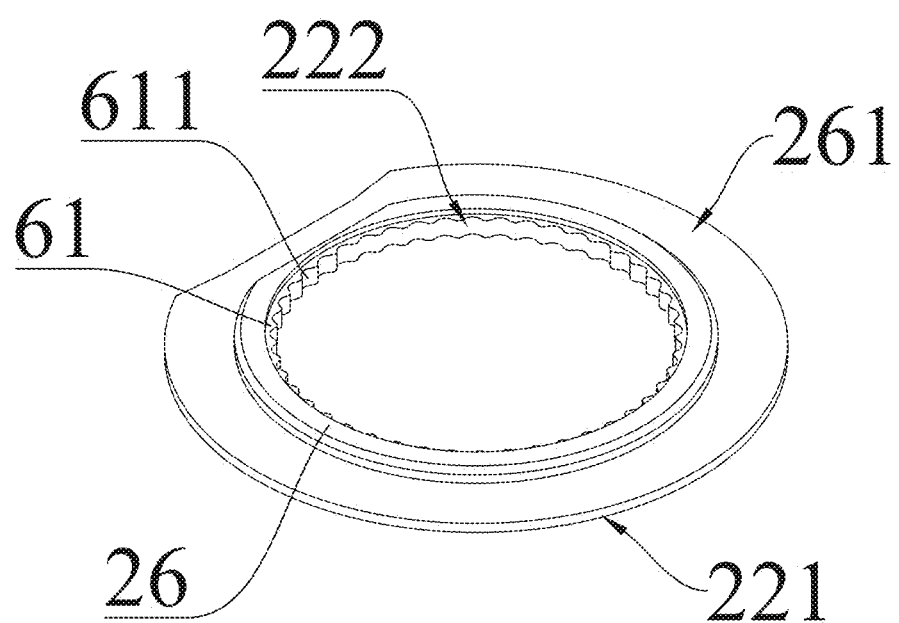
FIG. 38 illustrates a base of the electronic equipment accessory of FIG. 35.
Figure 39:
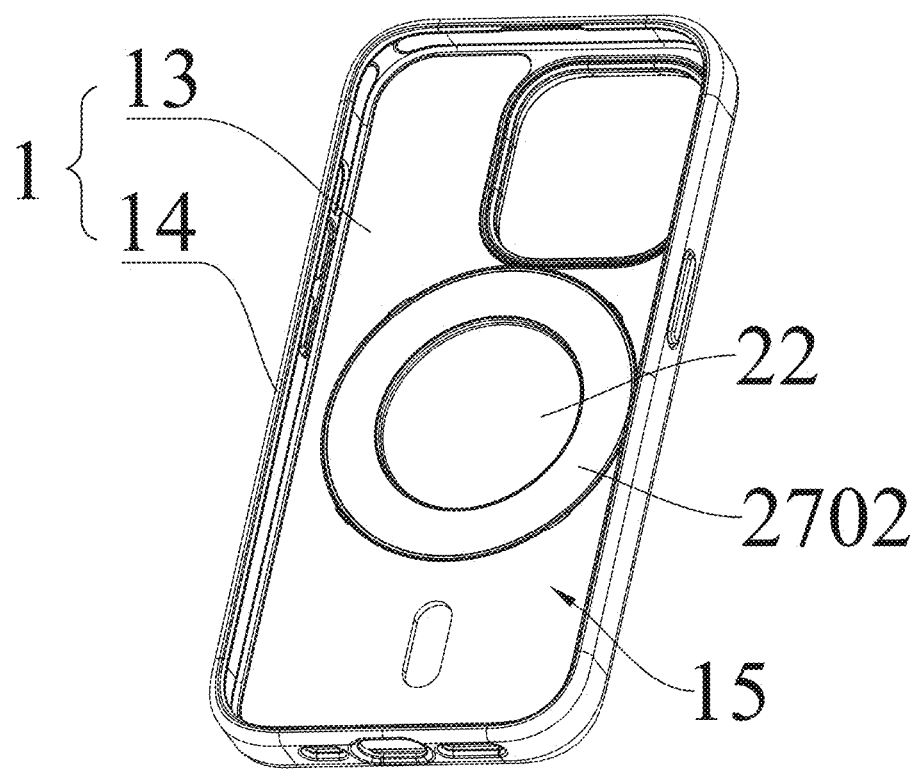
FIG. 39 illustrates an electronic equipment accessory according to a sixth embodiment of the application.
Figure 40:
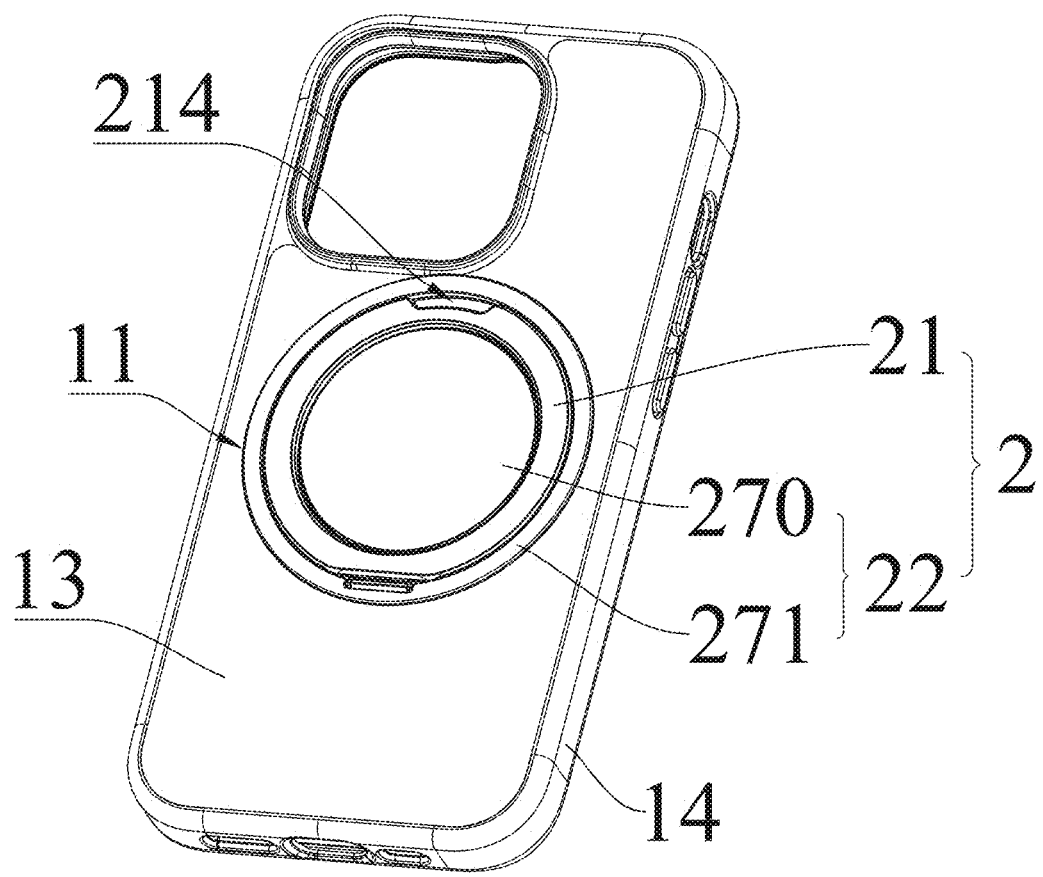
FIG. 40 illustrates the electronic equipment accessory of FIG. 39 at another viewing angle.

In one embodiment, the position-limiting part 61 is arranged on the base 22, and one end of the positioning part 62 is disposed in the positioning part mounting trough 16, while an opposite end of the positioning part 62 is in elastic abutting against the position-limiting part 61. Further, the positioning part 62 comprises, for example, an elastic portion 622 and a positioning portion 621. One end of the elastic portion 622 is disposed in the positioning part mounting trough 16, and an opposite end is provided with the positioning portion 621. The positioning portion 621 abuts against the position-limiting part 61. The elastic portion 622 is a device of elasticity that is extendible/retractable, which can specifically be, for example a spring. One end of the spring is supported on a trough surface of the positioning part mounting trough 16 that is distant from the holder assembly 2 to provide a force to the positioning portion 621 to make the positioning portion 621 abut against the position-limiting part 61. In a natural state, the spring has a length that is greater than a length of the positioning part mounting trough 16. As shown in FIG. 38, the position-limiting part 61 comprises a plurality of position-limiting notches 611 which are distributed in a circumferential direction surrounding the base 22. The position-limiting part 61 is provided with a plurality of position-limiting notches 611 so that angles at which the holder assembly 2 can be held are also plural. Specifically, the positioning portion 621 can be for example a spherical bead. The position-limiting part 61 can specifically comprises for example a plurality of arch-shaped notches. The arch-shaped notches and the spherical bead are mateable with each other. The position-limiting part 61 has a shape matching a shape of and the positioning portion 621. Arc transition connects between the plurality of notches of the position-limiting part 61 to ease movement of the positioning portion 621 between the plurality of notches. In other embodiments, the plurality of position-limiting notches 611 can be for example arc notches, and each arc notch extends from one side adjacent to the back plate 13 in a direction away from the back plate 13.

Figure 37:
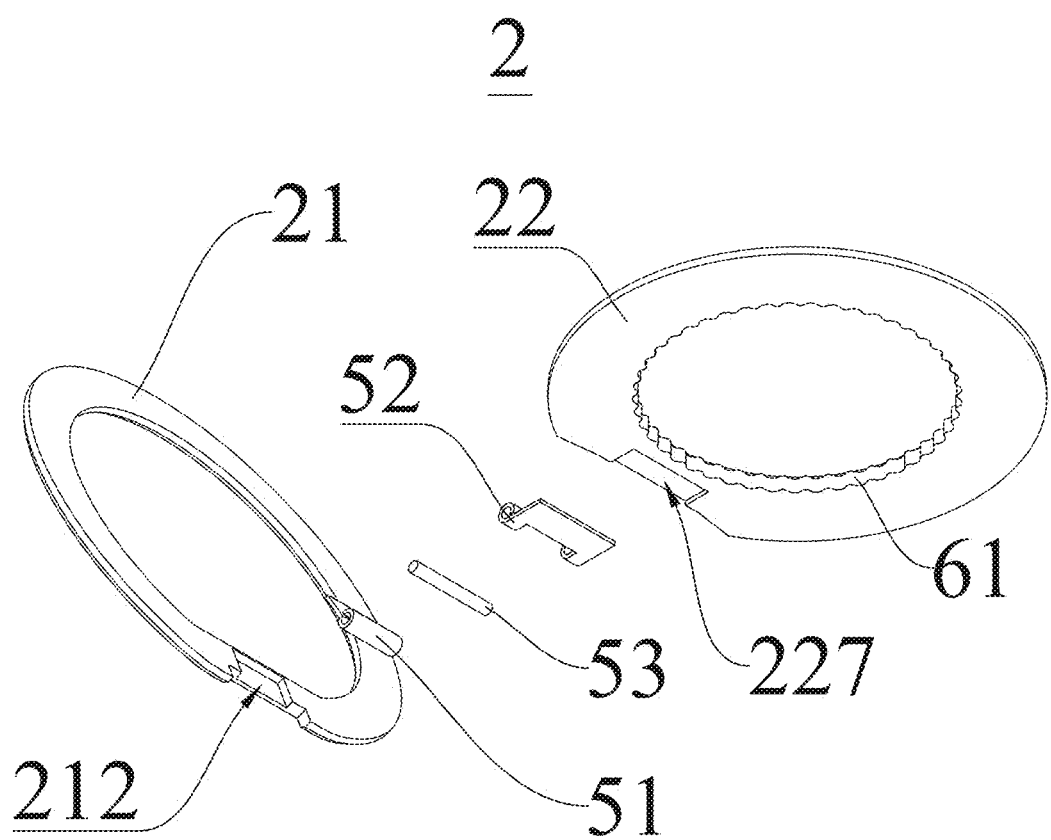
FIG. 37 is an exploded view showing a holder assembly illustrated in FIG. 35.

Further, as shown in FIGS. 37 and 38, the base 22 comprises an inner joining surface 222 and an outer joining surface 221 that are opposite to each other. The position-limiting part 61 is arranged, for example, on the inner joining surface 222, and the positioning part mounting trough 16 is arranged at one side of the position-limiting part 61 that is distant from the base 22, namely the positioning part mounting trough 16 is arranged in the raised platform 17. In the instant embodiment, the number of the positioning part mounting trough 16 is one, and is in communication with the inner joining surface 222. In other embodiments, the positioning part mounting trough 16 can be plural ones uniformly distributed in a circumferential direction surrounding the inner joining surface 222, and each positioning part mounting trough 16 is provided with a positioning part 62 arranged therein. Arranging a plurality of positioning parts 62 allows the holder assembly 2 to be fastened in a more secured way, and the uniform arrangement of the positioning parts 62 makes the forces applied on the holder assembly 2 by the positioning parts 62 uniformly distributed.

Further, the holder assembly 2 further comprises, for example, a raised platform cover plate 25 arranged at one side of the base 22 that is distant from the accessory body 1 to cover and enclose the raised platform 17, making the positioning part 62 in the positioning part mounting trough 16 not falling out. The combination arrangement of the positioning part mounting trough 16 and the raised platform cover plate 25 eases mounting or replacing the positioning part 62.

Further, as shown in FIG. 35, the base 22 comprises an inner joining surface 222 and an outer joining surface 221 that are opposite to each other, and the holder assembly 2 further comprises a second connecting member 5. The second connecting member 5 is arranged adjacent to the outer joining surface 221. The second connecting member 5 connects the base 22 and the support member 21. The second connecting member 5 comprises, for example, a second mounting portion 52, a first mounting portion 51, and a pivot axle 53. The base 22 is formed with, for example, a mounting trough 227, and the support member 21 is provided with a support connecting portion 212. The second mounting portion 52 is inserted into the mounting trough 227, and the first mounting portion 51 is inserted into the support connecting portion 212, and the second mounting portion 52 and the first mounting portion 51 are rotatably connected by the pivot axle 53. The pivot axle 53 is provided with, for example, a damping portion/layer, and the support member 21 is hinged by the damping-included pivot axle 53 to the base 22, so that the support member 21, once rotated by the user to a desired angle, can support the electronic equipment without easily causing further rotation.

As shown in FIG. 35, the support member 21 has a support member body portion 211 that comprises a support member housing 2111 and a support member cover 2113. The support member housing 2111 is formed therein with an annular groove 2112. The holder assembly 2 further comprises a magnetic attraction member 7, and the magnetic attraction member 7 is disposed in the annular groove 2112. The magnetic attraction member 7 functions to, for example, magnetically attract an electronic equipment charger device. The magnetic attraction member 7 can specifically be, for example, an iron plate or a magnet ring. The annular groove 2112 can be for example an annular groove that is recessed from one side that is adjacent to the base 22 in a direction away from the base 22. The magnetic attraction member 7 can be for example an annular structure having a cutoff opening. The arrangement of the cutoff opening makes the magnetic attraction member 7 not affect the charging function of the electronic equipment wireless charging device for the electronic equipment. Further, the support member cover 2113 is arranged at one side of the support member 21 that is adjacent to the base 22 to cover the magnetic attraction member 7 disposed in the annular groove 2112 so as to make the magnetic attraction member 7 stacked between the support member housing 2111 and the support member cover 2113 not falling out and to keep the outside appearance of the holder assembly 2 consistent during a course of use. The support member cover 2113 can specifically be, for example, a Mylar plate adhesively bonded with and fixed to the support member housing 2111 or the magnetic attraction member 7. In the instant embodiment, the support member 21 is of a plastic material, and the support member body portion 211 and the support member connecting portion 212 are integrally formed together.

In one embodiment, the support member 21 can be for example a metallic material, and the magnetic attraction member 7 is omitted. The support member 21 is of an annular form having a cutoff opening. The support member 21 is arranged as an annular structure having a cutoff opening. The arrangement of the cutoff opening makes the metallic material made support member 21 not affect the charging function of an electronic equipment wireless charging apparatus for the electronic equipment.

As shown in FIGS. 34 and 35, the holder assembly 2 further comprises, for example an annular raised platform 26 arranged at one side of the base 22 that is distant from the accessory body 1 and adjacent to the inner joining surface 222. The combination of the annular raised platform 26 and the base 22 forms an enclosed space 261, and the support member 21 can be retained on the annular raised platform 26 in the enclosed space 261. The design of the enclosed space 261 in combination with the arrangement of damping of the pivot axle 53 makes the support member 21 be kept in the enclosed space 261, without oscillating with the electronic equipment, when the holder assembly 2 is not put in use.

In summary, the electronic equipment accessory provided in the instant embodiment comprises the holder assembly that is rotatable to provide support of multiple directions and multiple angles to the electronic equipment; and the positioning structure that includes the elastic member is arranged in the electronic equipment accessory, while a position-limiting structure is provided on the holder assembly to make the holder assembly be rotatably connected to the accessory body and combined together in a compact form; and the magnetic attraction member is arranged in the holder assembly to help attract a wireless charging and fix the electronic equipment.

Sixth Embodiment

Referring to FIGS. 39-47, a sixth embodiment of the application provides an electronic equipment accessory which is similar to the electronic equipment accessory of the fourth embodiment. The main difference from the fourth embodiment is that the structure of the base 22 and the first connecting member 4 are made different. In the instant embodiment, the electronic equipment accessory is still illustrated by taking an electronic equipment protection case as an example. The electronic equipment accessory comprises an accessory body 1 and a holder assembly 2. The accessory body 1 comprises a back plate 13 and a side frame 14. The side frame 14 is connected to an outer circumference of the back plate 13 and circumferentially surrounds, in combination with the back plate 13, to form a receiving compartment 15 for receiving a piece of electronic equipment, such as a mobile phone and a tablet. The back plate 13 is formed, in a manner of penetrating therethrough, with an accommodation trough 11 in communication with the receiving compartment 15. In the instant embodiment, the accommodation trough 11 is a mounting hole penetrating through the back plate 13. The holder assembly 2 is mounted in the accommodation trough 11. The holder assembly 2, after being rotated relative to the back plate 13 by a predetermined angle, achieves an effect of supporting to support the electronic equipment on a support surface, such as a desktop, in either a horizontal direction or a vertical direction so as to free the two hands of the user. Further, arranging the holder assembly 2 in the accommodation trough 11 of the back plate 13 may reduce the overall thickness of the accessory body 1 to prevent the thickness of the accessory body 1 from getting excessively large to thereby affect holding and gripping by the user. The back plate 13 and the side frame 14 can be integrally formed together, or can be separately formed and assembled together. In the instant embodiment, the back plate 13 and the side frame 14 are separately formed and assembled together.

The holder assembly 2 comprises a support member 21 and a base 22. The base 22 is located in the accommodation trough 11 and is connected to the back plate 13. The support member 21 is rotatably connected to the base 22 via a second connecting member 5 shown in FIG. 22. After the support member 21 is rotated a predetermined angle relative to the base 22, the support member 21 and the back plate 13 form an included angle therebetween and the support member 21 can then support the back plate 13 and the side frame 14 to achieve an effect of supporting the electronic equipment. Further, in the instant embodiment, the support member 21 is a magnetically-attracting support member that has a magnetic attraction capability/function, and thus, the accessory body 1 can be used in combination with a wireless charging device having a magnetic attraction function or a magnetically-attracting vehicle-carrying holder.

An overall thickness of the holder assembly 2 is not specifically limited, and in the instant embodiment, the thickness of the holder assembly 2 is generally 3 mm, and the side that is distant from the receiving compartment 15 is flush with one side of the back plate 13 that is distant from the receiving compartment 15, or slightly protrudes out of the side of the back plate 13 that is distant from the receiving compartment 15, in order to prevent excessively protruding out of the back plate 13 to affect holding and gripping by the user, and also to reduce influence on wireless charging.

Figure 41:
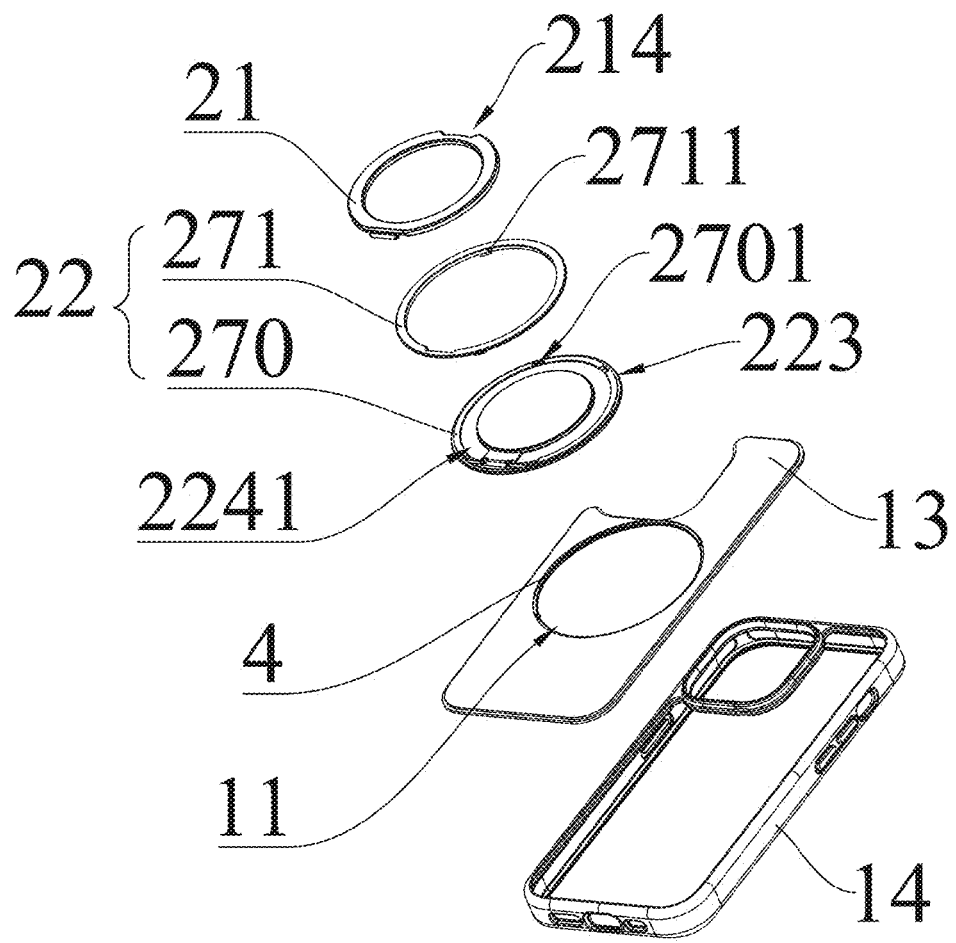
FIG. 41 is an exploded view showing the electronic equipment accessory illustrated in FIG. 39.
Figure 42:
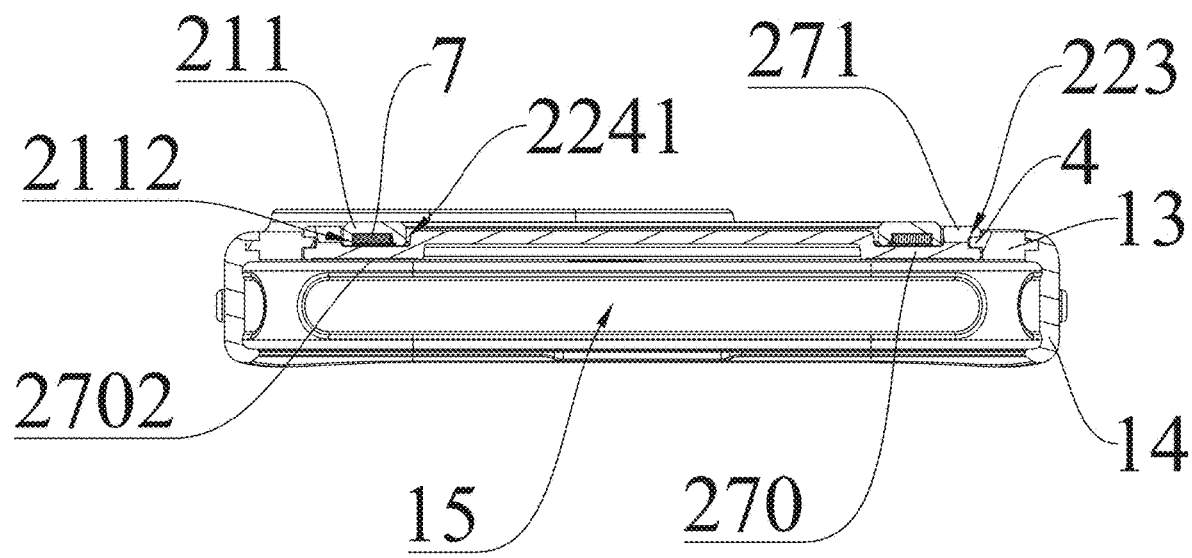
FIG. 42 is a cross-sectional view showing the electronic equipment accessory illustrated in FIG. 39.

As shown in FIGS. 41 and 42, the base 22 comprises a base body 270 and a base cover 271. The base cover 271 is connected to one side of the base body 270 that is distant from the receiving compartment 15. The accommodation trough 11 has an internal wall that is provided with a first connecting member 4. The first connecting member 4 extends in a circumferential direction of the accommodation trough 11, and the first connecting member 4 is sandwiched between the base body 270 and the base cover 271. In the instant embodiment, the first connecting member 4 and the internal wall of the accommodation trough 11 are arranged to be fixedly connected or integrally formed together. The base body 270 abuts one side of the first connecting member 4 that is adjacent to the receiving compartment 15, and the base cover 271 abuts one side of the first connecting member 4 that is distant from the receiving compartment 15, so as to form a sandwich structure to have the first connecting member 4 sandwiched between the base body 270 and the base cover 271. With the base body 270 and the base cover 271 being connected together, the first connecting member 4 is capable of providing a position limiting effect for the base 22 to thereby enhance the stability of the base 22 and reducing the risk that the base 22 detaches from the accommodation trough 11.

In one embodiment, the base body 270 and the base cover 271 are both made of plastics, meaning both of the base body 270 and the base cover 271 are plastics-made components. Compared to the magnetic attraction member 7, the plastics-made components help prevent the base 22 from affecting wireless charging performance, and also help avoid generating eddy current effect during the course of wireless charging.

The base body 270 is made of a transparent material. The base cover 271 shows an annular form and is connected to the base body 270 at a position adjacent to an edge thereof. When a logo or other pattern of the electronic equipment is positioned at a location covered by the base body 270, the base body 270 will not make the logo or a corresponding pattern invisible.

The specific way of connection between the base body 270 and the base cover 271 is not limited and can be, for example, fixing by means of welding and adhesives, or connecting with a connecting member. In the instant embodiment, the base body 270 and the base cover 271 are fixed together through fusion by means of ultrasonic welding. For example, a projection is formed on the base body 270, and a recess is defined in the base cover 271. With the projection being inserted into the recess, high frequency ultrasonic vibration induced in a fixture/tool can cause rubbing between the two to increase temperature and thus heating and melting the two, so that the projection of the base body 270 and the recess of the base cover 271 are fused together to have the base body 270 and the base cover 271 fixed together. The ultrasonic heat-melting welding measure ensures the connection strength between the base body 270 and the base cover 271, reducing the risk of separation between the base body 270 and the base cover 271 to thereby reduce the risk that the base 22 detaching from the accommodation trough 11.

Figure 44:
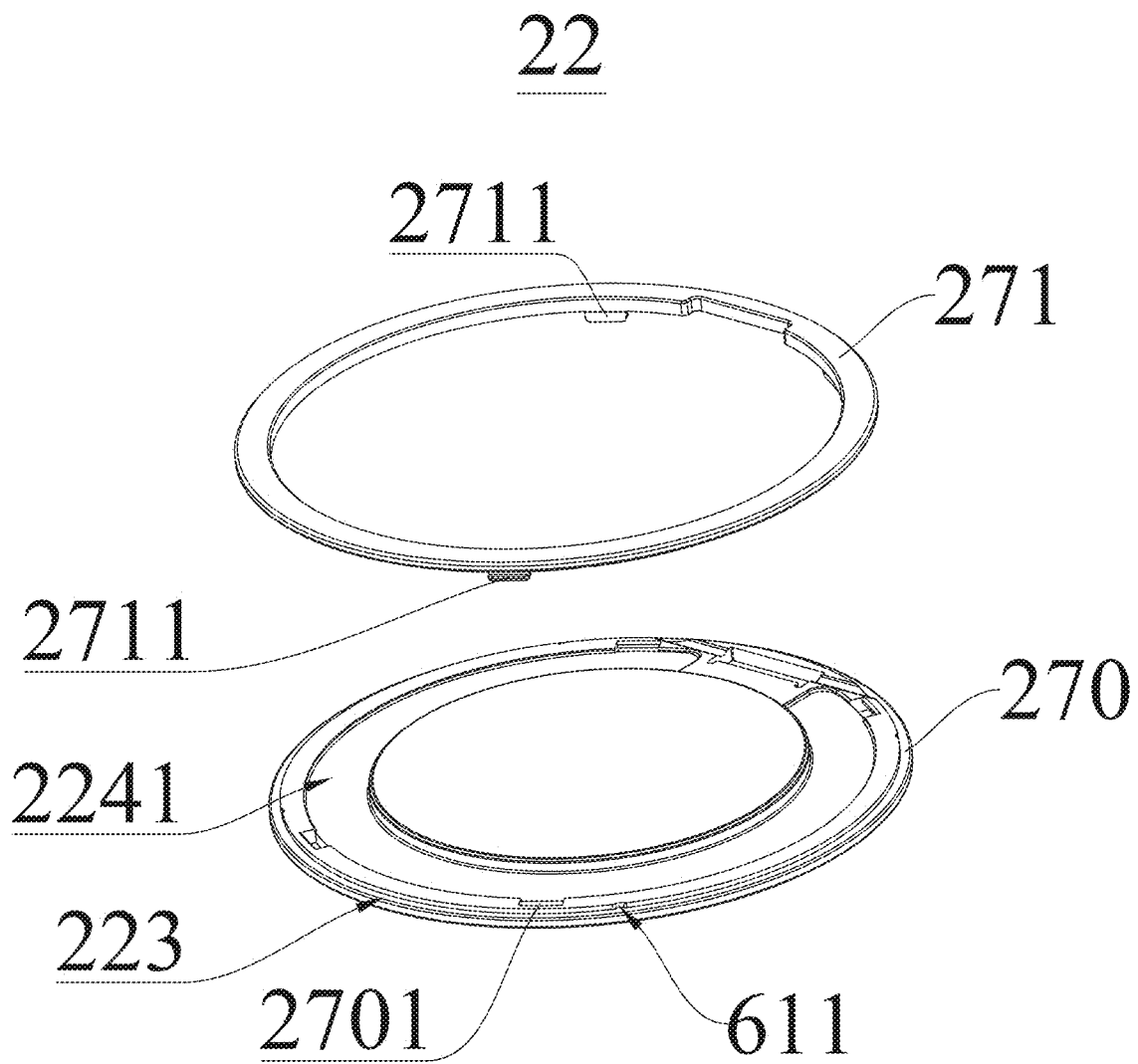
FIG. 44 is a schematic exploded view showing a base body and a base cover illustrated in FIG. 43.
Figure 45:
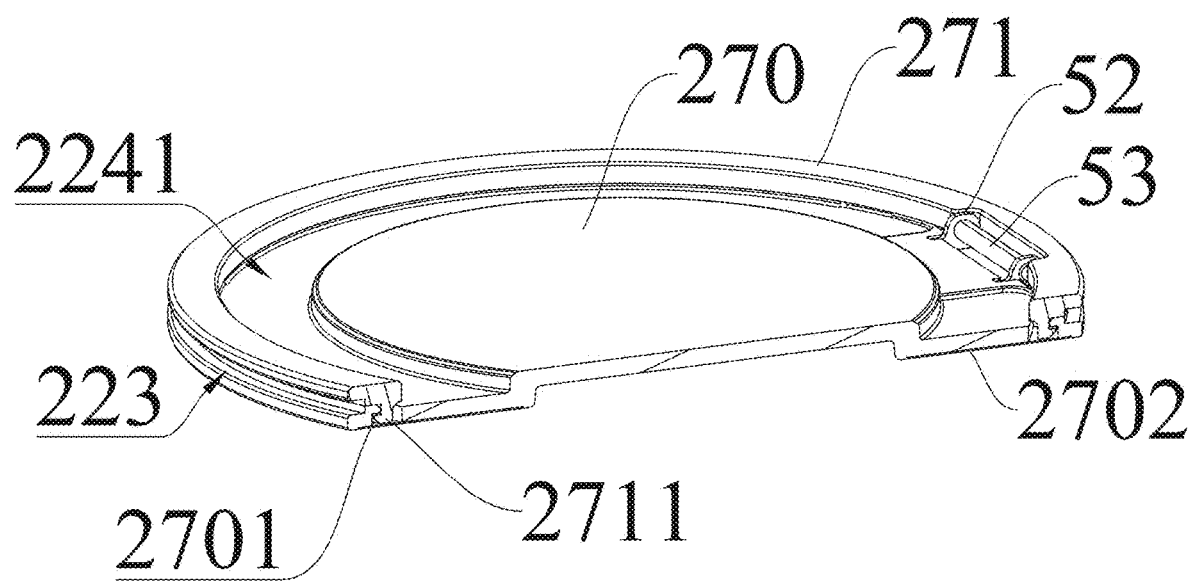
FIG. 45 is a cross-sectional view showing a base illustrated in FIG. 43.

Referring to FIGS. 44 and 45, in one embodiment, alignment structures, which collaborate with each other, are arranged between the base body 270 and the base cover 271. The alignment structures provide an effect of positional alignment between the base cover 271 and the base body 270, in order to fast identify and align corresponding positions of the base body 270 and the base cover 271 before the implementation of the welding operation.

The alignment structures are not limited to a specific form, and in the instant embodiment, the alignment structures comprise one or multiple retaining hooks 2711 arranged on the base cover 271 and one or multiple alignment holes 2701 correspondingly formed in the base body 270. The alignment hole 2701 is generally of a stepped form, and the retaining hook 2711 is inserted into the corresponding alignment hole 2701 to get hooked on an internal wall of the alignment hole 2701. Arranging the retaining hook 2711 and the alignment hole 2701 that collaborate with each other not only provides an effect of positional alignment for the base body 270 and the base cover 271 to enable fast identify and align the corresponding positions of the base body 270 and the base cover 271, but also provides a certain effect of position limitation to the base body 270 and the base cover 271 to prevent relative movement between the base body 270 and the base cover 271 during the welding operation.

In other embodiments, it is also feasible to arrange the retaining hook 2711 on the base body 270, while the alignment hole 2701 is correspondingly formed in the base cover 271.

The retaining hook 2711 and the alignment hole 2701 are not limited to any specific number, which can be one or plural. In the instant embodiment, the numbers of the retaining hook 2711 and the alignment hole 2701 are four, and the four retaining hooks 2711 are arranged, at intervals, in a circumferential direction around the base cover 271, and the four alignment holes 2701 are arranged, at intervals, in a circumferential direction around the base body 270, and each of the retaining hooks 2711 is inserted into a corresponding one of the alignment holes 2701 to further enhance the effect of positioning and position limiting.

Figure 43:
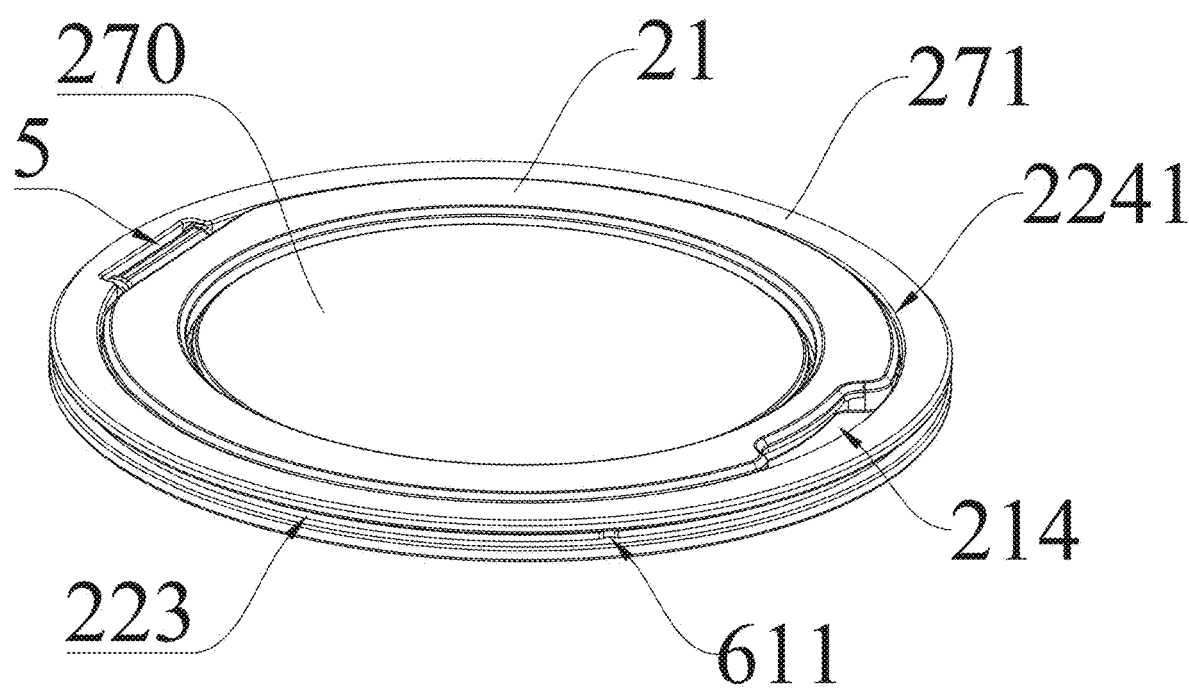
FIG. 43 illustrates a holder assembly of the electronic equipment accessory of FIG. 40.

As shown in FIGS. 42 and 43, in one embodiment, concave troughs are respectively formed in one side of the base body 270 that is adjacent to the base cover 271 and one side of the base cover 271 that is adjacent to the base body 270, namely two sides of the base body 270 and the base cover 271 that face each other, to jointly form a first retention groove 223. The first connecting member 4 is received in the first retention groove 223. The concave troughs of the base body 270 and the base cover 271 are communicated with each other to cooperatively become the first retention groove 223 that is of an annular form, and the first connecting member 4 is received in the annular groove to facilitate improving compactness of the entire structure.

In other embodiments, it is also feasible to form the first retention groove 223 only in the side of the base body 270 that is adjacent to the base cover 271 or the side of the base cover 271 that is adjacent to the base body 270.

It is appreciated that the base 22 and the back plate 13 can be fixedly connected or rotatably connected. In the instant embodiment, the first connecting member 4 is rotatably inserted into the first retention groove 223 to allow the base 22 to rotatably mount in the accommodation trough 11. The base 22 is rotatable relative to the back plate 13, and drives the support member 21 to rotate together relative to the back plate 13 during the course of rotation, in order to adjust the relative position of the support member 21 to achieve different supporting effects.

The first connecting member 4 and an internal wall of the first retention groove 223 are provided with positioning structures 6 that collaborate with each other. After the base 22 is rotated relative to the back plate 13 for a predetermined angle, the positioning structures 6 provide a positioning effect to the base 22 to have the base 22 held in such a position for enhancing stability of the base 22 and reducing the risk that the base 22 autonomously rotates relative to the back plate 13 to thereby enhance stability of the support member 21 in the course of supporting.

Figure 46:
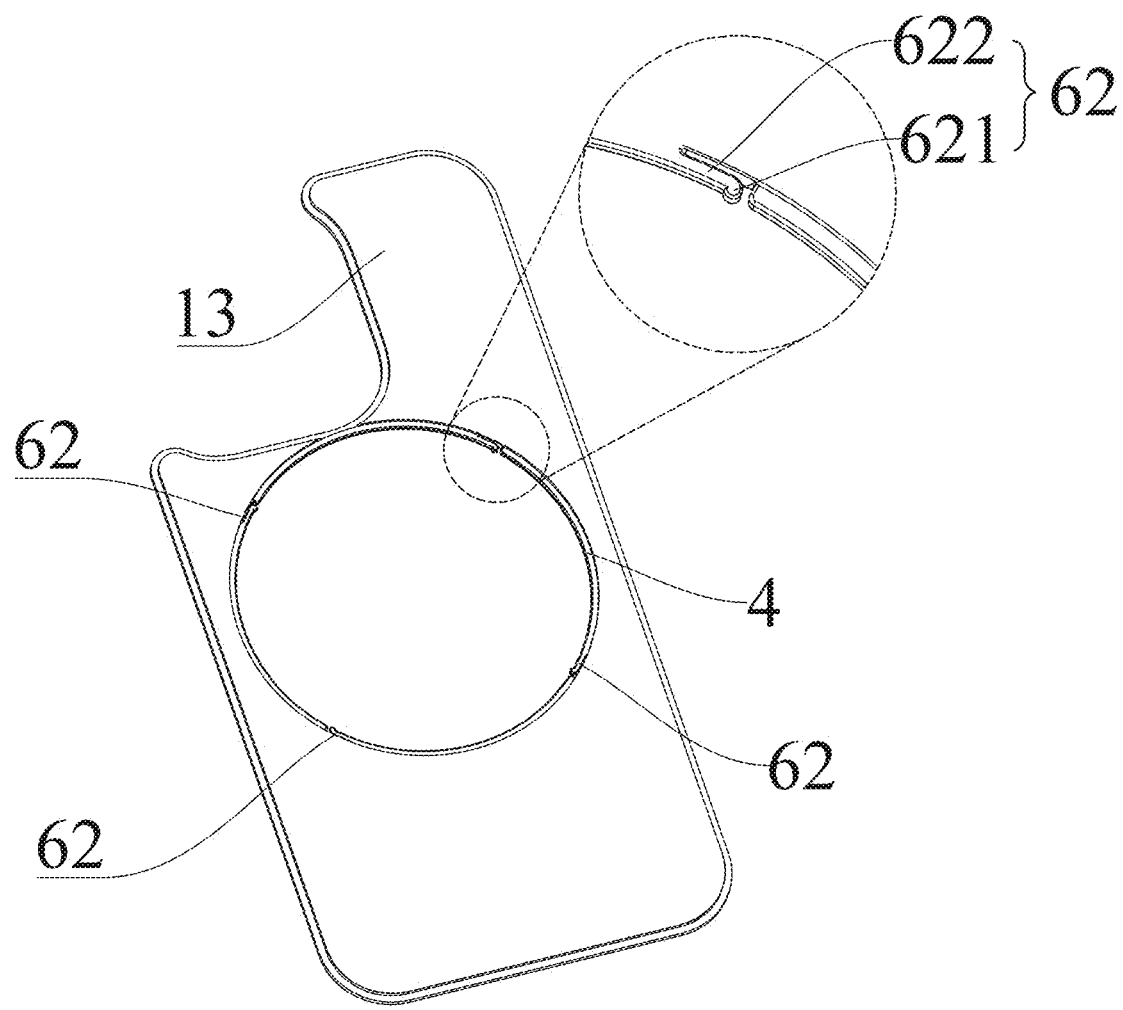
FIG. 46 illustrates a back plate of FIG. 41.

Referring to FIGS. 42, 43, and 46, the positioning structures 6 are not limited to any specific form, and in the instant embodiment, the positioning structures 6 comprise a positioning part 62 and a position-limiting part. The position-limiting part comprises a positioning hole 611 (for example, the position-limiting notch 611 of the previous embodiments), the positioning part 62 comprises an elastic arm 622 connected to the first connecting member 4 and a positioning block 621 formed on the elastic arm 622. The positioning block 621 and the elastic arm 622 can be, for example, the positioning portion 621 and the elastic portion 622 of the other embodiments, respectively. The positioning hole 611 is correspondingly formed in an internal wall of the first retention groove 223 to receive the positioning block 621 to hook up therein. The elastic arm 622 is extended in a circumferential direction of the first retention groove 223, and the elastic arm 622 has one end connected with the first connecting member 4 and an opposite end connected to the positioning block 621. The elastic arm 622 has certain elasticity, which may enable deformation. When the base 22 is rotated relative to the back plate 13, the internal wall of the first retention groove 223 compresses the positioning block 621 to cause deformation of the elastic arm 622, and when the positioning block 621 is moved to the site of the positioning hole 611, the compression that the internal wall of the first retention groove 223 applies to the positioning block 621 vanishes, and the elastic arm 622, under its own elastic effect, restores to the original state to have the positioning block 621 moved to and engaged in the positioning hole 611 to achieve an effect of retaining engagement, thereby fulfilling a certain effect of positioning for the base 22 in the circumferential direction to hold the base 22 at such a position for reducing the risk that the base 22 autonomously rotates relative to the back plate 13.

In other embodiments, it is also feasible to provide the positioning part 62 on the internal wall of the first retention groove 223, while the positioning hole 611 is correspondingly formed in the first connecting member 4. Under such a condition, the elastic arm 622 of the positioning part 62 is connected to the internal wall of the first retention groove 223, and the positioning block 621 is connected to the elastic arm 622 and moves in to engage with the positioning hole 611.

The positioning part 62 and the positioning hole 611 are not limited to any specific number, which can be one or plural. In the instant embodiment, the numbers of the positioning part 62 and the positioning hole 611 are plural, and the plurality of positioning parts 62 and the plurality of positioning holes 611 are both arranged at intervals in the circumferential direction of the first retention groove 223, and the positioning block 621 of any one of the positioning parts 62 can optionally moves in and hooks up one of the positioning holes 611. Arranging the plurality of positioning parts 62 and positioning holes 611 that collaborate with each other allows the positioning blocks 621 of the positioning parts 62 to move in and hook up the corresponding ones of the positioning holes 611 after the base 22 rotates a given angle relative to the back plate 13, thereby holding the base 22 at such a position, easing adjustment of the position of the support member 21.

In one embodiment, the accessory body 1 is generally of a rectangular shape, which includes four side edges that are sequentially connected end to end. One end of the support member 21 is rotatably connected by the first mounting portion 51 and the pivot axle 53 to the base 22, and an opposite end is movable in a direction toward or away from the base 22. The pivot axle 53 is parallel to an adjacent one of the side edges.

The numbers of the positioning blocks 621 and the positioning holes 611 are four, and the four positioning holes 611 are uniformly arranged, at intervals, in a circumferential direction around the first retention groove 223, meaning a central angle to which two adjacent ones of the positioning holes 611 correspond is 90°, so that when the base 22 is rotated by angle of an integer multiple of 90° (such as 90°, 180°, 270°), the positioning blocks 621 get into and hook up the corresponding ones of the positioning hole 611.

As shown in FIG. 43, it is appreciated that the support member 21 can be rotatably connected to the base body 270, or alternatively be rotatably connected with the base cover 271. In the instant embodiment, the base cover 271 is of an annular form, and one side of the base body 270 that is distant from the receiving compartment 15 is formed with an avoidance recess 2241, and the support member 21 is received in the avoidance recess 2241 and is rotatably connected with the base body 270, and the base cover 271 surrounds the outer circumference of the support member 21.

One end of the support member 21 is rotatably connected by the pivot axle 53 to the base body 270, while an opposite end is provided with a hand gripping site 214. A user may place a finger or the holder assembly 2 into the hand gripping site 214 to allow the user to rotate the support member 21 out of the avoidance recess 2241. In the instant embodiment, the hand gripping site 214 is a notch formed in the support member 21.

As shown in FIG. 45, one side of the base body 270 that is adjacent to the receiving compartment 15 is provided with a reinforcing board 2702 attached thereto. The reinforcing board 2702 reinforces the overall strength of the base 22 to increase the difficulty of deforming the base 22, so as to avoid a problem that the base 22 detaches from the accommodation trough 11 resulting from the base 22 being influenced by the support member 21 to get deformed during rotation of the support member 21. Specifically, the reinforcing board 2702 is a circular ring-shaped steel plate riveted to the base body 270.

Figure 47:
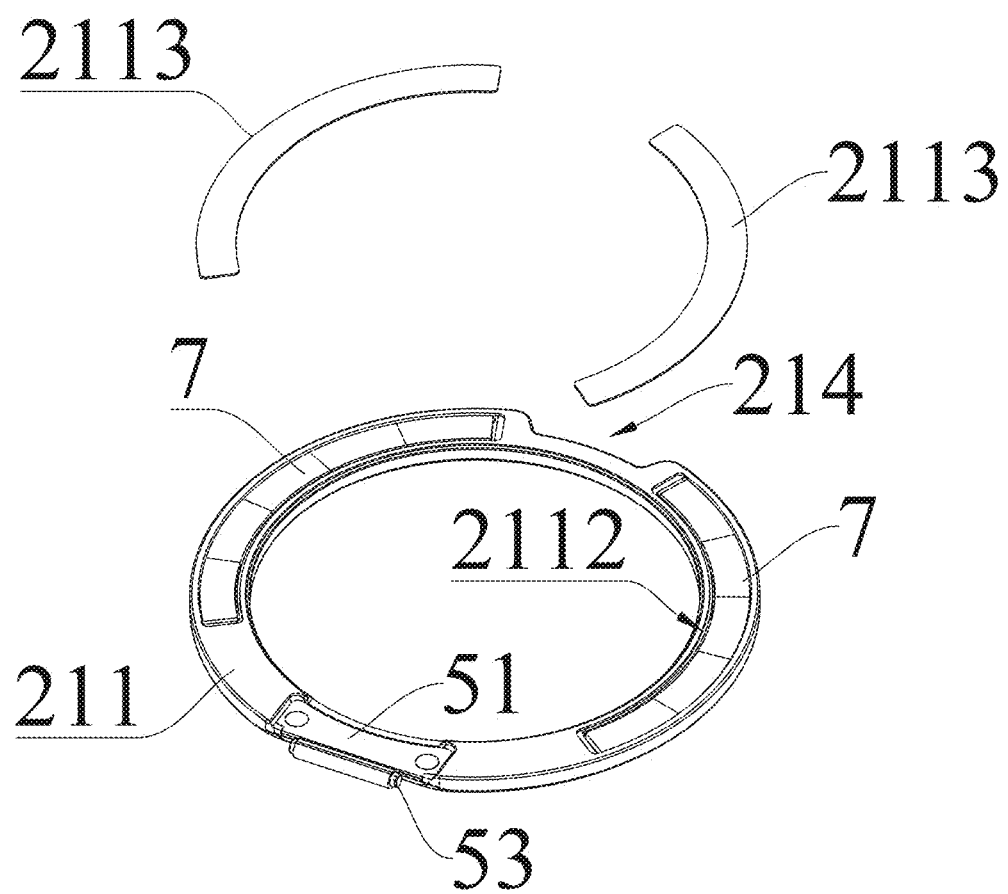
FIG. 47 is an exploded view showing a support member illustrated in FIG. 41.

As shown in FIG. 47, the support member 21 comprises a support body portion 211 connected to the base 22 and a magnetic attraction member 7 attractable by a magnet. The support body portion 211 is a plastic component and is formed with an annular groove 2112. The magnetic attraction member 7 is received in the annular groove 2112 to prevent exposure of the magnetic attraction member 7. The accessory body 1 may magnetically attract and combine with a wireless charging device having a magnetic attraction function by means of the magnetic attraction member 7 to enhance stability of the electronic equipment during a course of charging. Further, making the support body portion 211 with a plastic material and arranging the magnetic attraction member 7 in the interior of the plastic component, when compared with a solution in which the entirety of the support member 21 is metal, ensure that the support member 21 is provided with a magnetic attraction function, while the influence on the charging performance is reduced and generation of eddy currents is prevented. Further, the support body portion 211 further comprises a support member cover 2113 for covering the annular groove 2112 or the magnetic attraction member 7. A shape of the support member cover 2113 matches the annular groove 2112 or the magnetic attraction member 7.

The magnetic attraction member 7 can be a magnet that exhibits magnetism or can be a metal that does not exhibit magnetism but is attracted by a magnet. In the instant embodiment, the magnetic attraction member 7 is a magnet. The support member 21 is provided, in an interior thereof, with a plurality of magnetic attraction members 7 spaced from each other, and each of the magnetic attraction members 7 comprises one or plural metallic bodies, so as to enhance the effect of magnetic attraction of the support member 21 and also to prevent the magnetic attraction member 7 from forming an annular form to induce an eddy current effect during a course of charging.

In the electronic equipment accessory of the instant embodiment, the base comprises the base body and the base cover, and the base body and the base cover are respectively located at two opposite sides of the first connecting member, so as to sandwich the first connecting member between the base body and the base cover. After the base body and the base cover are connected, the first connecting member fulfills a position limiting effect to the base to thereby enhance the stability of the base, reducing the risk that the base detaches from the accommodation trough. Further, the base body and the base cover are both plastic components and this helps prevent the base from affecting wireless charging performance, and also prevents inducing an eddy current effect during a course of wireless charging.

Seventh Embodiment

Figure 48:
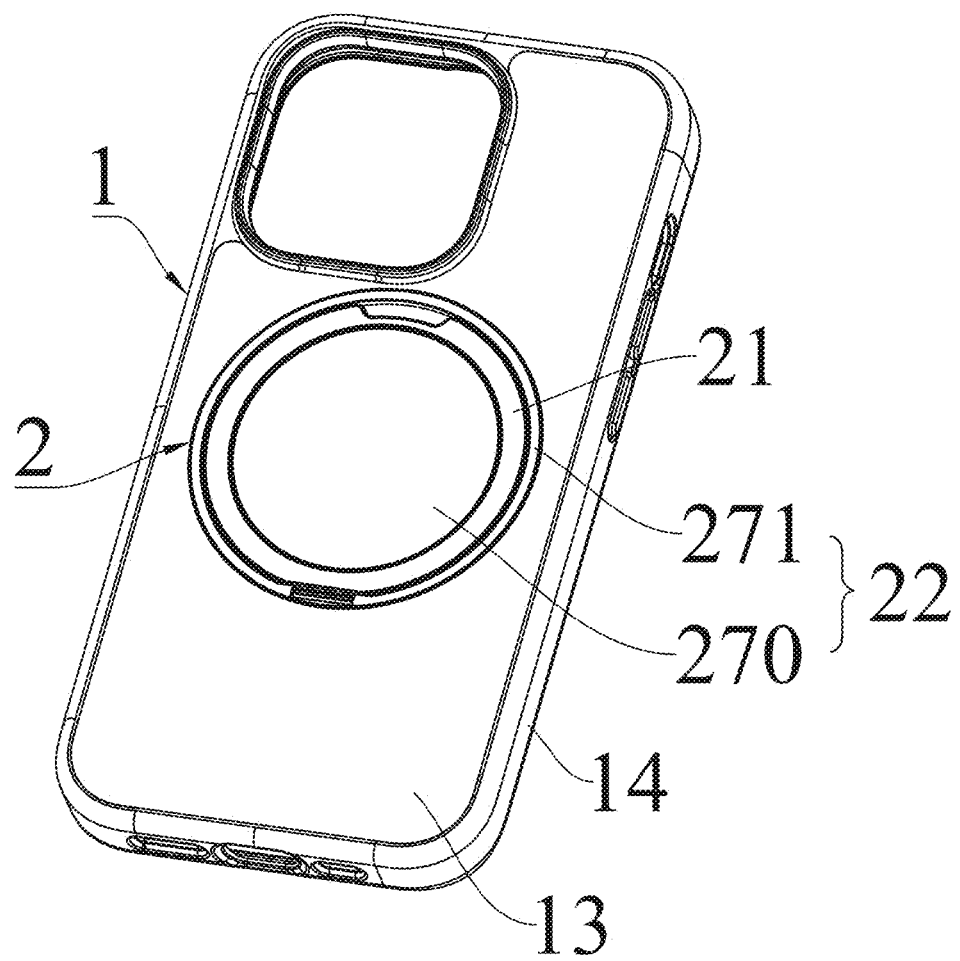
FIG. 48 illustrates an electronic equipment accessory according to a seventh embodiment of the application in a folded position.
Figure 49:
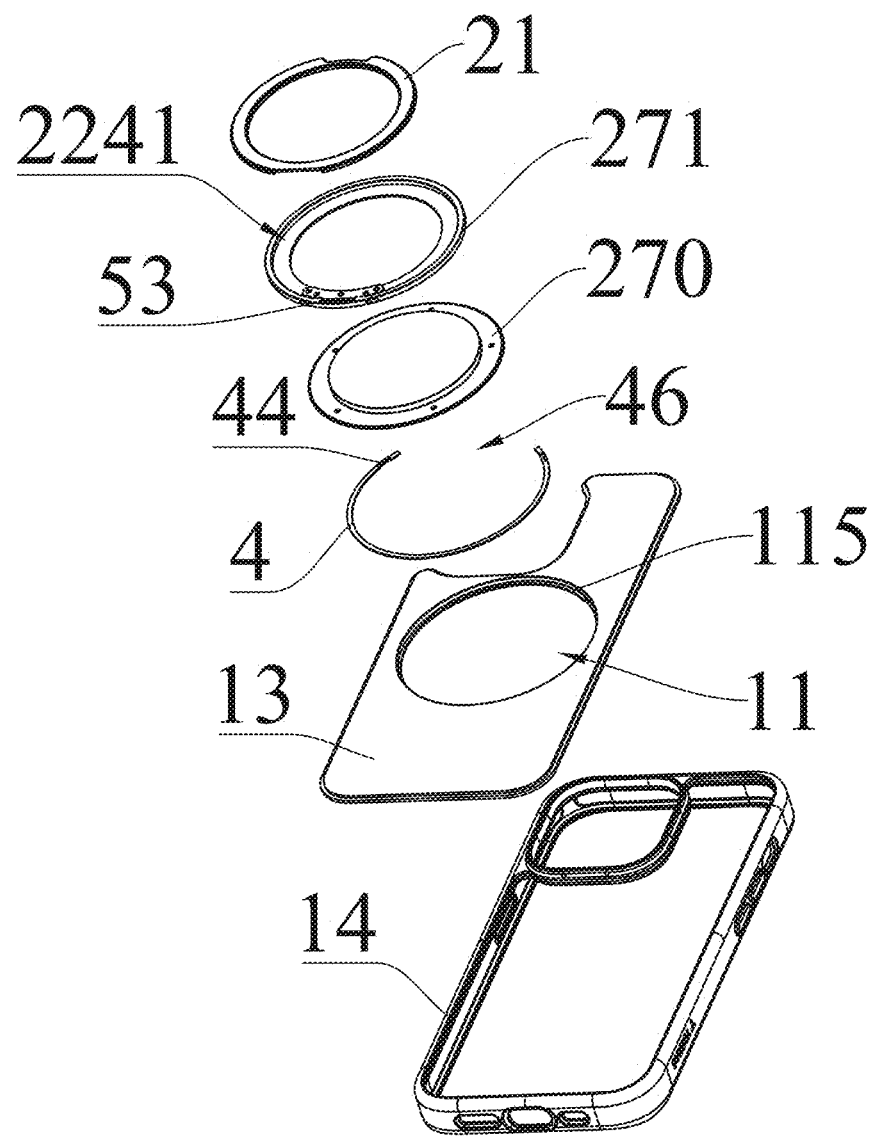
FIG. 49 is an exploded view showing the electronic equipment accessory illustrated in FIG. 48.
Figure 50:
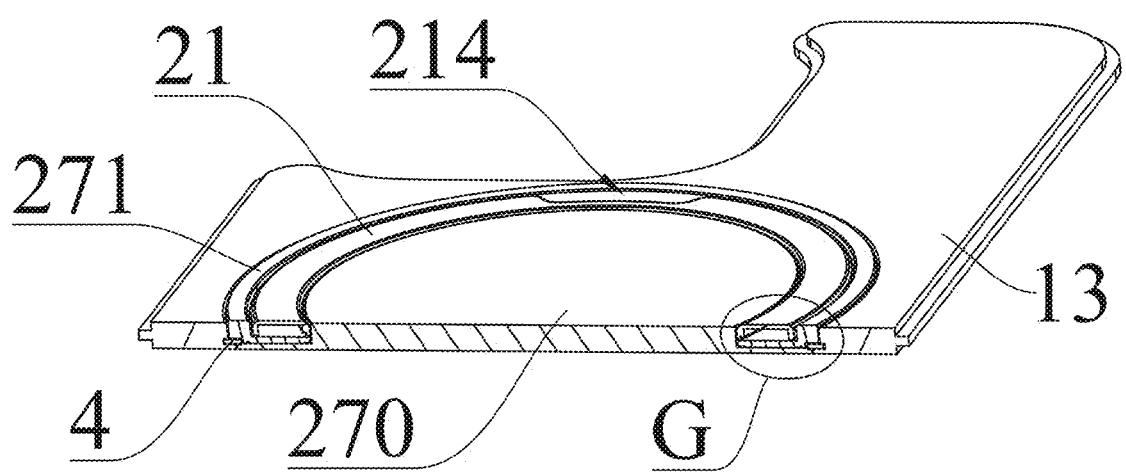
FIG. 50 is a cross-sectional view showing the electronic equipment accessory illustrated in FIG. 48, with side frame removed.

Referring to FIGS. 48-50, a seventh embodiment of the application provides an electronic equipment accessory, of which a main difference from the previous embodiments is that the structures of the base 22 and the positioning structure 6 are made different. In the instant embodiment, the electronic equipment accessory is still illustrated by taking an electronic equipment protection case as an example. The instant embodiment provides an electronic equipment accessory that comprises an accessory body 1 and a holder assembly 2. The holder assembly 2 is rotatably connected by a first connecting member 4 to the accessory body 1. The first connecting member 4 is provided with a rotation positioning structure collaborating with the holder assembly 2 or the accessory body 1. The holder assembly 2 functions to support and hold the accessory body 1, and a piece of electronic equipment can be placed on one side of the accessory body 1 that is distant from the holder assembly 2, thereby achieving an effect of supporting the electronic equipment. Since the holder assembly 2 is rotatable relative to the accessory body 1, the holder assembly 2 can be rotated to adjust the position of the holder assembly 2 in use to fulfill different effects of supporting. The rotation positioning structure achieves an effect of positioning for the holder assembly 2 after the holder assembly 2 is rotated for a predetermined angle to keep the holder assembly 2 in position. Arranging the rotation positioning structure on the first connecting member 4 allows the first connecting member 4 not only to provide a function of connecting the accessory body 1 and the holder assembly 2, but also has a function of positioning. Integrating the functions of connecting and positioning together helps simplify the overall structure of the electronic equipment accessory. Further, the first connecting member 4 and the rotation positioning structure may share some space to help reduce the overall thickness of the electronic equipment accessory.

It is appreciated that the holder assembly 2 being rotatably connected, by means of the first connecting member 4, to the accessory body 1 comprises the first connecting member 4 being fixedly connected to the holder assembly 2, while being movably connected with the accessory body 1, or alternatively, the first connecting member 4 being fixedly connected to the accessory body 1, while being movably connected with the holder assembly 2, or alternatively, the first connecting member 4 being movably connected with the holder assembly 2 and the accessory body 1 separately, provided that the holder assembly 2 is allowed to rotate relative to the accessory body 1 after the first connecting member 4 connects the holder assembly 2 and the accessory body 1 together.

In the instant embodiment, the first connecting member 4 and the accessory body 1 are formed separately and then fixed to each other, and the first connecting member 4 and the holder assembly 2 are assembled together in a movable manner. Since the first connecting member 4 is an independent part disposed between the holder assembly 2 and the accessory body 1, the independently arranged first connecting member 4, in addition to fulfilling the rotatable connection between the holder assembly 2 and the accessory body 1, also provides a function of rotation positioning for the holder assembly 2 relative to the accessory body 1, making the internal structure of the electronic equipment accessory more compact and easing a production operation and increasing the efficiency of production.

The accessory body 1 is not limited to any specific type, such as an electronic equipment protection case, a wireless charging device, a portable power supply device, and a card wallet. In the instant embodiment, the accessory body 1 is a case body of an electronic equipment protection case, which comprises a back plate 13 and a side frame 14. The side frame 14 is circumferentially arranged along an edge of the back plate 13 and circumferentially enclosing and defining, in combination with the back plate 13, a receiving space for receiving the electronic equipment. The holder assembly 2 is mounted on the back plate 13.

Figure 51:
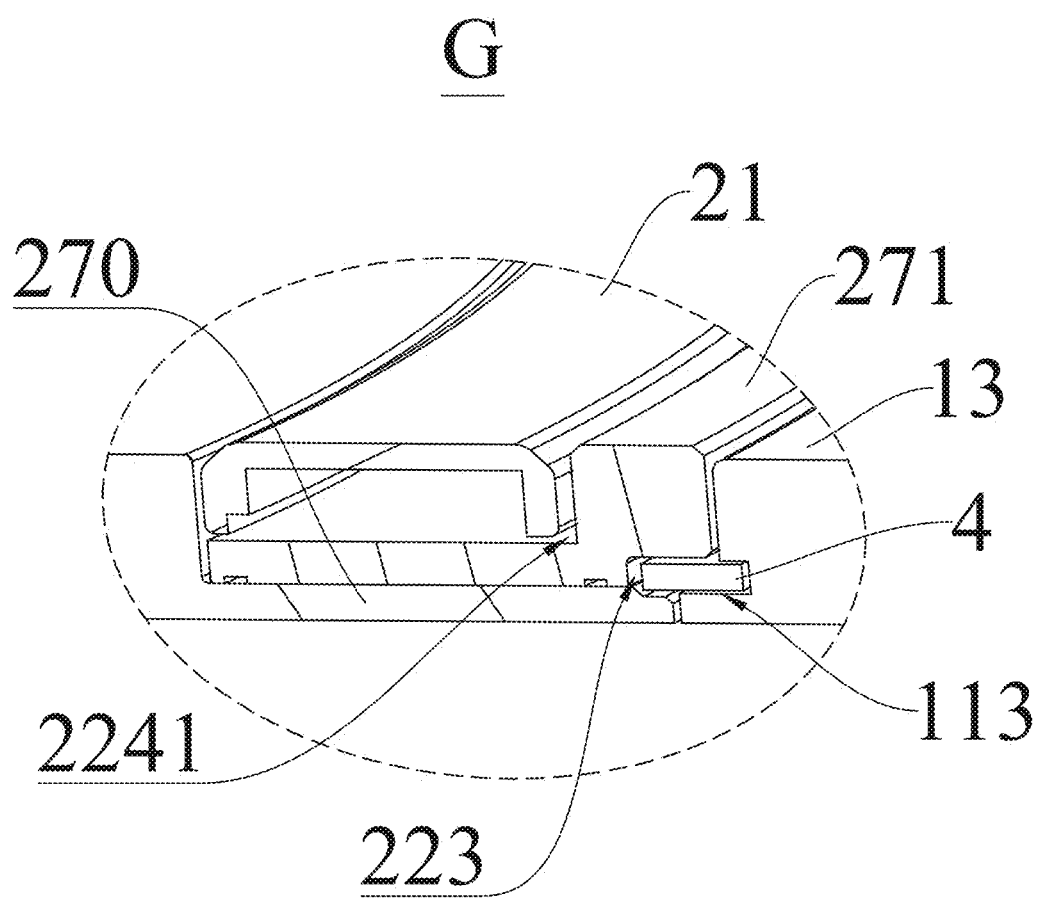
FIG. 51 is an enlarged view showing region G of FIG. 50.
Figure 52:
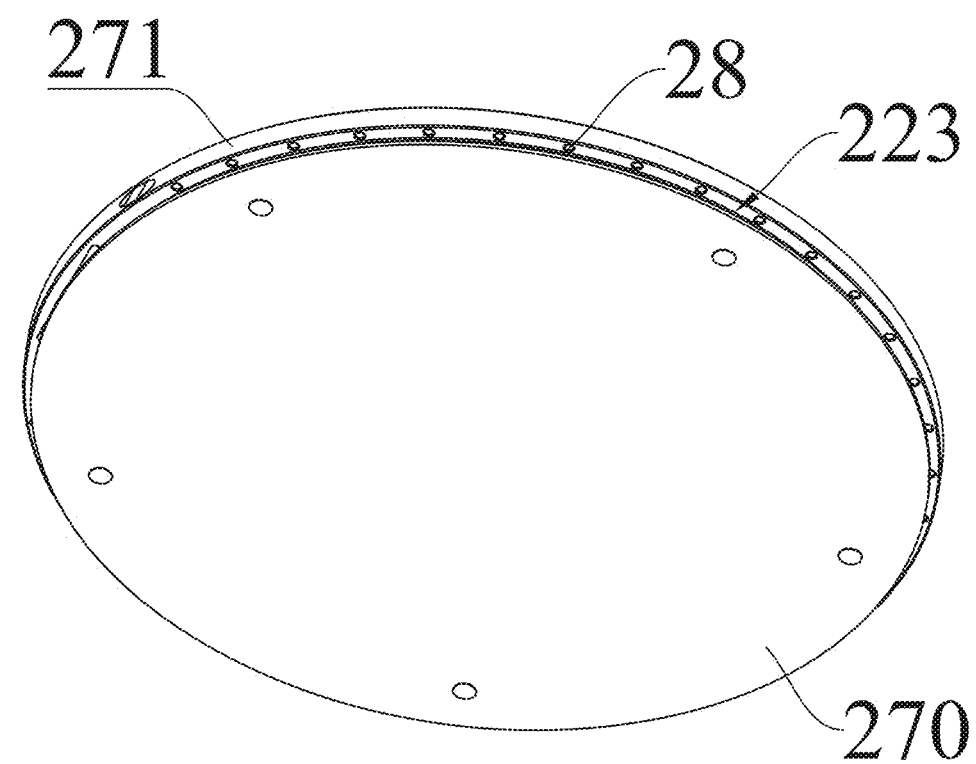
FIG. 52 illustrates a holder assembly of FIG. 48.
Figure 53:
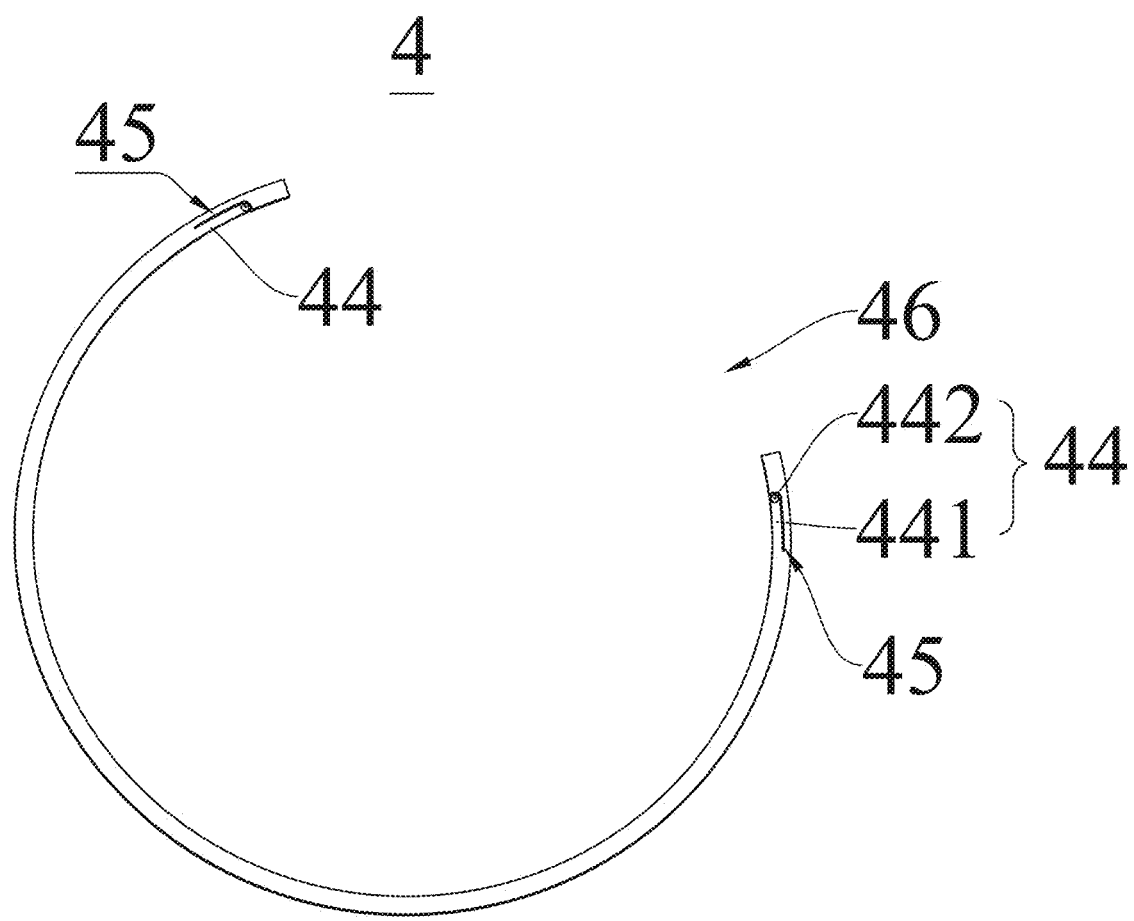
FIG. 53 illustrates a first connecting member of FIG. 49.

Referring to FIGS. 51-53, in one embodiment, a first retaining engagement member 44 and a second retaining engagement member 28 that collaborate with each other are provided between the first connecting member 4 and the accessory body 1 or the holder assembly 2. One of the first retaining engagement member 44 and the second retaining engagement member 28 acts as the rotation positioning structure. The second retaining engagement member 28 is arranged on the accessory body 1 or the holder assembly 2. After the holder assembly 2 is rotated relative to the accessory body 1 for a predetermined angle, the first retaining engagement member 44 may get retaining engagement with one corresponding second retaining engagement member 28 to thereby achieve a positioning effect for the holder assembly 2. Rotation of the holder assembly 2 needs not only to overcome the friction between the first connecting member 4 and the holder assembly 2, but also requires an additional acting force to release the retaining engagement between the first retaining engagement member 44 and the second retaining engagement member 28. Thus, by means of the collaboration between the first retaining engagement member 44 and the second retaining engagement member 28, an effect of improving the stability of the holder assembly 2 is achieved, reducing the risk of erroneous operations that mistakenly cause the holder assembly 2 to rotate relative to the accessory body 1. Specifically, the first retaining engagement member 44 acts as the rotation positioning structure, and the second retaining engagement member 28 is arranged on the holder assembly 2.

The first retaining engagement member 44 comprises an elastic arm 441 and a retaining engagement body 442 arranged on the elastic arm 441. The elastic arm 441 is connected to the first connecting member 4 and is deformable relative to the first connecting member 4. The elastic arm 441, when deformed, drives the retaining engagement body 442 to move relative to the second retaining engagement member 28, so as to fulfill the retaining engagement effect or release the retaining engagement effect, meaning fulfilling a positioning effect or releasing the positioning effect for the holder assembly 2.

The first connecting member 4 is formed with an accommodation slot 45, and the elastic arm 441 is received in the accommodation trough 45. The elastic arm 441 has one end fixedly connected to an internal wall of the accommodation slot 45, while a remaining portion is spaced from the internal wall of the accommodation slot 45, thereby forming a cantilever type fastener to allow the elastic arm 441 to generate deformation in the accommodation slot 45. Arranging the elastic arm 441 in the accommodation slot 45 helps reduce the overall thickness of the electronic equipment accessory.

It is appreciated that the elastic arm 441 and the first connecting member 4 can be separate parts that are then assembled together, or they can be integrally formed as one piece. In the instant embodiment, the elastic arm 441 and the first connecting member 4 are integrally formed together. For example, a slot is defined in the first connecting member 4 to form the elastic arm 441 at a site corresponding to the slot. Thus, the elastic arm 441 and the first connecting member 4 are integrally formed as one single piece.

The second retaining engagement member 28 is not limited to any specific type, such as a locking hole or a projection. In the instant embodiment, the second retaining engagement member 28 comprises locking holes formed in the holder assembly 2. During the course of rotation of the holder assembly 2, the holder assembly 2 compresses the retaining engagement body 442, and the retaining engagement body 442 transmits the compression force to the elastic arm 441, and the elastic arm 441 is deformed to allow the retaining engagement body 442 to withdraw from the locking hole, thereby releasing the retaining engagement between the second retaining engagement member 28 and first retaining engagement member 44, and under this condition, the retaining engagement body 442, as being acted upon by the elastic arm 441, is tightly pressed against the holder assembly 2 to follow the holder assembly 2 for further rotation, until the retaining engagement body 442 reaches one locking hole. When the retaining engagement body 442 reaches one locking hole, the pressing force acting on the retaining engagement body 442 varnishes and the elastic arm 441, under the action of its own spring force, restores back to the original state to cause the retaining engagement body 442 to get into and be engaged in the locking hole, fulfilling the retaining engagement effect. In the case that the second retaining engagement member 28 comprises projections, the retaining engagement body 442 is rotatable with the holder assembly 2 to slide from one side of the projection to the opposite side to release the retaining engagement effect.

When the retaining engagement body 442 withdraws from the locking hole, the retaining engagement body 442 is tightly pressed against the holder assembly 2, and the fictional force between the two is relatively large, causing certain resistance against the rotation of the holder assembly 2, so that damping can be perceived during the course of rotation of the holder assembly 2, and also, when the retaining engagement body 442 gets engagement into the locking hole, the retaining engagement body 442 hits the holder assembly 2 to generate "clicking" sound, so that the first retaining engagement member 44 and the second retaining engagement member 28, in addition to improving stability of the holder assembly 2, also provide the user with better experience of use and playability. Similarly, in case that the second retaining engagement member 28 comprises projections, the retaining engagement body 442 contacts with one slanted side of the projection to form resistance against the rotation of the holder assembly 2, and further sliding of the retaining engagement body 442 relative to the projection causes the elastic arm 441 to deform, and when the retaining engagement body 442 slides to the opposite side of the projection, the retaining engagement body 442 similarly hits the holder assembly 2 and emits a sound of hitting.

The retaining engagement body 442 and the locking hole are not limited to any specific shape. In one embodiment, the shapes of both the retaining engagement body 442 and the locking hole are both spherical or semispherical. In another embodiment, the locking hole can be of a pillar form.

The first retaining engagement member 44 and the fastening hole are not limited to any specific numbers. For example, the number of both the first retaining engagement member 44 and the fastening hole can be plural, or the number of one of them is one, while the number of another one is plural. In the instant embodiment, the number of the locking holes is plural, and the plurality of locking holes are arranged, at intervals, in a rotating direction of the holder assembly 2. By means of the arrangement of the plurality of locking holes, the holder assembly can be retained in position when being rotated to different angles.

The retaining engagement body 442 and the locking hole are not limited to any specific position, and as shown in FIG. 53, in one embodiment, the first connecting member 4 has an arcuate structure, and the retaining engagement body 442 is arranged at one side of the elastic arm 441 in an axial direction of the first connecting member 4, and the locking hole is correspondingly arranged in a side of the holder assembly 2 in an axial direction corresponding to the retaining engagement body 442. Preferably, the axis of the first connecting member 4 is coaxial with the axis of the holder assembly 2. In another embodiment, the first connecting member 4 can be of a ring structure. During a course of rotation of the holder assembly 2, the retaining engagement body 442 is compressed by the holder assembly 2 to have the one end of the elastic arm 441 that is provided with the retaining engagement body 442 deformed in the axial direction of the first connecting member 4, and also to have the retaining engagement body 442 withdrawn from the locking hole or sliding over an end portion of the projection.

Figure 55:
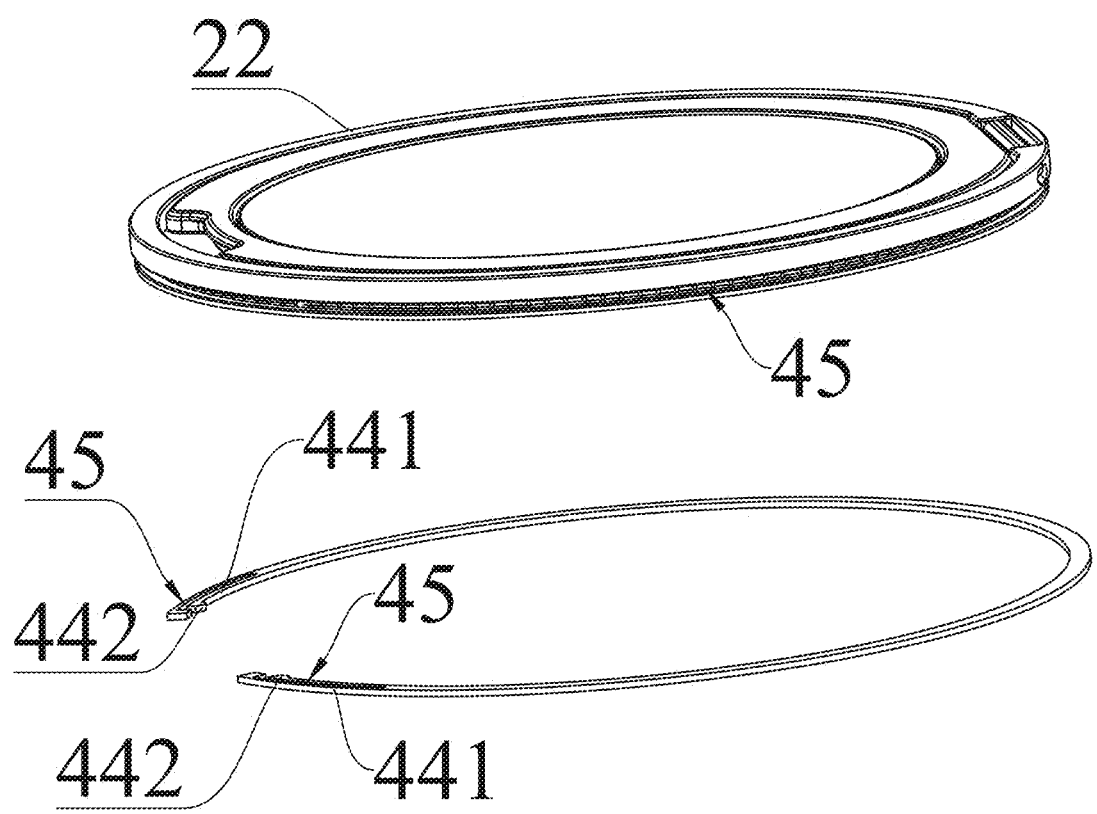
FIG. 55 is a schematic exploded view showing another embodiment of the holder assembly and the first connecting member illustrated in FIG. 49.
Figure 56:
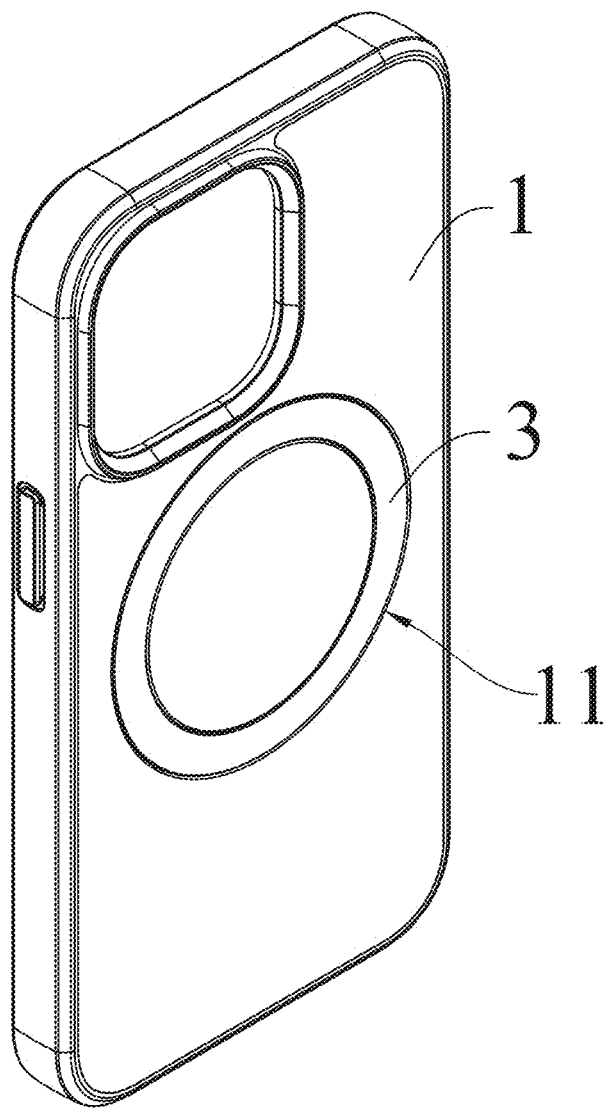
FIG. 56 is a schematic structure diagram showing an electronic equipment accessory provided in an eighth embodiment of the application.
Figure 57:
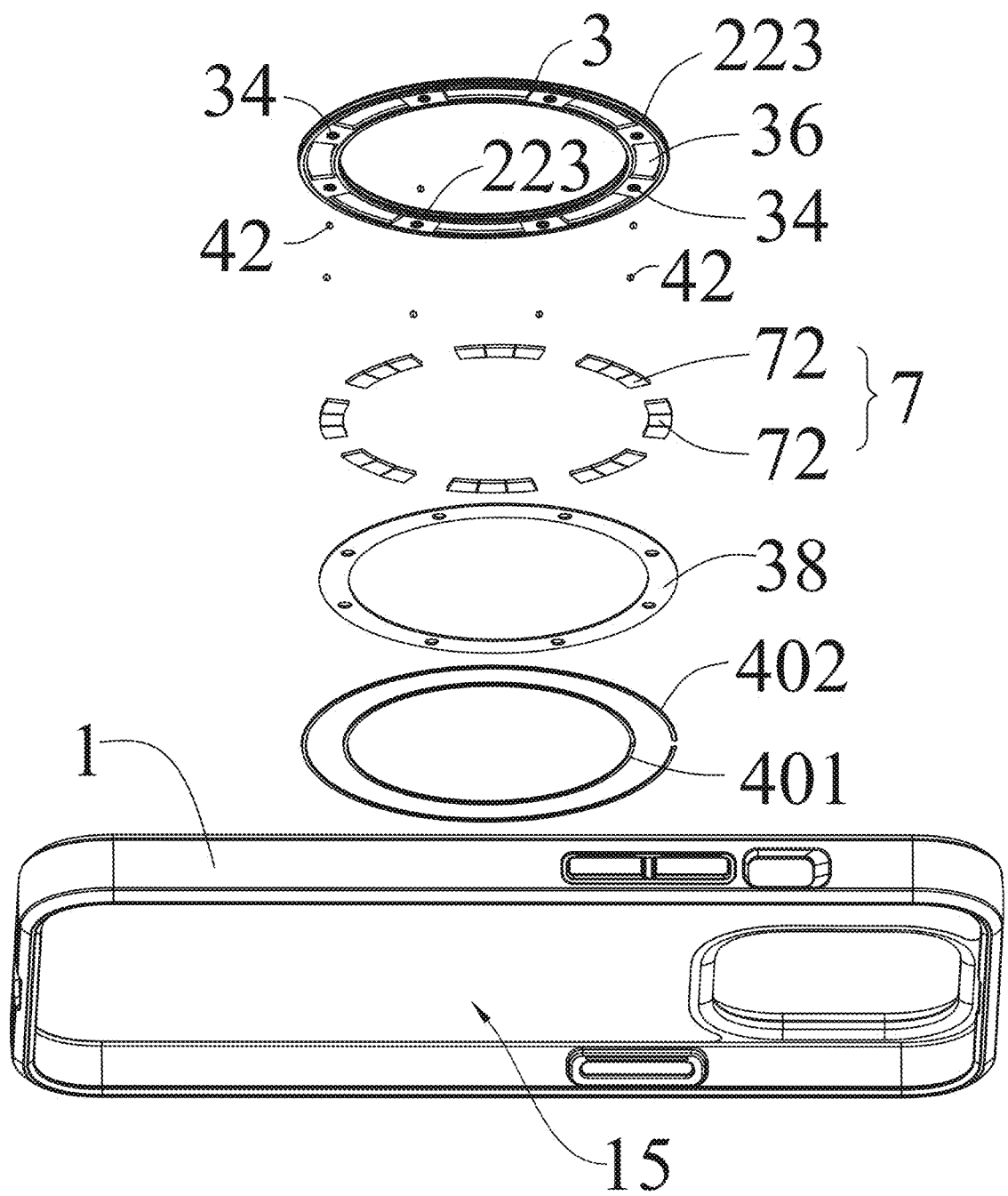
FIG. 57 is a schematic exploded view showing the electronic equipment accessory illustrated in FIG. 56 from one direction.
Figure 58:
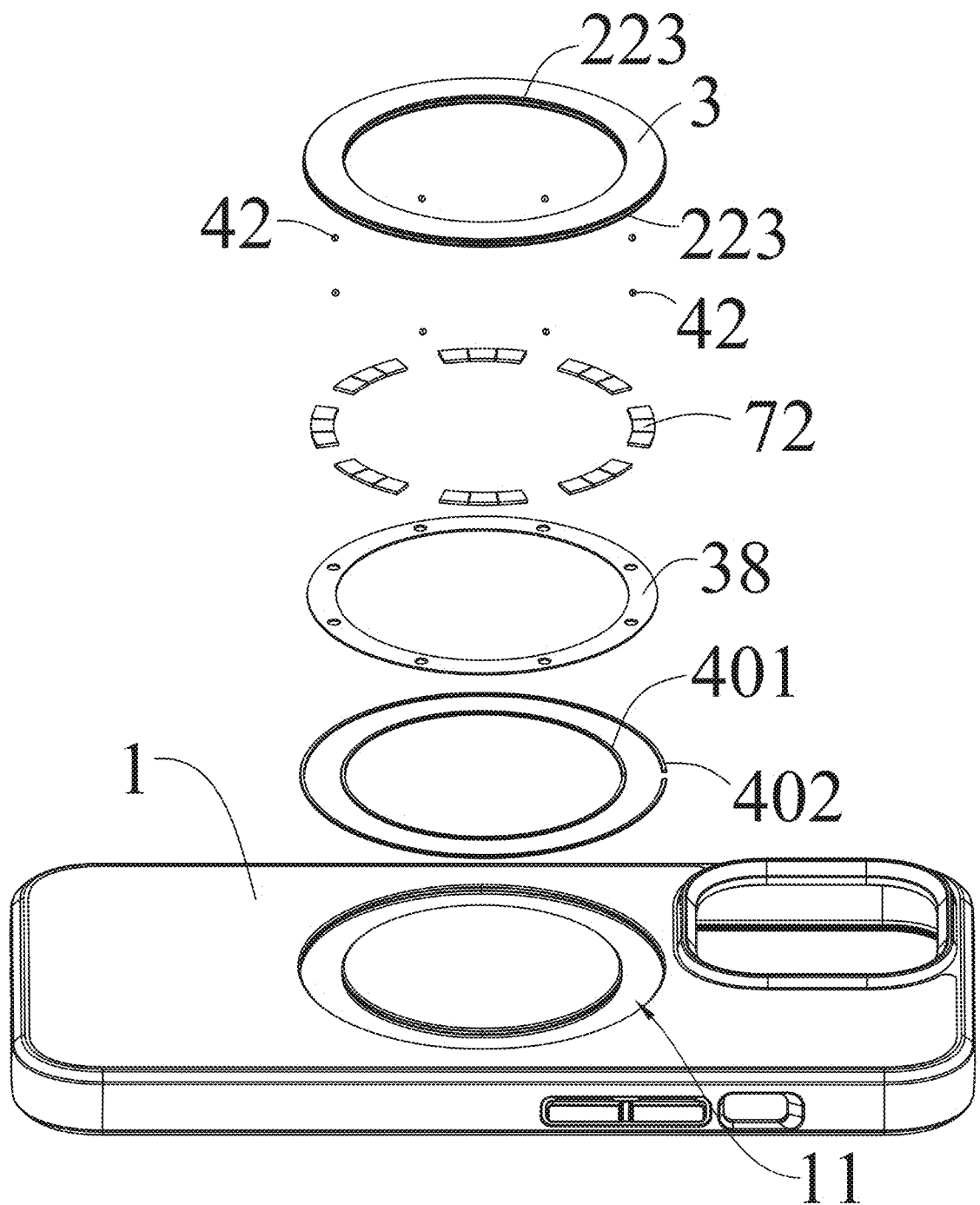
FIG. 58 is a schematic exploded view showing the electronic equipment accessory illustrated in FIG. 56 from another direction.
Figure 59:
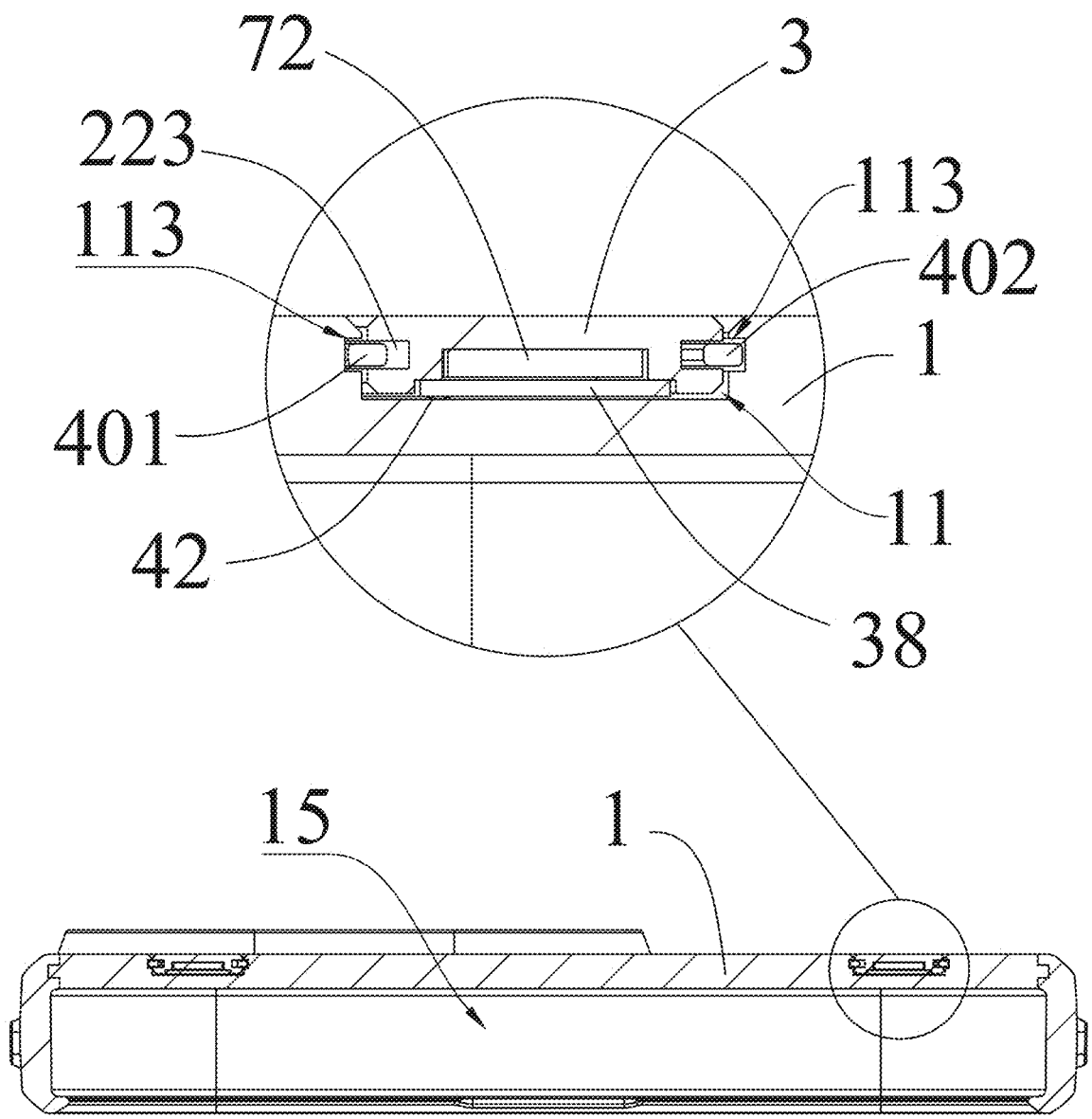
FIG. 59 is a schematic cross-sectional view showing the electronic equipment accessory illustrated in FIG. 56.

As shown in FIG. 55, in another embodiment, the retaining engagement body 442 is arranged on one side of the elastic arm 441 in a radial direction of the first connecting member 4, and the locking hole is correspondingly arranged in a side of the holder assembly 2 in a radial direction corresponding to the retaining engagement body 442. During a course of rotation of the holder assembly 2, the retaining engagement body 442 is compressed by the holder assembly 2 to have the one end of the elastic arm 441 that is provided with the retaining engagement body 442 deformed in the radial direction of the first connecting member 4, and also to have the retaining engagement body 442 withdrawn from the locking hole.

As shown in FIGS. 49 and 50, in one embodiment, the accessory body 1 is formed with an accommodation trough 11. The first connecting member 4 and the holder assembly 2 are received in the accommodation trough 11, and the first connecting member 4 is rotatable relative to the accessory body 1 in a circumferential direction of the accommodation trough 11. Receiving the holder assembly 2 and the first connecting member 4 in the accommodation trough 11 reduces the feeling of abruptness for the holder assembly 2 and the first connecting member 4 and also reduces the overall thickness of the electronic equipment accessory.

It is appreciated that the accommodation trough 11 may pass through, or may not pass through, the back plate 13 of the accessory body 1. In the instant embodiment, the accommodation trough 11 passes through the back plate 13 of the accessory body 1 to have the depth of the accommodation trough 11 maximized, providing an even larger space for accommodating the holder assembly 2 and the first connecting member 4, for further reducing the overall thickness of the electronic equipment accessory.

Referring to FIGS. 48-51, in one embodiment, the holder assembly 2 comprises a base 22 and a support member 21. The base 22 is rotatably connected, by means of the first connecting member 4, to the accessory body 1. The support member 21 is rotatably mounted on the base 22. The base 22 is received in the accommodation trough 11. The second retaining engagement member 28 is arranged on the base 22. The support member 21 is rotatably mounted, by means of a pivot axle 53, to one side of the base 22. After the support member 21 is rotated about the pivot axle 53 relative to the base 22 and the accessory body 1 for a predetermined angle, the support member 21 may provide a function of supporting the accessory body 1. Since the base 22 and the accessory body 1 are rotatably connected, during the use of the holder assembly 2, the base 22 together with the support member 21 can be first rotated relative to the accessory body 1 about a first axis for adjusting the position of the support member 21 relative to the accessory body 1 in the circumferential direction of the base, and then, the support member 21 is rotated relative to the base 22 about the pivot axle 53 which defines a second axis perpendicular to the first axis in order to allow the accessory body 1 to be placed on a support surface longitudinally or transversely. After the base 22 is rotated for a corresponding angle, the first retaining engagement member 44 and the second retaining engagement member 28 get retaining engagement with each other to achieve a positioning effect for the holder assembly 2, holding the base 22 in such a position, avoiding the risk that the base 22 rotates relative to the accessory body 1 during the course of supporting and improving stability of the holder assembly 2 during the course of supporting.

Figure 14:
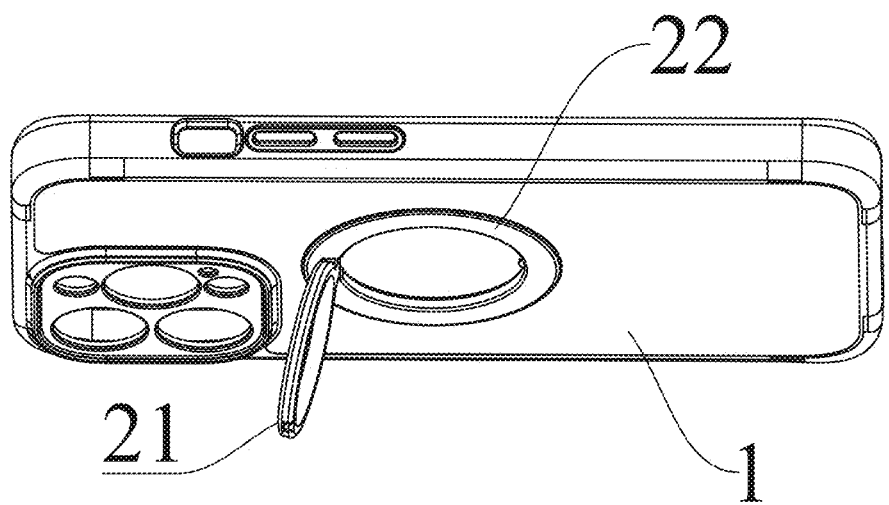
FIG. 14 illustrates the electronic equipment accessory of FIG. 13 in a supporting state.
Figure 15:
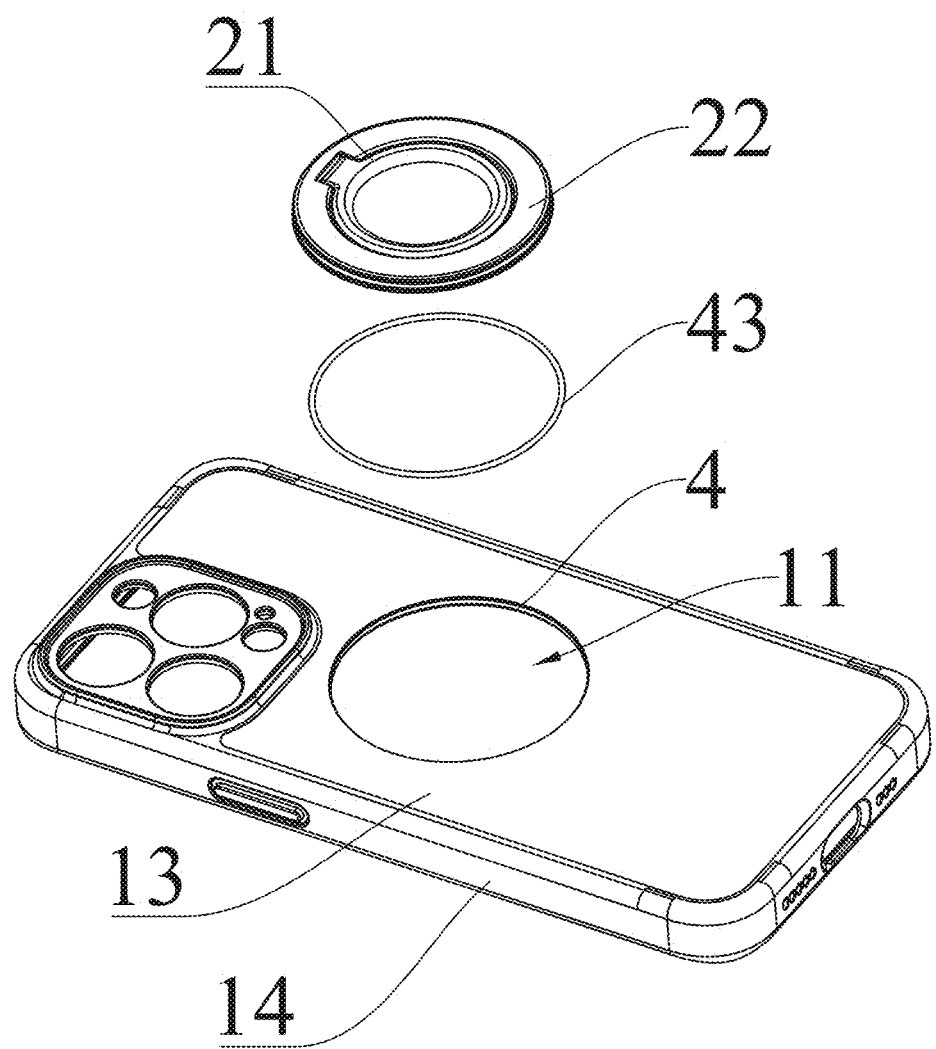
FIG. 15 is an exploded view of FIG. 13.
Figure 16:
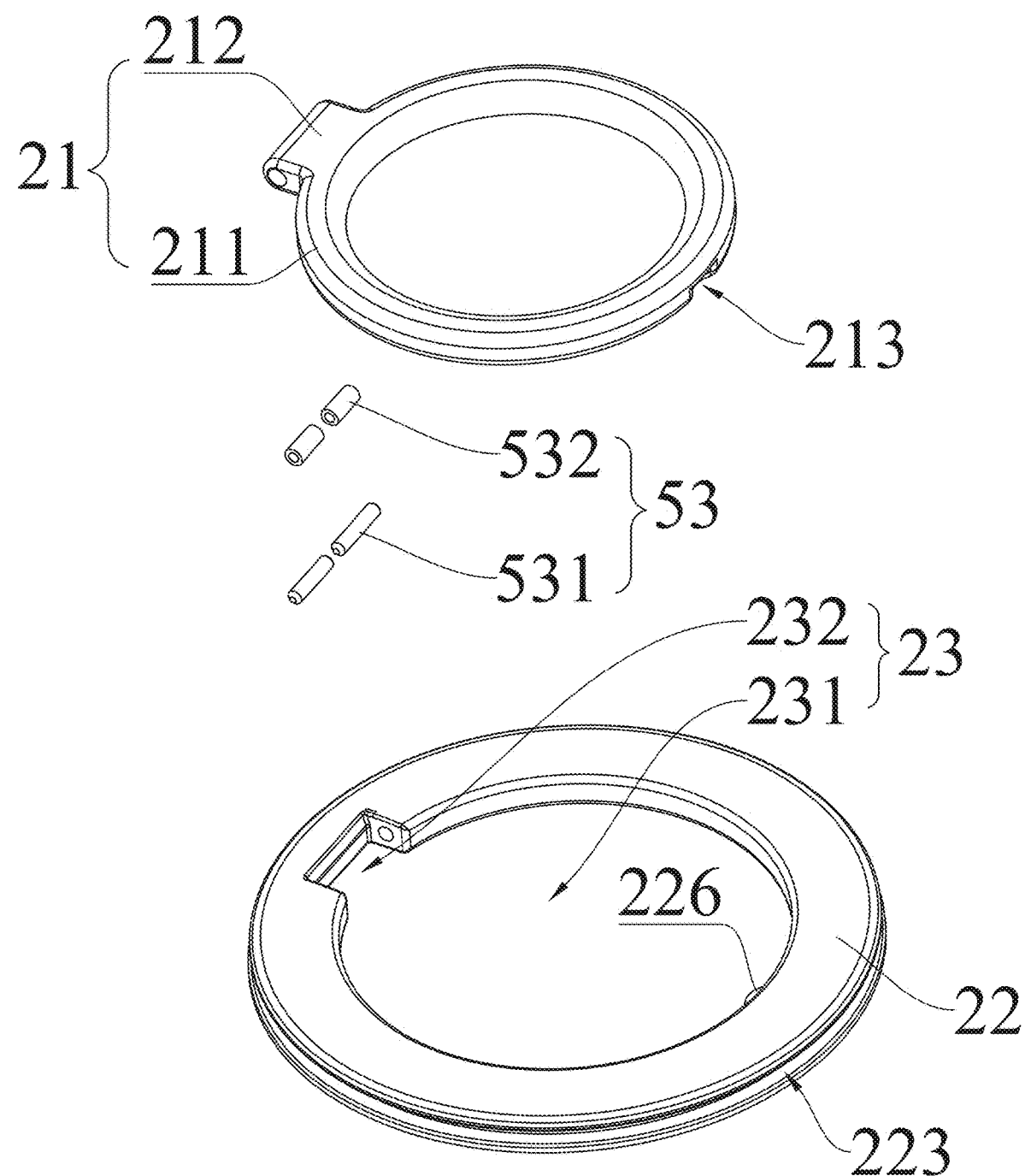
FIG. 16 is an exploded view showing a base, a pivot axle, and a support member illustrated in FIG. 13.
Figure 17:
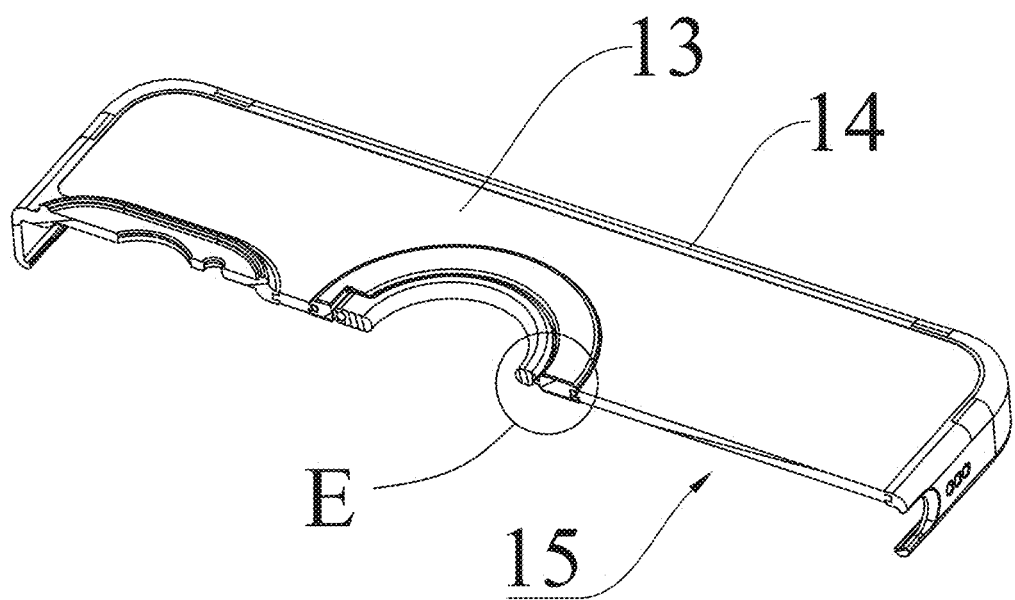
FIG. 17 is a cross-sectional view of the electronic equipment accessory illustrated in FIG. 13.
Figure 18:
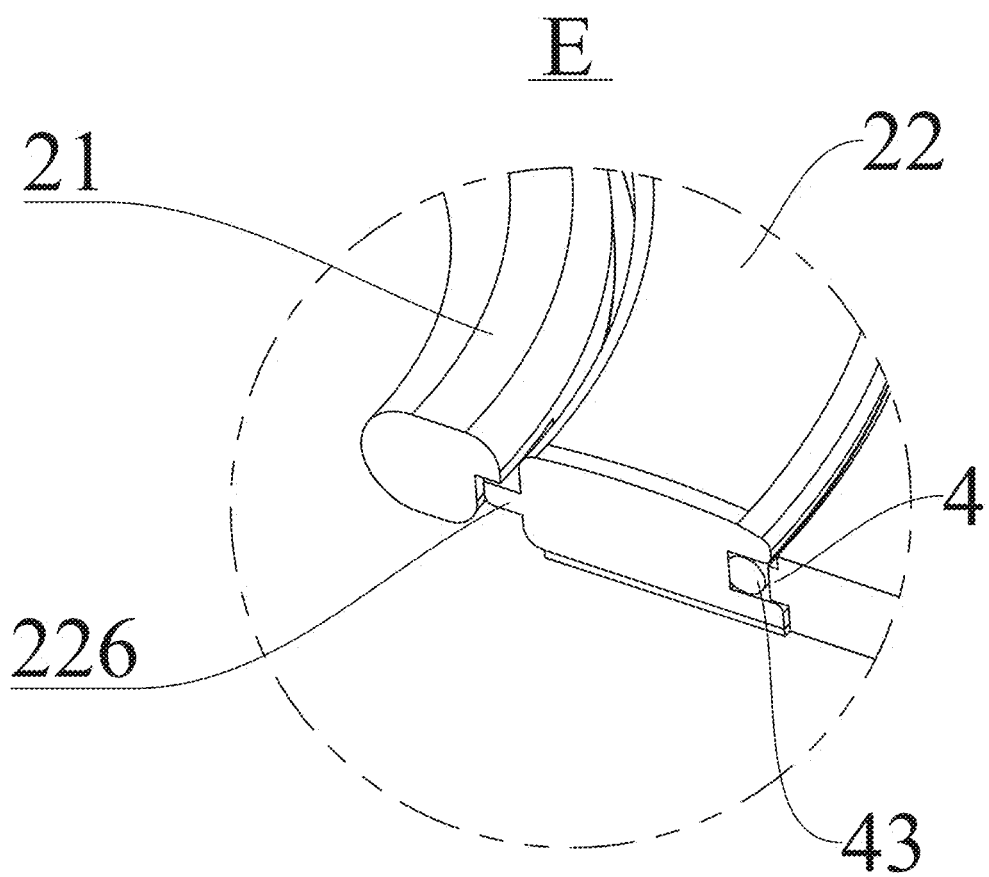
FIG. 18 is an enlarged view showing region E of FIG. 17.

In the instant embodiment, the accessory body 1 has a shape that is generally rectangular, including two spaced and parallel longitudinal edges and two spaced and parallel transverse edges. The longitudinal edges have a length greater than a length of the transverse edges. When it is desired to place the accessory body 1 on the support surface longitudinally (namely the transverse edges of the accessory body 1 being parallel to the support surface), the base 22 is rotated to have the pivot axle 53 parallel with a transverse edge of the accessory body 1, and then, the support member 21 is rotated to have one end of the support member 21 that is distant from the pivot axle 53 supported on the support surface, so that the support member 21 may fulfill an effect of longitudinally supporting the accessory body 1. At this state, one of the transverse edges of the accessory body 1 supported on the support surface can be called as a supporting edge. The pivot axle 53 is parallel to the supporting edge. When it is desired to place the accessory body 1 on the support surface transversely (namely the longitudinal edges of the accessory body 1 being parallel to the support surface), the base 22 can be rotated to have the pivot axle 53 parallel with the longitudinal edge of the accessory body 1, and then, the support member 21 can be rotated to have the end of the support member 21 that is distant from the pivot axle 53 placed on the support surface, so that the support member 21 may fulfill an effect of transversely supporting the accessory body 1. At this state, one of the longitudinal edges of the accessory body 1 supported on the support surface can be called as the supporting edge. The pivot axle 53 is parallel to the supporting edge. In some other embodiments, the accessory body 1 can be supported on a support surface with the pivot axle 53 being non-parallel to (for example perpendicular to) the supporting edge, as shown in FIG. 14. Arranging the base 22 rotatably in the accommodation trough 11 not only enables change of the support direction of the support member 21, but also forming an effect of triangle supporting for both transverse supporting and longitudinal supporting to enhance the stability of supporting. Three points of the triangle are respectively located at the pivot axle 53, the end of the support member 21 placed on the support surface and the edge of the accessory body 1 placed on the support surface. The tilted angle of the accessory body 1 with respect to the support surface can be adjusted conveniently via adjusting (increasing or decreasing) the included angle formed between the support member 21 and the base 22.

The base 22 is formed with an avoidance recess 2241, and the support member 21 is rotatably mounted in the avoidance recess 2241. When it is desired to use the support member 21, the support member 21 is rotated out of the avoidance recess 2241, and when it is desired not to use the support member 21, the support member 21 is stowed in the avoidance recess 2241 to prevent the support member 21 from influencing holding and gripping of the electronic equipment or cooperating with other components in the stowed state.

One end of the support member 21 that is distant from the pivot axle 53 is provided with a hand gripping site 214. When it is desired to use the support member 21, a finger can enter into the hand gripping site 214 and hold the support member 21, allowing the user to easily rotate the support member 21 out of the avoidance recess 2241.

Preferably, the support member 21 is provided, in an interior thereof, with a magnetic member. Therefore, the holder assembly 2 has a function of magnetic attraction, so that the electronic equipment accessory may get magnetically attracted and fixed together with the electronic equipment or other accessories, such as a wireless charging device, by means of the magnetic member, reducing the risk of the two separating from each other.

As shown in FIGS. 51 and 52, in one embodiment, a circumferential outside wall of the holder assembly 2 is formed with a first retention groove 223. The first connecting member 4 is movably inserted in the first retention groove 223. The rotation positioning structure is located in the first retention groove 223. Specifically, the first retention groove 223 is defined in the circumferential outside wall of the base 22, and the first retention groove 223 is located in the middle of the base 22 in the axial direction of the accommodation trough 11. The second retaining engagement member 28 is provided on an internal wall of the first retention groove 223. The first connecting member 4, after being inserted into the first retention groove 223, provides a position limiting effect to the base 22 in the axial direction of the accommodation trough 11, to rotatably mount the base 22 on the accessory body 1 and also to reduce the risk of the base 22 detaching from the accommodation trough 11.

The base 22 comprises a base body 270 and a base cover 271 located at one side of the base body 270. The base body 270 and/or the base cover 271 is formed with the first retention groove 223. The first connecting member 4 is sandwiched between the base body 270 and the base cover 271. Specifically, the support member 21 and the base cover 271 are rotatably connected, and the base body 270 and the base cover 271 are both formed with concave troughs to cooperatively form the first retention groove 223. The first connecting member 4 is received partly in the concave trough of the base body 270 and partly in the concave trough of the base cover 271. During a course of assembling, the base body 270 and the base cover 271 are separately disposed on two opposite sides of the first connecting member 4 in the axial direction, and then, the base body 270 and the base cover 271 are fixed together to thus sandwich the first connecting member 4 between the base body 270 and the base cover 271 and achieve inserting the first connecting member 4 in the first retention groove 223, making assembling easy.

The way of connection between the base body 270 and the base cover 271 is not limited, such as welding, adhesive bonding, and fixing with connecting member.

The base body 270 and the base cover 271 are not limited to any specific materials, which can be metallic or non-metallic. In the instant embodiment, the base body 270 and the base cover 271 are both made of plastic materials to prevent influence on wireless charging performance thereof and also to prevent generating an eddy current phenomenon in the base body 270 and the base cover 271 during a course of charging.

The way of connection of the first connecting member 4 with the accessory body 1 is not limited, and the first connecting member 4 can be fixed to the accessory body 1 or movably mounted to the accessory body 1.

Figure 54:
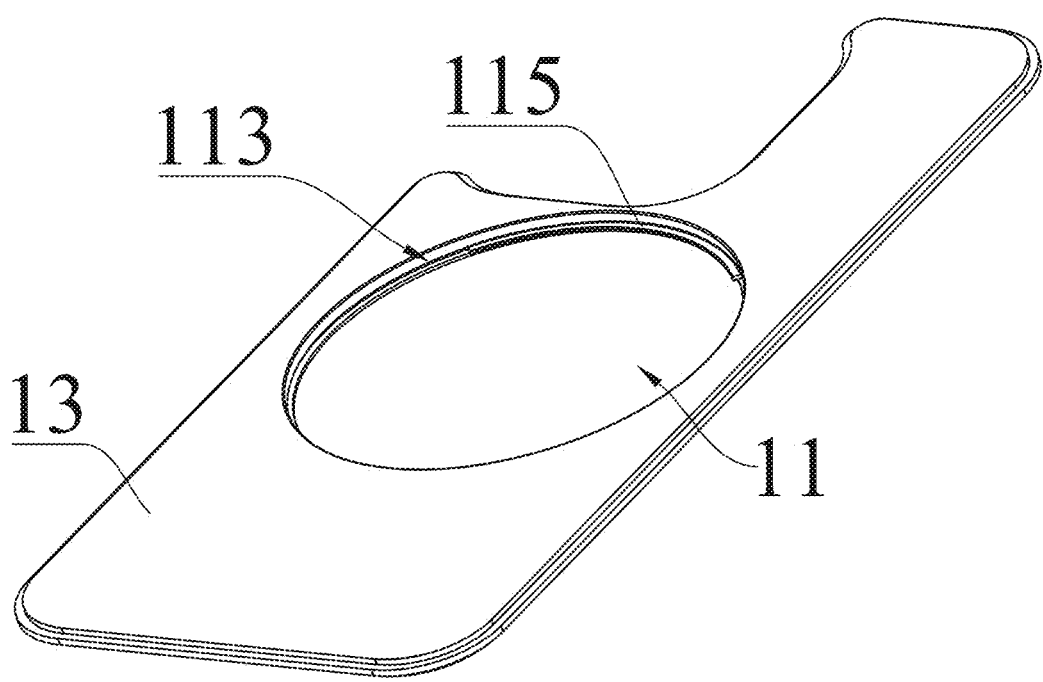
FIG. 54 is a schematic structure diagram showing aback plate and a first connecting member illustrated in FIG. 49.

Referring to FIGS. 51 and 54, in one embodiment, an internal wall of the accommodation trough 11 is formed with a second retention groove 113. The second retention groove 113 is extended in the circumferential direction of the accommodation trough 11. The first connecting member 4 is mounted in the second retention groove 113. The first connecting member 4 is subsequently mounted in the second retention groove 113, and thus, compared to the way of integrally forming the first connecting member 4 in the second retention groove 113, it is possible to first make the rotation positioning structure on the first connecting member 4, and then mounting the first connecting member 4 together with the rotation positioning structure in the second retention groove 113, so that the course of making the rotation positioning structure is not interfered with by the accessory body 1, and the fabrication is easy.

It is appreciated that the first connecting member 4 can be fixedly mounted in the second retention groove 113, or can be movably mounted in the second retention groove 113.

In another embodiment, an internal wall of the mounting hole is further provided with an extension portion. The extension portion extends in a circumferential direction of the mounting hole, and the connecting member is arranged at one side of the extension portion. The extension portion increases the contact area between the accessory body and the connecting member, making assembly easy.

As shown in FIGS. 53 and 54, in one embodiment, the first connecting member 4 is of an annular structure, of which a radial inner end is movably inserted into the first retention groove 223 of the base 22 and a radial outer end is inserted into the second retention groove 113 of the accessory body 1, so as to rotatably mount the holder assembly 2 to the accessory body 1. In some embodiments, the first connecting member 4 comprises a plurality of arc sections arranged in a circumferential direction. The first retaining engagement member 44 or the second retaining engagement member 28 is arranged at an end portion of the arc sections.

The first connecting member 4 has certain elasticity. The first connecting member 4 is formed with a rotation member opening 46 passing therethrough in a radial direction of the first connecting member 4, so that two ends of the first connecting member 4 at opposite sides of the rotation member opening 46 are spaced from each other and are relatively movable during deformation. The first connecting member 4 is a non-closed annular structure, and when acted upon by an external force, the two ends of the first connecting member 4 get close to each other or away from each other in order to adjust a size of the first connecting member 4 in the circumferential direction. To mount the first connecting member 4 in the second retention groove 113, the two ends of the first connecting member 4 are first made closer to each other to reduce the circumferential direction size of the first connecting member 4 for easily placing the first connecting member 4 into the accommodation trough 11 and aligning with or partly inserting into the second retention groove 113, and after releasing of the first connecting member 4, the first connecting member 4 restores back to its original state and enters into the second retention groove 113 under the action the spring force of its own.

The first connecting member 4 is not limited to any specific material, which can be metallic or non-metallic. In one embodiment, the first connecting member 4 is a metal plate/sheet. The metal plate provides a relatively great strength and is better resistant to wear, so that under the condition that the strength is satisfied, the first connecting member 4 can be made thinner to reduce the overall thickness of the electronic equipment accessory and also to enhance the service life and hand feeling of rotating.

An internal wall of the accommodation trough 11 is provided with a stop portion 115. The stop portion 115 extends in the circumferential direction of the accommodation trough 11. The stop portion 115 is located in the rotation member opening 46 of the first connecting member 4 and contacts and connects with the first connecting member 4 in the circumferential direction of the accommodation trough 11. The stop portion 115 is inserted into the first retention groove 223 of the base 22. When the first connecting member 4 is mounted in the second retention groove 113, the first connecting member 4 is fixed relative to the accommodation trough 11, and during a course of rotation of the base 22, due to the contact of the first connecting member 4 with the stop portion 115, the first connecting member 4 does not rotate with the base 22, and under this condition, the base 22 is movable relative to the first connecting member 4 to have the retaining engagement body 442 withdrawn out of the locking hole to get into retaining engagement with another corresponding locking hole after being rotated for a predetermined angle to thereby generate "clicking" sound. In case that the first connecting member 4 comprises multiple arc sections, two adjacent ones of the arc sections can be arranged to separate from each other to form the opening. The stop portion 115 and the accessory body 1 can be integrally formed together as one piece, or can be separately made and then assembled together. In the instant embodiment, the stop portion 115 and the accessory body 1 are integrally formed together as one piece, so that while the connection strength is ensured, subsequent assembling operations are omitted.

Eighth Embodiment

Figure 60:
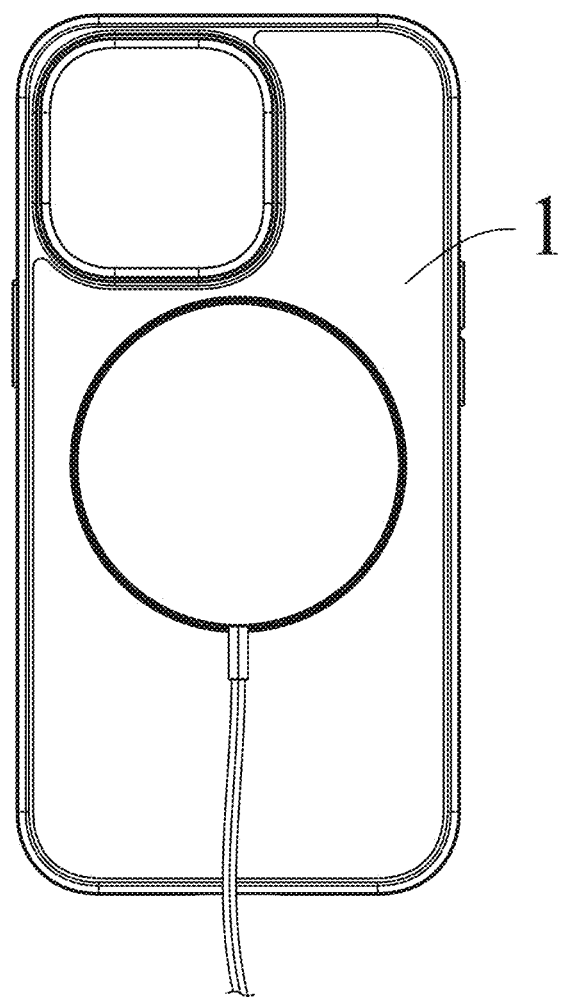
FIG. 60 is a schematic view showing a vertical state of the electronic equipment accessory illustrated in FIG. 56 connected to an external charger.
Figure 61:
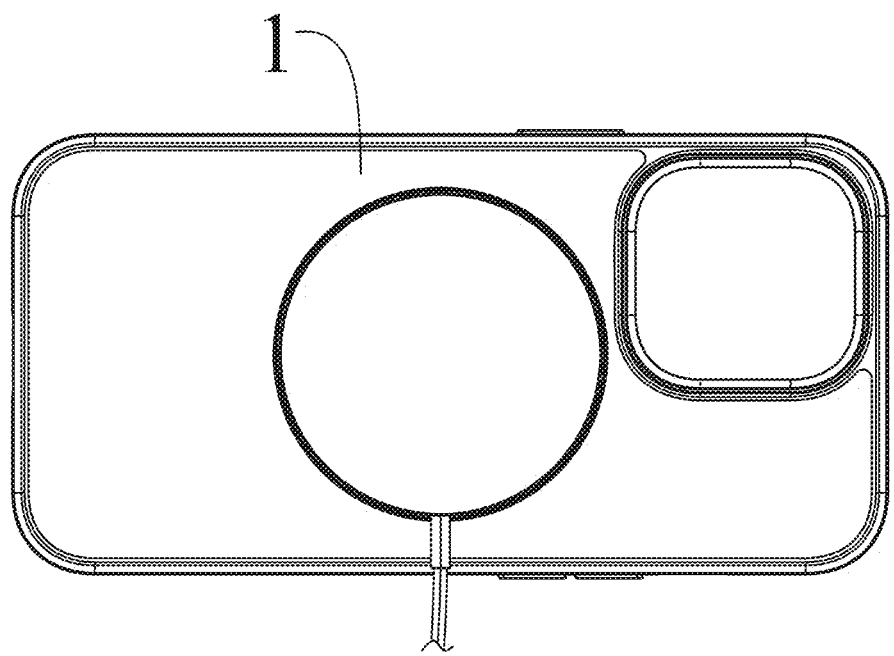
FIG. 61 is a schematic view showing a horizontal state of the electronic equipment accessory illustrated in FIG. 56 connected to an external charger.

Referring to FIGS. 56-59, an eighth embodiment of the application provides an electronic equipment accessory, of which a main difference from the previous embodiments is that the accessory body 1 is provided with a rotatable attraction-attaching assembly. In the instant embodiment, the electronic equipment accessory is still illustrated by taking an electronic equipment protection case as an example. The electronic equipment accessory comprises an accessory body 1 and an attraction-attaching assembly. The accessory body 1 includes a back plate and four side frames. The four side frames are located on a front surface of the back plate and circumferentially enclose and delimit the receiving compartment 15 for receiving a mobile phone. The back plate has a back surface that is formed with an accommodation trough 11 for accommodating the attraction-attaching assembly. The attraction-attaching assembly is arranged to be exposed on a back surface of the accessory body 1 or concealingly embedded in the back plate. The attraction-attaching assembly is arranged in the accommodation trough 11 and is rotatable about a center of the accommodation trough 11, meaning the attraction-attaching assembly is twistable and rotatable in the accommodation trough 11. The attraction-attaching assembly functions for magnetic attraction and cooperating with an external device, such as a MagSafe charger, to fix the charger on the back surface of the electronic equipment accessory to allow the charger to charge the mobile phone received in the receiving compartment 15. As such, arranging the attraction-attaching assembly in a rotatable manner in the accommodation trough 11 allows the charger to rotate with the attraction-attaching assembly. When a piece of electronic equipment, such as a mobile phone, switches between the vertical position as shown in FIG. 60 and the horizontal position as shown in FIG. 61, the attraction-attaching assembly can be rotated, fast and smoothly, relative to the accommodation trough 11 to allow the joint between the charger and a charging cable to constantly face the bottom side of the electronic equipment, preventing the charging cable from bending or unexpectedly stretching to make a plug of the charging cable detach from a wall socket, causing problems of charging instability or influencing the user's operation, so that the user's experience can be improved.

The electronic equipment accessory may further comprise a rotatable connecting member which is configured to connect the accessory body 1 with the attraction-attaching assembly. The attraction-attaching assembly comprises a main body 3, and the rotatable connecting member is arranged between the main body 3 and the accommodation trough 11 to allow the main body 3 to be constrained, in a rotatable manner, in the accommodation trough 11.

In the illustrated embodiment, the accommodation trough 11 is of an annular groove/slot, and correspondingly, the main body 3 is an annular structure. The main body 3 includes an outer joining surface and an inner joining surface respectively corresponding to an outer side wall and an inner side wall of the accommodation trough 11. The rotatable connecting member comprises a first connecting member (for example, the first connecting member 4 of the other embodiments). The first connecting member is arranged between the inner side wall of the accommodation trough 11 and the inner joining surface of the main body 3, and/or the first connecting member is arranged between the outer side wall of the accommodation trough 11 and the outer joining surface of the main body 3, making the main body 3 and the accommodation trough 11 rotatably connected.

As shown in FIGS. 56-59, in the illustrated embodiment, the first connecting member can be a C-shaped ring. Specifically, a first connecting ring 401 is arranged between the inner side wall of the accommodation trough 11 and the inner joining surface of the main body 3, and a second connecting ring 402 is arranged between the outer side wall of the accommodation trough 11 and the outer joining surface of the main body 3. The inner joining surface and the outer joining surface the main body 3 are both provided with the first retention groove 223, and the inner side wall and the outer side wall of the accommodation trough 11 are both formed with the second retention groove 113. The first retention groove 223 is formed, through recessing, into an annular groove extending in the circumferential direction of the main body 3, and the second retention groove 113 is formed, through recessing, into an annular groove extending in the circumferential direction of the accommodation trough 11. The first retention groove 223 and the second retention groove 113 are arranged in a corresponding manner, that is, the first retention groove 223 and the second retention groove 113 face to each other in radial directions and are in communication with each other. The first connecting ring 401 and the second connecting ring 402 are respectively arranged between the corresponding first retention groove 223 and the corresponding second retention groove 113, and the first connecting ring 401 and the second connecting ring 402 each have a portion located in the first retention groove 223 and a portion located in the second retention groove 113. As such, arranging the first connecting ring 401 and the second connecting ring 402 in this way constrain the main body 3 in the accommodation trough 11, preventing the main body 3 detaching from the accommodation trough 11, while not affecting the rotation of the main body 3, achieving an effect similar to a bearing. The first connecting ring 401 and the second connecting ring 402 can be set in the second retention groove 113 by means of retaining engagement, fitting, or bonding. For example, the first connecting ring 401 and the second connecting ring 402 are preferably metal structures having an arc shape. In assembly, by means of deforming outwards or inward, the first connecting ring 401 and the second connecting ring 402 are expanded or contract, and then, the first connecting ring 401 and the second connecting ring 402 can be correspondingly placed at the first retention grooves 223 or the second retention grooves 113, so that the first connecting ring 401 and the second connecting ring 402, after being restored under the action of the spring force thereof, can securely fit in the first retention grooves 223 or the second retention groove 113, making assembling easy and connection secured. Of course, in other embodiments, it is also feasible to only provide the first connecting ring 401 or to only provide the second connecting ring 402, similarly achieving the effect of having the main body 3 rotatably connected to the accommodation trough 11.

In other embodiments, the first connecting member may also be a circular ring structure, and the position and way of mounting the circular ring is similar to those of the C-shaped ring, so that repeated description is omitted here. Or alternatively, the first connecting member may further be a roller, and the roller can be a conic, cylindrical, or spherical structure. Arranging the roller in the space cooperatively formed by the first retention groove 223 and the second retention groove 113 fulfills the effect of having the main body 3 rotatably connected to the accommodation trough 11. Further, adopting the roller having an even smaller contact area to serve as the first connecting member makes the frictional force induced during the rotation of the main body 3 correspondingly reduced.

Figure 62:
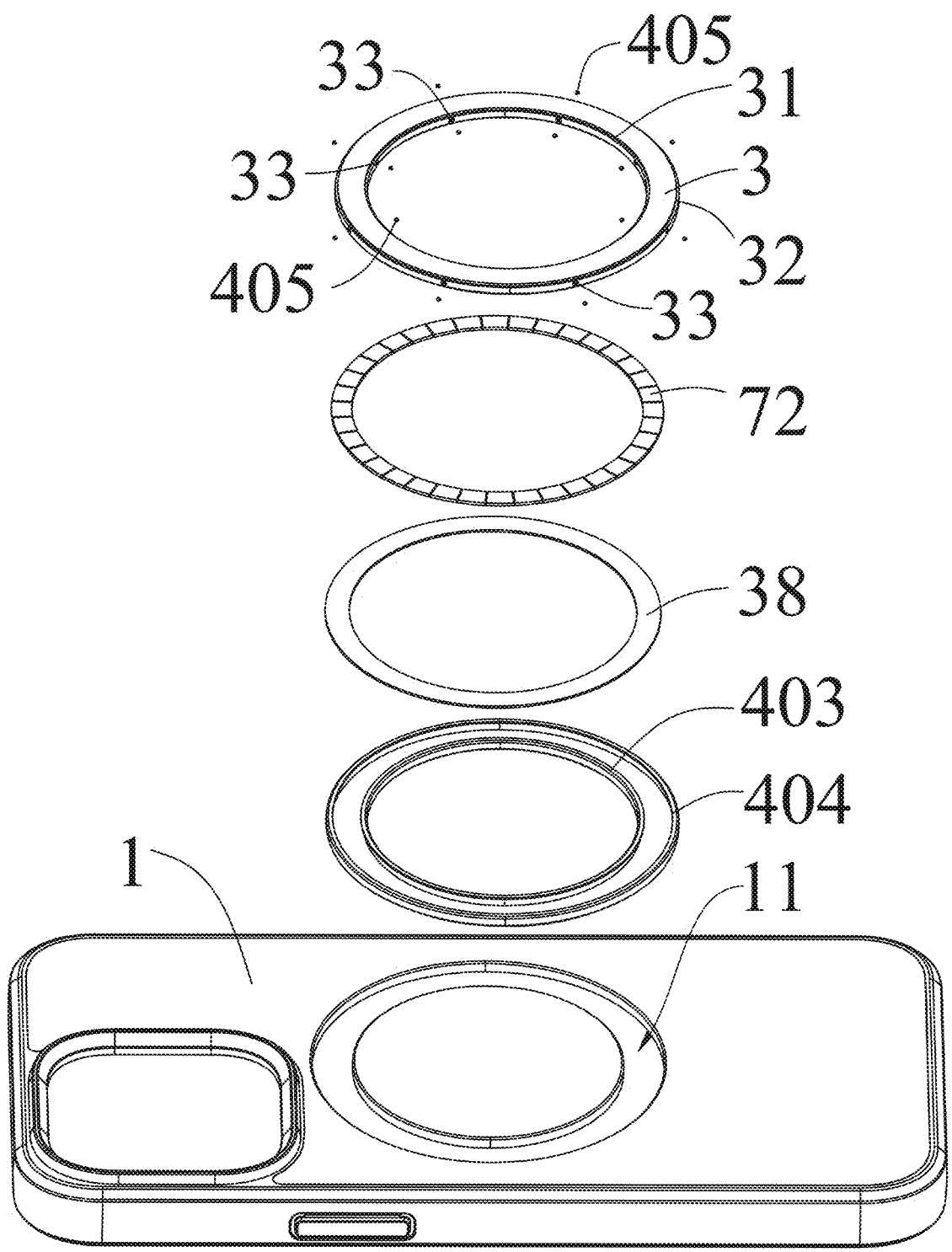
FIG. 62 is a schematic exploded view showing another embodiment of an attraction-attaching assembly of the electronic equipment accessory illustrated in FIG. 56.
Figure 63:
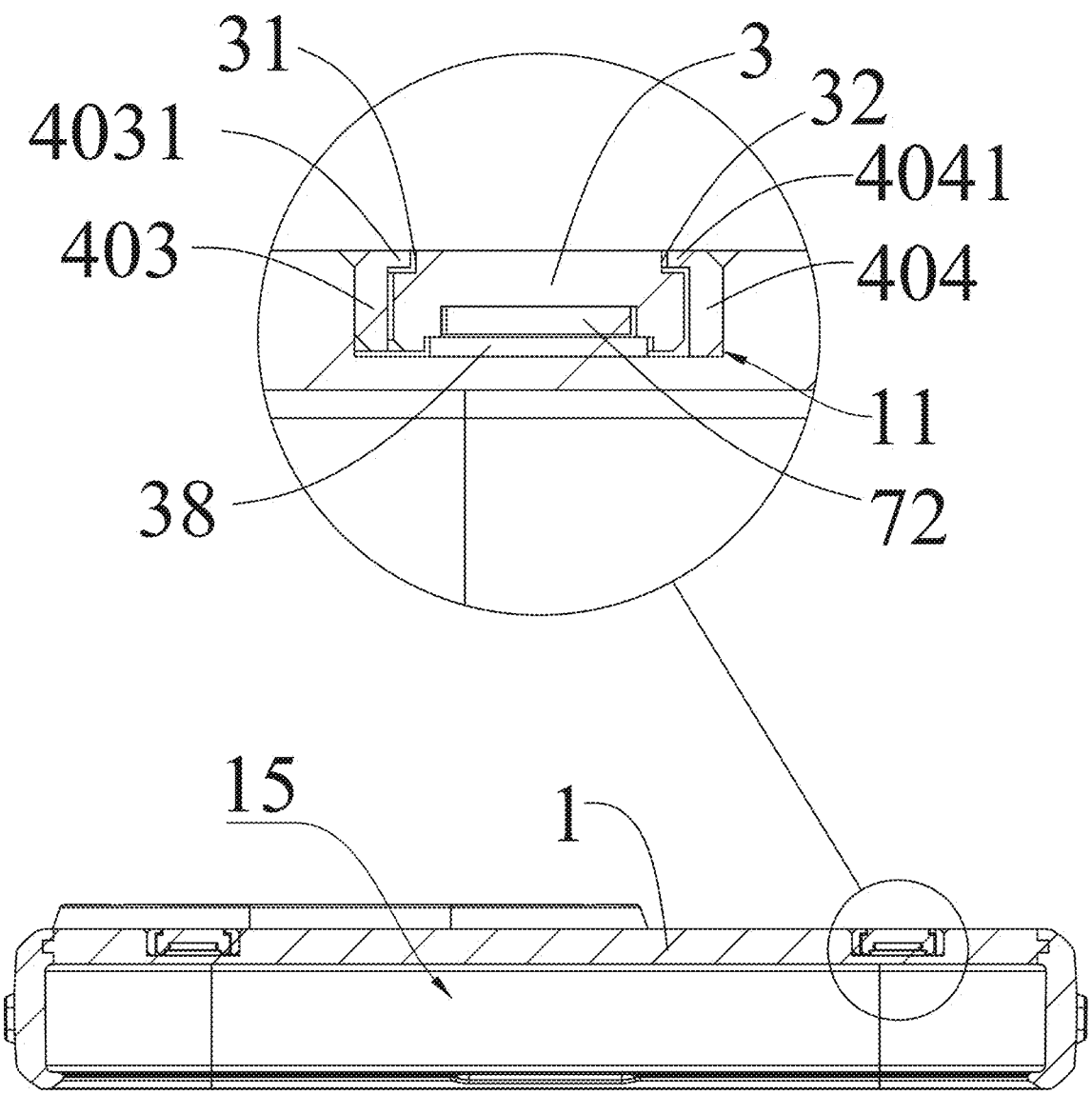
FIG. 63 is a cross-sectional view showing the electronic equipment accessory illustrated in FIG. 62.

In another embodiment, referring to FIGS. 62 and 63, the first connecting member may also be a position-limiting ring. Specifically, a first position-limiting ring 403 is arranged on the inner side wall of the accommodation trough 11, and a second position-limiting ring 404 is arranged on the outer side wall. One end of the first position-limiting ring 403 that is distant from the accessory body 1 is extended outward in the radial direction to form a first retaining engagement portion 4031, and one end of the second position-limiting ring 404 that is distant from the accessory body 1 is extended inward in the radial direction to form a second retaining engagement portion 4041. The first retaining engagement portion 4031 and the second retaining engagement portion 4041 constrain the main body 3 in the accommodation trough 11. The first position-limiting ring 403 and the second position-limiting ring 404 are fixed, by means of bonding, to a sidewall of the accommodation trough 11. Preferably, one side of the main body 3 that is distant from the accessory body 1 is provided, on an inner edge and an outer edge thereof, respectively, with a first recessed portion 31 mating with the first retaining engagement portion 4031 and a second recessed portion 32 mating with the second retaining engagement portion 4041, so that the one side of the main body 3 that is distant from the accessory body 1 is held flush with the back surface of the accessory body 1, keeping the entirety aesthetic and easing attraction-attaching with respect to the charger. Of course, in other embodiments, it is also feasible to only provide the first position-limiting ring 403 or to only provide the second position-limiting ring 404, similarly achieving the effect of having the main body 3 rotatably connected to the accommodation trough 11.

Further, as shown in FIGS. 62-63, in the illustrated embodiment, the first connecting member may further comprises first rolling balls 405. Specifically, the inner joining surface and the outer joining surface of the main body 3 are both formed with first concave-shaped troughs 33. The first rolling balls 405 are partially received in the first concave-shaped troughs 33 and arranged, in a rolling manner, between the main body 3 and the first position-limiting ring 403 and between the main body 3 and the second position-limiting ring 404. The first concave-shaped troughs 33 are plural and are arranged, at intervals, in the circumferential direction of the main body 3. The first rolling balls 405 are plural and correspond, in a one-to-one manner, to the first concave-shaped trough 33. The first rolling balls 405 convert sliding friction between the main body 3 and the first position-limiting ring 403 and between the main body 3 and the second position-limiting ring 404 into rolling friction, making the rotation of the main body 3 smooth and easy, and preventing jamming of the main body 3 during rotation. Of course, in other embodiments, it is also feasible to provide the first rolling balls 405 only on the inner joining surface of the main body 3 or only on the outer joining surface of the main body 3, similarly achieving the effect of making the rotation of the main body 3 smooth and easy.

It is appreciated that in the previous embodiments, an annular groove is taken as an illustrative example for describing the accommodation trough 11. Alternatively, in other embodiments, the accommodation trough 11 can be made as a circular trough, and correspondingly, the main body 3 is made as a circular plate structure, and under this condition, the first connecting member is arranged between the sidewall of the accommodation trough 11 and the outer joining surface of the main body 3. The first connecting member can be the second connecting ring 402 and the second position-limiting ring 404 described in the previous embodiment, or can be a circular ring, rollers, and a combined structure of the second position-limiting ring 404 and rollers, and the application does not make any limitation here.

Preferably, the rotatable connecting member may further comprise a second connecting member. The main body 3 includes a bottom joining surface corresponding to the bottom surface of the accommodation trough 11. The second connecting member is arranged between the bottom surface of the accommodation trough 11 and the bottom joining surface of the main body 3 to further improve smoothness of rotation of the main body 3.

In the embodiment illustrated in FIGS. 56-59, the second connecting member can be second rolling balls 42 (for example, the partition members 42 described in the previous embodiments). Specifically, the bottom joining surface of the main body 3 is provided with second concave-shaped troughs 34, and the second rolling balls 42 are partially received in the second concave-shaped troughs 34 and are arranged, in a rolling manner, between the main body 3 and the accessory body 1. The second concave-shaped troughs 34 are plural and arranged at intervals in the circumferential direction of the main body 3, and correspondingly, the second rolling balls 42 are plural and are arranged to correspond, in a one-to-one manner, to the second concave-shaped troughs 34. The second rolling balls 42 are configured to convert the sliding friction between the main body 3 and the accessory body 1 into rolling friction so as to make the rotation of the main body 3 smooth and easy, preventing jamming of rotation of the main body 3.

Figure 64:
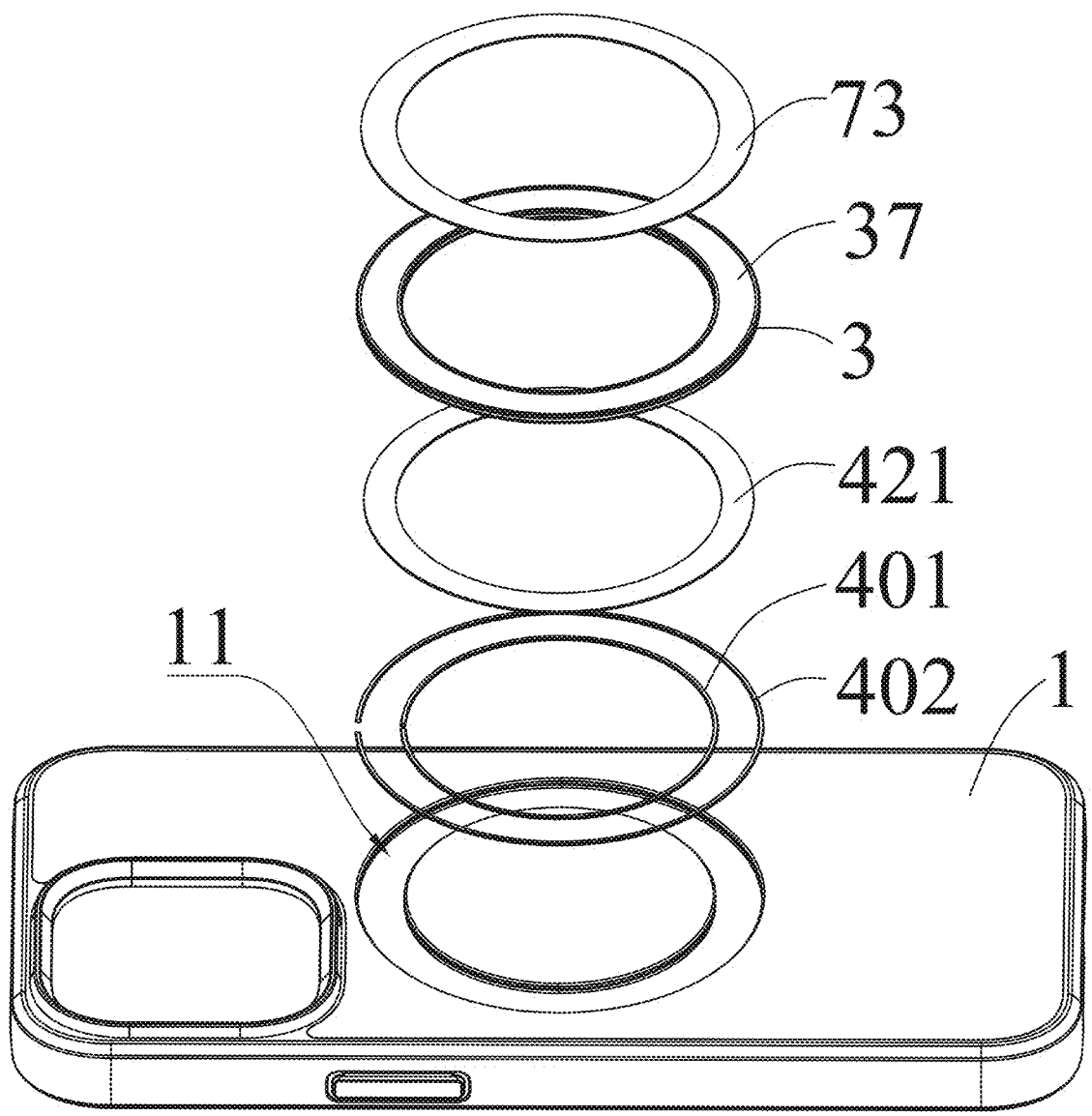
FIG. 64 is an exploded view showing a further embodiment of the attraction-attaching assembly of the electronic equipment accessory illustrated in FIG. 56.
Figure 65:
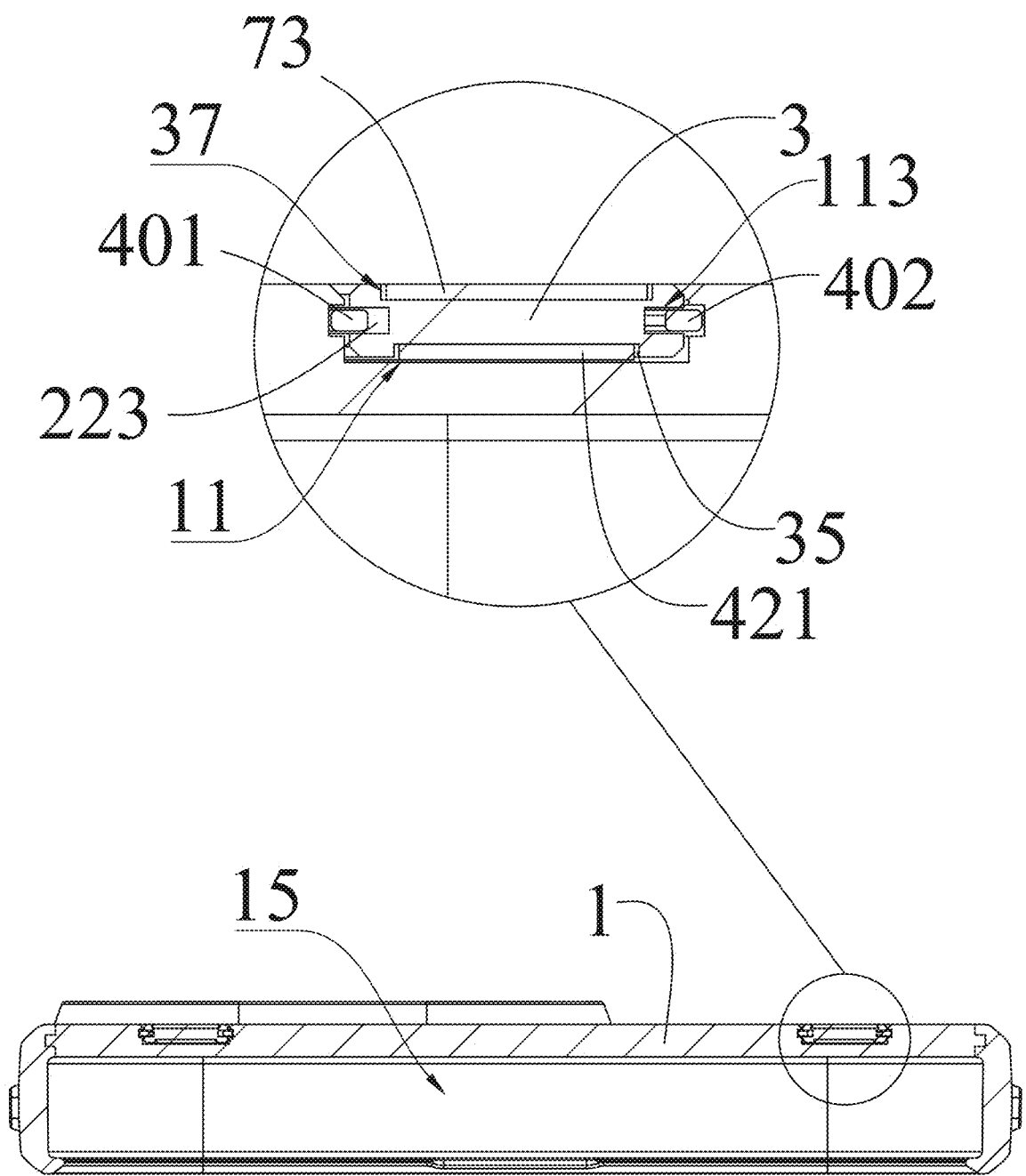
FIG. 65 is a cross-sectional view showing the electronic equipment accessory illustrated in FIG. 64.

Referring to FIGS. 64 and 65, in a further embodiment, the second connecting member is a gasket 421. Specifically, the bottom joining surface of the main body 3 is formed with a first mounting trough 35 in an annular form. The gasket 421 is of an annular form and is mounted in the first mounting trough 35 by means of fitting or adhesive bonding. The gasket 421 can be arranged to slightly protrude out of the bottom joining surface of the main body 3, so that when the main body 3 is rotating in the accommodation trough 11, sliding friction is induced between the gasket 421 and the accessory body 1 to reduce wearing of the main body 3. The gasket 421 can be of a material of wear-resistant metals, ceramics, or high-molecule plastics, which is resistant to wear and makes sliding smooth relative to the accessory body 1.

The attraction-attaching assembly may only comprise the main body 3. The main body 3 may be a metallic material that is magnetically attractable so as to allow the main body 3 to induce magnetic attraction with respect to a magnet array of a charger. Or alternatively, the attraction-attaching assembly may comprise the main body 3 and the magnetic attraction member 7, and the magnetic attraction member 7 is fixed to the main body 3. The magnetic attraction member 7 of the main body 3 induce magnetic attraction with respect to a magnet array of a charger.

As shown in FIGS. 56-59, in the illustrated embodiment, the magnetic attraction member 7 can be made as a magnet group 72. One side of the main body 3 that faces the accessory body 1 is formed with a second mounting trough 36, and the magnet group 72 is fixed in the second mounting trough 36. Specifically, the magnet group 72 is made up of a plurality of magnets (for example the magnetic body 71 of the other embodiments) arranged at intervals in a circumferential direction to induce magnetic attraction with respect to a magnet array arranged in a charger to further improve the effect of magnetic attraction, making the charger attracted more securely. Preferably, the second mounting trough 36 may be further provided, in the interior thereof, with a shielding member 38. The second mounting trough 36 can be of a stepped structure. The magnet group 72 and the shielding member 38 can be sequentially fixed, by means of adhesive bonding, in the second mounting trough 36, and the shielding member 38 is located on one side of the magnet group 72 that faces the accessory body 1. The shielding member 38 functions to shield and fix the magnet group 72 to prevent connection between the magnet group 72 and the main body 3 from loosening during a course of use to result in direct contact of the magnet group 72 with the accessory body 1 to thereby affect the rotation of the main body 3 in the accommodation trough 11. The shielding member 38 is preferably a Mylar plate, and the material has advantages with respect to size, flatness, and excellent shearing resistance.

As shown in FIGS. 64-65, in the illustrated embodiment, the magnetic attraction member 7 can also be a metal plate 73. The main body 3 can be a plastic material and the metal plate 73 is a metallic material and is magnetically attractable with respect to a magnet array of a charger. Specifically, one side of the main body 3 that is opposite to the accessory body 1 is formed with a third mounting trough 37. The metal plate 73 is of an annular form and is fixed in the third mounting trough 37 by means of fitting and adhesive bonding. Arranging the metal plate 73 on the side of the main body 3 that is opposite to the accessory body 1 facilitates to reduce the distance between the the metal plate 73 and the magnet array in the charger to increase the attracting force.

Figure 66:
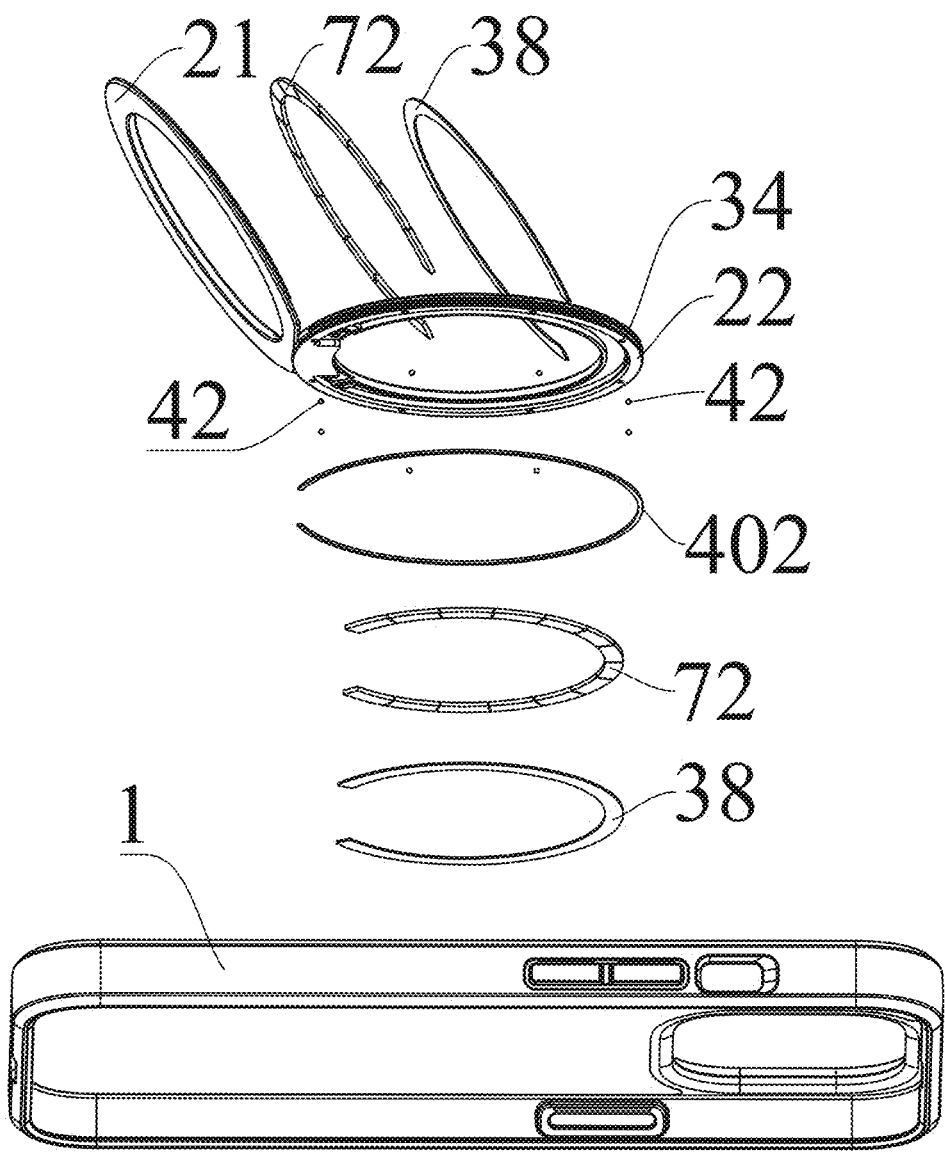
FIG. 66 illustrates yet a further embodiment of the attraction-attaching assembly of the electronic equipment accessory illustrated in FIG. 56, viewed from one aspect.
Figure 67:
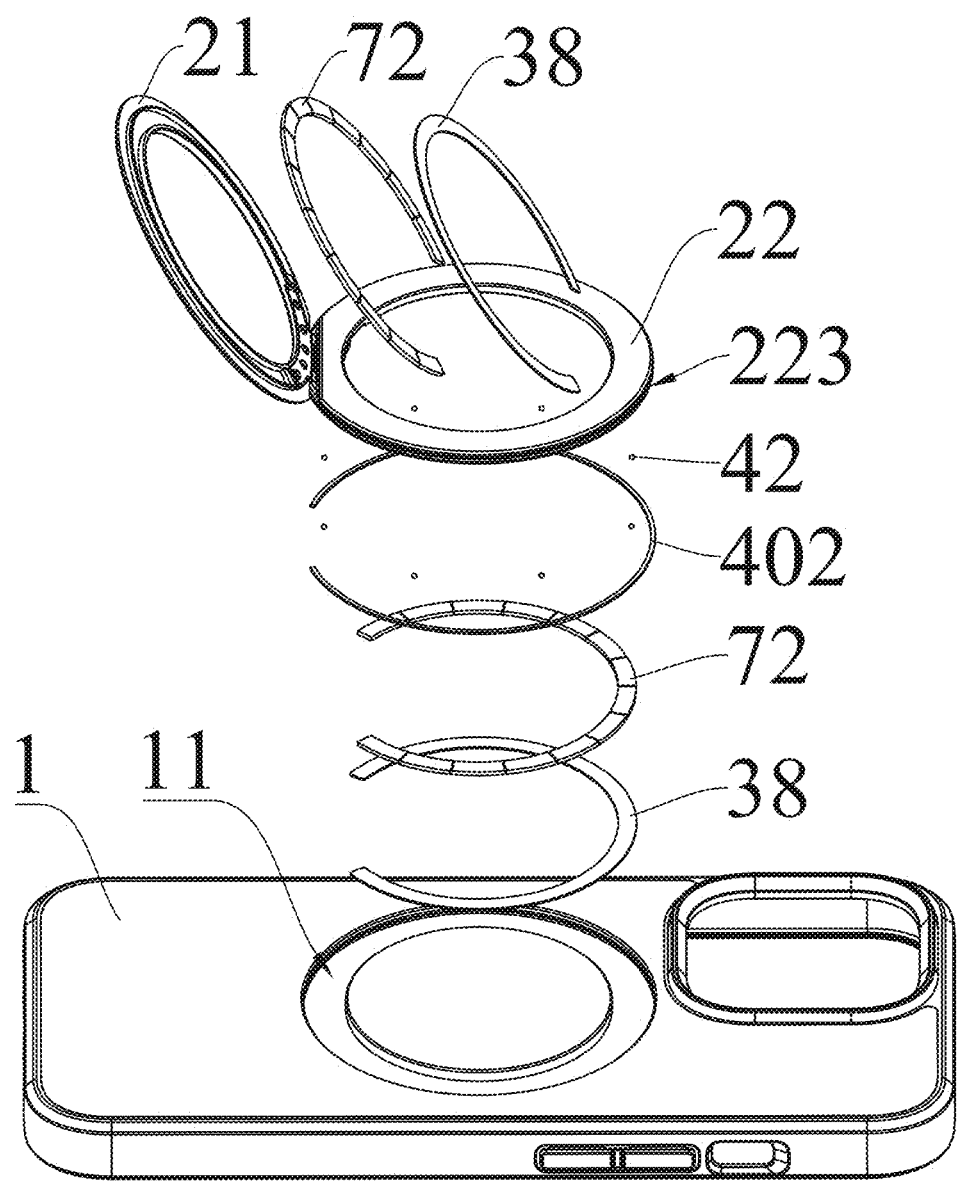
FIG. 67 is an exploded view showing the attraction-attaching assembly of the electronic equipment accessory illustrated in FIG. 66, viewed from another aspect.

Further, referring to FIGS. 66 and 67, in yet a further embodiment, the attraction-attaching assembly comprises a main body 3, the main body 3 may further comprise a base portion 22 and a support portion 21. The base portion 22 can be for example the base 22 of other embodiments, and the support portion 21 can be for example the support member 21 of other embodiments. Under this condition, the main body 3 exposes on the back surface of the accessory body 1. The base portion 22 is arranged in the accommodation trough 11, and the base portion 22 is rotatable relative to a center of the accommodation trough 11, meaning the base portion 22 is allowed to rotate in the accommodation trough 11 but does not detach from the accommodation trough 11. The support portion 21 is hinged to the base portion 22. The magnetic attraction member 7 is arranged on the base portion 22 and/or the support portion 21. In the embodiment, the support portion 21 and the base portion 22 are hinged to each other by means of a damping axle so that when the support portion 21 is rotated relative to the base portion 22 to any opening angle, the support portion 21 can be kept at the opening angle stably. When a mobile phone is placed on a supporting surface, the support portion 21 may support the mobile phone in position, making the mobile phone form a given angle with respect to the supporting surface, allowing people to watch the contents displayed on the screen of the mobile phone.

Further, the support portion 21 or the base portion 22 is provided therein with the magnetic attraction member 7 formed of the magnet group 72, so that when the support portion 21 is rotated to close on the base portion 22, the support portion 21 or the base portion 22 may magnetically attract a magnet array of a charger by the magnet group 72, so that the attraction-attaching assembly, in addition to the function of supporting, is still provided with the function of magnetic attraction. It is appreciated that the magnetic attraction member 7 formed of the magnet group 72 can be arranged in each of the support portion 21 and the base portion 22 to further increases the magnetic attraction force. The support portion 21 is preferably an annular structure, and a user's finger may pass through the interior of the support portion 21 to use the support portion 21 as a finger ring to assist the user for easy carrying of the mobile phone.

Figure 68:
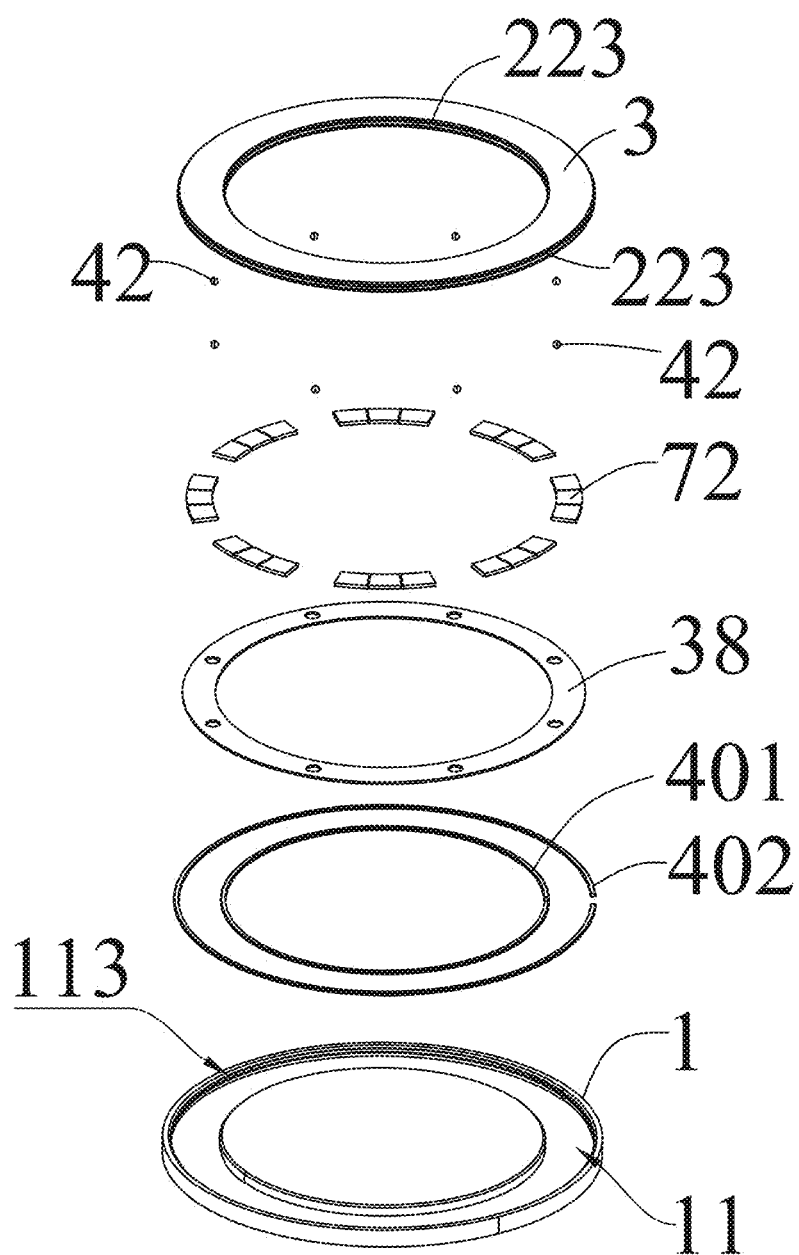
FIG. 68 illustrates another embodiment of an accessory body of the electronic equipment accessory illustrated in FIG. 56.
Figure 69:
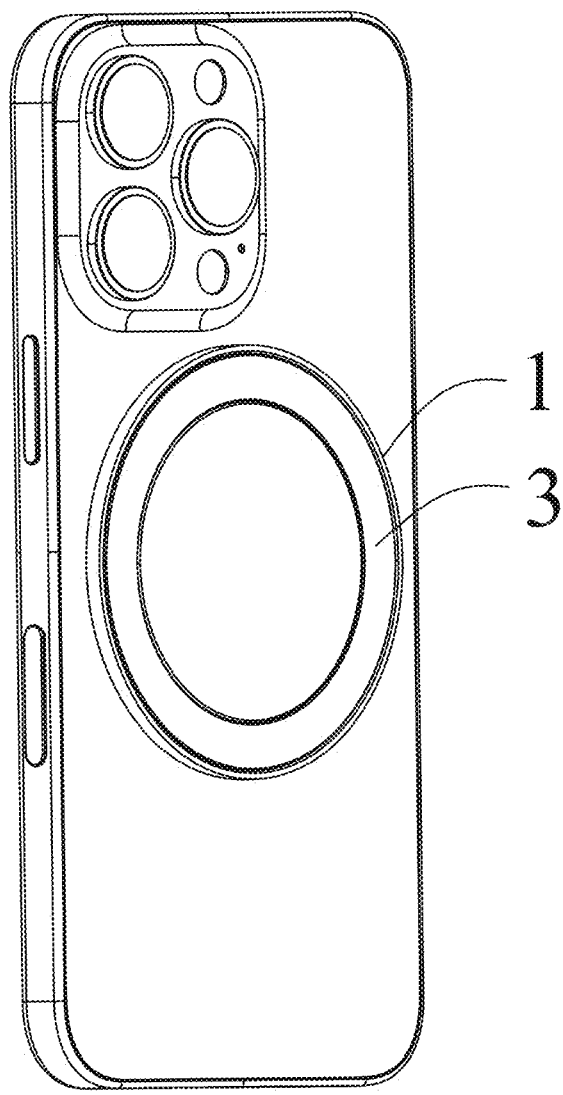
FIG. 69 illustrates the electronic equipment accessory of FIG. 68 connected with a mobile phone.
Figure 70:
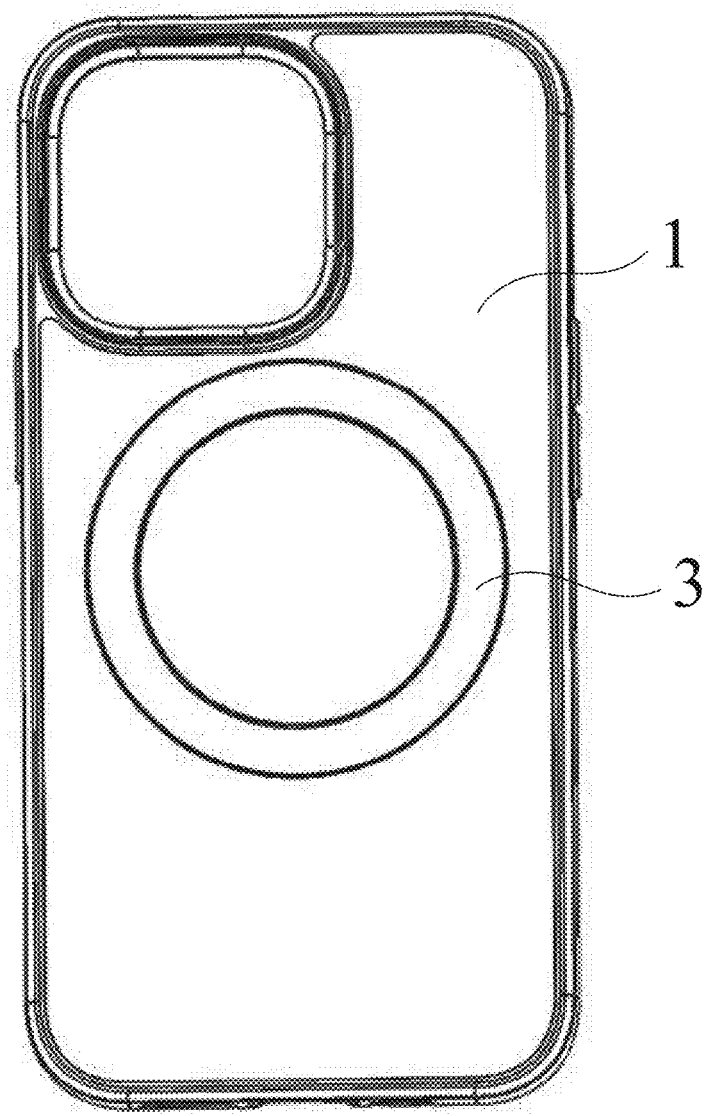
FIG. 70 illustrates an electronic equipment accessory according to a ninth embodiment of the application.
Figure 71:
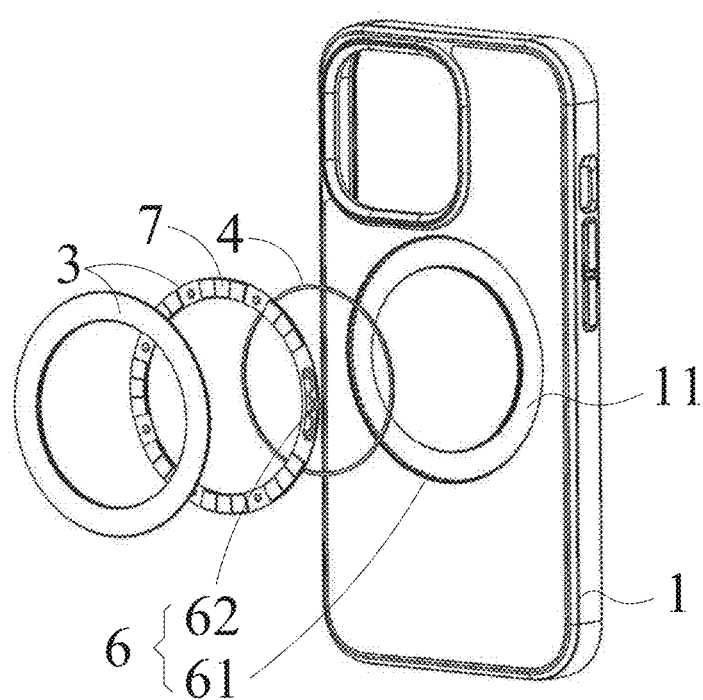
FIG. 71 is a schematic exploded view showing the electronic equipment accessory illustrated in FIG. 70.
Figure 72:
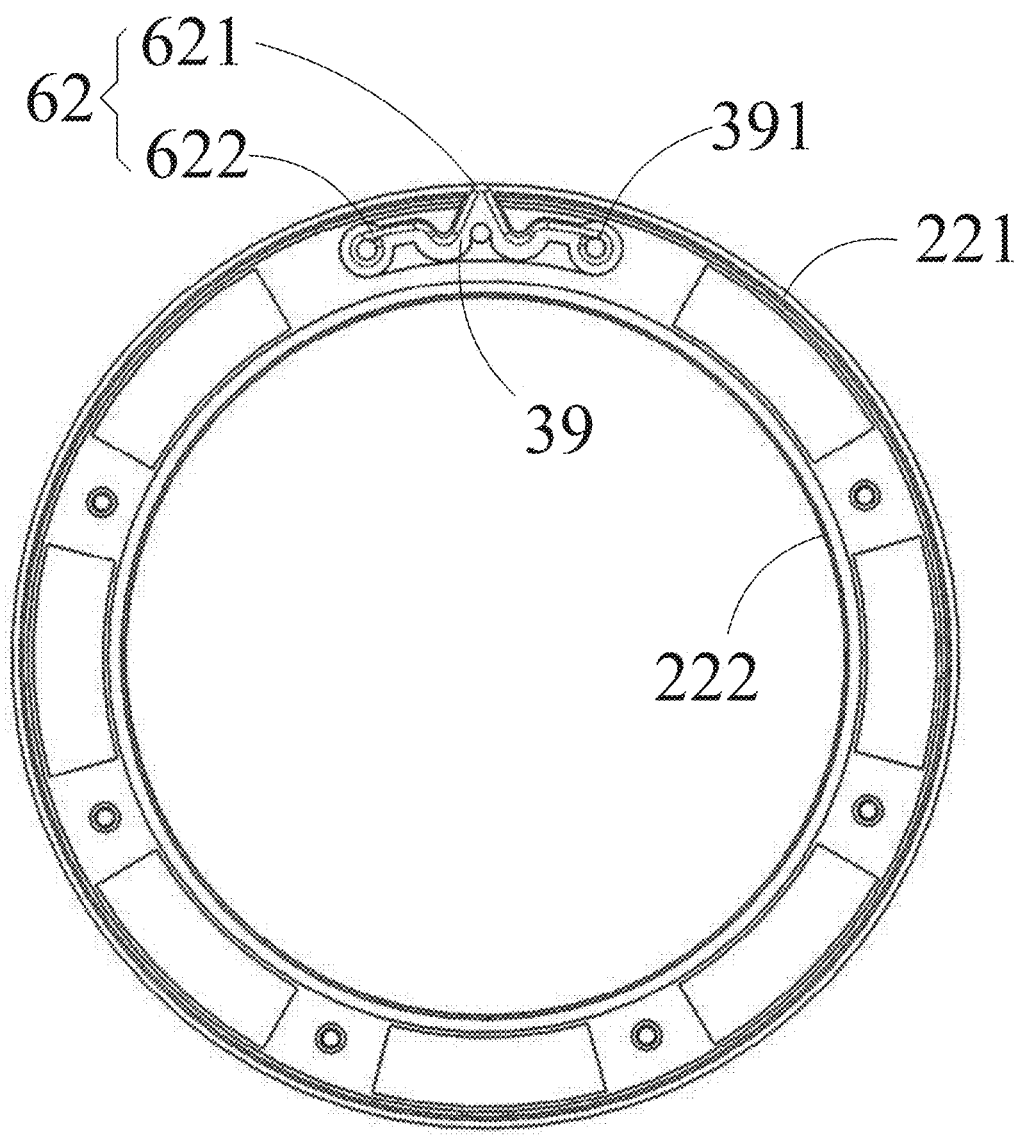
FIG. 72 illustrates a damping member and an attraction-attaching assembly of FIG. 71.
Figure 73:
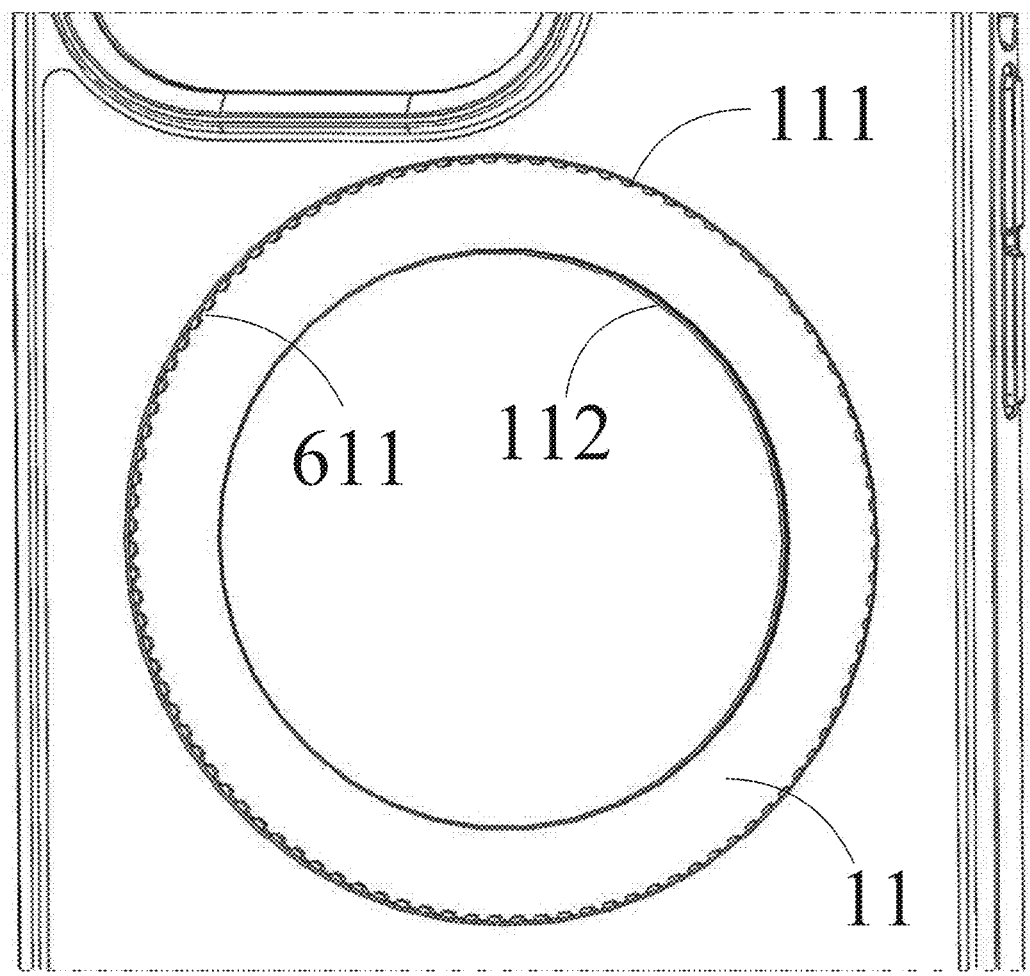
FIG. 73 illustrates an accommodation trough of FIG. 71.
Figure 74:
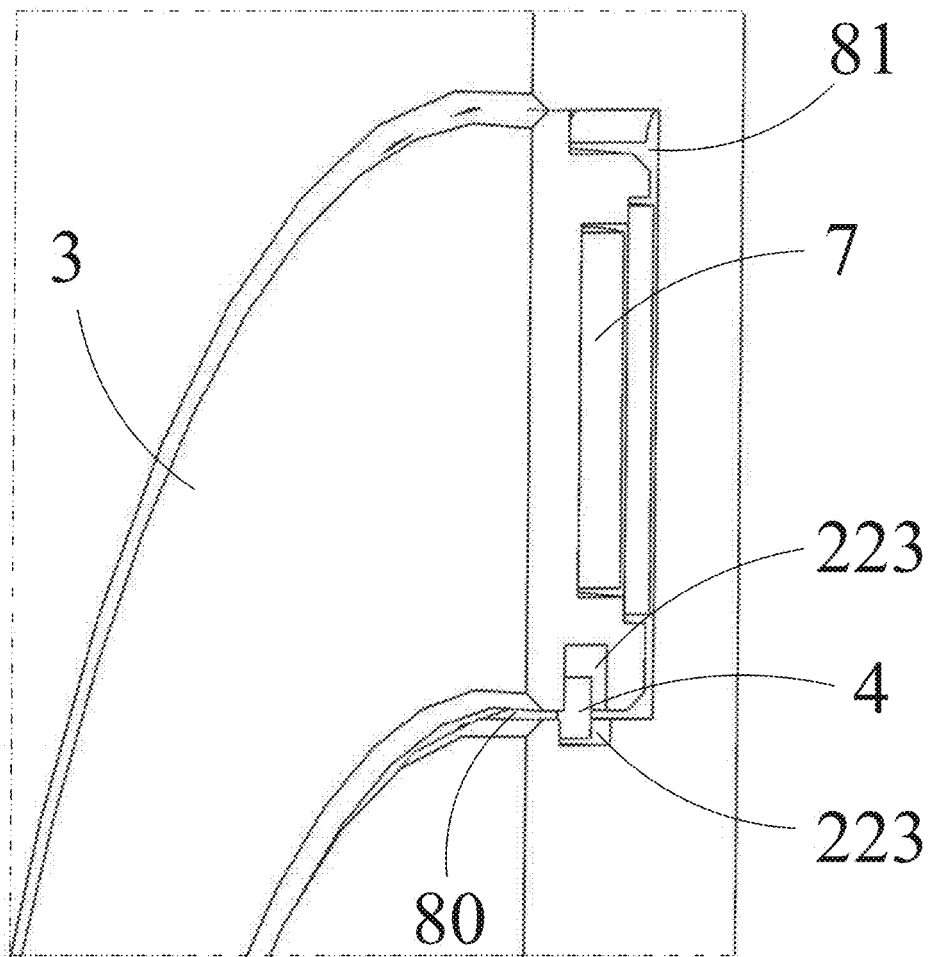
FIG. 74 is a cross-sectional view showing combined attraction-attaching assembly and the accommodation trough of the electronic equipment accessory illustrated in FIG. 70.

Referring to FIGS. 68 and 69, the instant embodiment further provides an electronic equipment accessory, which comprises an accessory body 1, an attraction-attaching assembly, and a rotatable connecting member. One side of the accessory body 1 is formed with an accommodation trough 11, and an opposite side of the accessory body 1 can be fixed to a back surface of a piece of electronic equipment or other electronic equipment accessories. The rotatable connecting member is arranged between the attraction-attaching assembly and the accommodation trough 11 to allow the attraction-attaching assembly to be rotatably received in the accommodation trough 11. The electronic equipment accessory may use, for example, the attraction-attaching assembly to magnetically attract and connect with a magnet array arranged in a mobile phone or a mobile phone protection case. The electronic equipment accessory can be independently placed, and when used, can be fixed on the back surface of the mobile phone or the mobile phone protection case. Use and stowage are easy. The attraction-attaching assembly and the rotatable connecting member of the electronic equipment accessory are similar to the attraction-attaching assembly and the rotatable connecting member of the electronic equipment accessory of the previous embodiments and repeated description is omitted here. Using the electronic equipment accessory to connect a mobile phone and an external charger, a mobile phone case and an external charger allows the external charger to rotate with the attraction-attaching assembly.

In summary, the electronic equipment accessory of the instant embodiment arranges the attraction-attaching assembly in the accommodation trough in a rotatable manner to allow the external charger to rotate with the attraction-attaching assembly relative to the accessory body. When switching is made for a mobile phone being set in a horizontal state and a vertical state, the joint between the charger and the charging cable is kept constantly facing the bottom side of the accessory body, preventing the charging cable from bending or unexpectedly stretching to make a plug of the charging cable detaching from a socket, causing problems of charging instability or the user's operation, so that the user's experience can be improved.

Ninth Embodiment

Referring to FIGS. 70-74, a ninth embodiment of the application provides an electronic equipment accessory, of which a main difference from the previous embodiments is that an accessory body 1 is provided with a rotatable attraction-attaching assembly, and a positioning structure 6 is arranged between the attraction-attaching assembly and the accessory body 1. In the instant embodiment, the electronic equipment accessory is still illustrated by taking an electronic equipment protection case as an example. The electronic equipment accessory comprises an accessory body 1 and an attraction-attaching assembly rotatably connected to the accessory body 1. A positioning structure 6 is arranged between the attraction-attaching assembly and the accessory body 1, and the attraction-attaching assembly and the accessory body 1 are connected by means of a first connecting member 4 therebetween.

The accessory body 1 is formed with an accommodation trough 11 in an annular form. The attraction-attaching assembly comprises a main body 3 having a shape matching the accommodation trough 11 and rotatably received in the accommodation trough 11. The accommodation trough 11 includes an inner side wall 112 and an outer side wall 111 extending in a thickness direction of the accessory body 1. The main body 3 includes an inner joining surface 222 and an outer joining surface 221 extending in the thickness direction of the accessory body 1. The inner side wall 112 and the inner joining surface 222 are arranged adjacent to each other to form an internal annular gap 80 therebetween. The outer side wall 111 and the outer joining surface 221 are arranged adjacent to each other to form an external annular gap 81 therebetween. One of the first connecting member 4 and the positioning structure 6 is located in the internal annular gap 80, and the other one of two is located in the external annular gap 81. Arranging the first connecting member 4 and the positioning structure 6 respectively in the two gaps formed between the main body 3 and the accommodation trough 11 reduces the size of the accessory body 1 in the thickness direction to thereby prevent spacing between a wireless charging device and a mobile phone from getting excessively large to affect the performance of wireless charging.

Further, the positioning structure 6 comprises a damping portion 61 and a damping member 62. The damping portion 61 comprises a plurality of uniformly distributed retaining nicks 611. The damping member 62 is formed with a retaining and connecting portion 621 that protrudes toward the damping portion 61 to be engageable with any one of the retaining nicks 611. The damping portion 61 can be for example the position-limiting part 61 of the other embodiments, and the retaining nicks 611 can be for example the position-limiting notches 611 of the other embodiments. The damping member 62 can be for example the positioning part 62 of the other embodiments, and the retaining and connecting portion 621 can be for example the positioning portion 621 of the other embodiments.

In one embodiment, the positioning structure 6 is arranged in the internal annular gap 80 (this solution being not shown in the drawings), and the plurality of retaining nicks 611 are uniformly arranged on the inner side wall 112 of the accommodation trough 11 in the circumferential direction. The main body 3 is formed with a damping member mounting trough 39 in communication with the internal annular gap 80. The damping member 62 is fixed in the damping member mounting trough 39 and the retaining and connecting portion 621 projects beyond the inner joining surface 222 to be contactable with any one of the retaining nicks 611. Rotating the main body 3 causes the damping member 62 to move from one of the retaining nicks 611 to another one of the retaining nicks 611, thereby generating a feeling of damping, and the angle of rotation for each time is fixed and precise. Alternatively, the plurality of retaining nicks 611 are uniformly arranged on the inner joining surface 222 of the main body 3 in the circumferential direction. The accommodation trough 11 is formed with the damping member mounting trough 39 in communication with the internal annular gap 80. The damping member 62 is fixed in the damping member mounting trough 39 and the retaining and connecting portion 621 projects beyond the inner side wall 112 to be contactable with any one of the retaining nicks 611. Rotating the main body 3 causes the damping member 62 to move from one of the retaining nicks 611 to another one of the retaining nicks 611, thereby generating a feeling of damping, and the angle of rotation for each time is fixed and precise.

Specifically, in case that the positioning structure 6 is arranged in the internal annular gap 80, the first connecting member 4 is arranged in the external annular gap 81 (this solution being not shown in the drawings). The outer side wall 111 of the accommodation trough 11 and the outer joining surface 221 of the main body 3 are respectively formed with connection grooves in the circumferential direction to be in communication with the external annular gap 81 for receiving the first connecting member 4 therein. The connection grooves include a second retention groove 113 formed in the outer side wall 111 of the accommodation trough 11 and a first retention groove 223 formed in the outer joining surface 221 of the main body 3. With the first connecting member 4 being simultaneously received in the second retention groove 113 of the outer side wall 111 and the first retention groove 223 of the outer joining surface 221, the main body 3 is allowed to rotate in the accommodation trough 11 but cannot detach from the accommodation trough 11.

In another embodiment, the positioning structure 6 is arranged in the external annular gap 81. The plurality of retaining nicks 611 are uniformly arranged on the outer side wall 111 of the accommodation trough 11 in the circumferential direction. The main body 3 is formed with the damping member mounting trough 39 in communication with the external annular gap 81. The damping member 62 is fixed in the damping member mounting trough 39 and the retaining and connecting portion 621 projects beyond the outer joining surface 221 to be contactable with any one of the retaining nicks 611. Rotating the main body 3 causes the damping member 62 to move from one of the retaining nicks 611 to another one of the retaining nicks 611, thereby generating a feeling of damping, and the angle of rotation for each time is fixed and precise. Alternatively, the plurality of retaining nicks 611 are uniformly arranged on the outer joining surface 221 of the main body 3 in the circumferential direction. The accommodation trough 11 is formed with the damping member mounting trough 39 in communication with the external annular gap 81. The damping member 62 is fixed in the damping member mounting trough 39 and the retaining and connecting portion 621 projects beyond the outer side wall 111 to be contactable with any one of the retaining nicks 611. Rotating the main body 3 causes the damping member 62 to move from one of the retaining nicks 611 to another one of the retaining nicks 611, thereby generating a feeling of damping, and the angle of rotation for each time is fixed and precise Specifically, in case that the positioning structure 6 is arranged in the external annular gap 81, the first connecting member 4 is arranged in the internal annular gap 80. The inner side wall 112 of the accommodation trough 11 and the inner joining surface 222 of the main body 3 are respectively formed with connection grooves in the circumferential direction to be in communication with the internal annular gap 80 for simultaneously receiving the first connecting member 4 therein. The connection grooves include a second retention groove 113 formed in the inner side wall 112 of the accommodation trough 11 and a first retention groove 223 formed in the inner joining surface 222 of the main body 3. With the first connecting member 4 being simultaneously received in the second retention groove 113 of the inner side wall 112 and the first retention groove 223 of the inner joining surface 222, the main body 3 is allowed to rotate in the accommodation trough 11 but cannot detach from the accommodation trough 111.

Further, in any one of the above-described embodiments, the damping member mounting trough 39 has two ends that are each provided with a positioning pillar 391. The damping member 62 is an elastic member, such as an elastic metallic filament. Two ends of the elastic member are each formed with a mounting portion 622 (for example, the elastic portion 622 of the other embodiments) connected with the positioning pillar 391. A middle portion of the elastic member is bent to form the retaining and connecting portion 621. Further, in any one of the above-described embodiments, the first connecting member 4 is a circular ring or a C-shaped ring, or rollers received in the connection notches.

Figure 75:
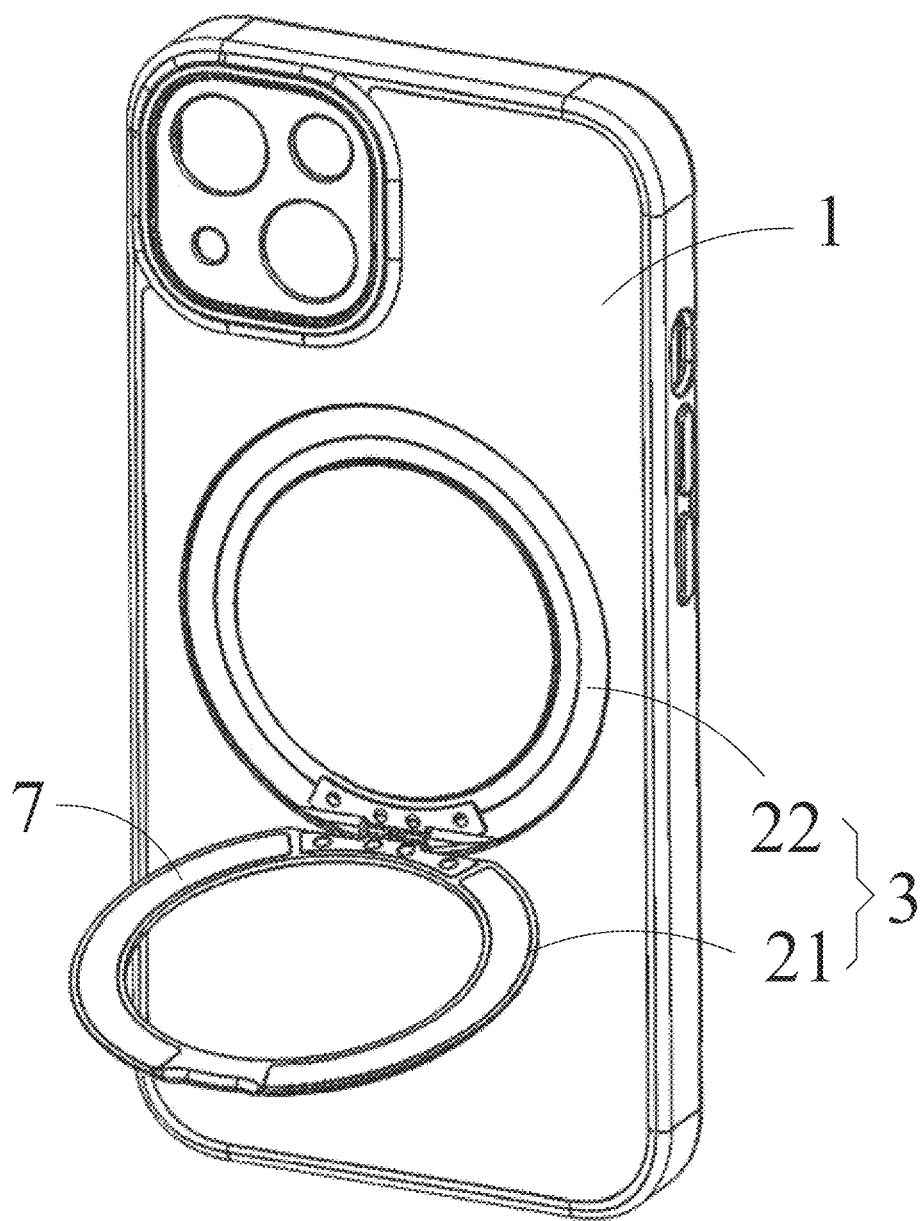
FIG. 75 illustrates another embodiment of a main body illustrated in FIG. 71.

Based on the above embodiments, as shown in FIG. 75, the attraction-attaching assembly comprises a main body 3, the main body 3 further comprises a base 22 and a support member 21 hinged to the base 22. The support member 21 is turnable in a direction toward an outer side of the accessory body 1. A magnetic attraction member 7, such as a magnet array, is provided on the base 22 or the support member 21.

Working method and principle is described as below: by arranging the first connecting member 4 and the positioning structure 6 between the accessory body 1 and the attraction-attaching assembly, when a mobile phone needs to cooperate with a wireless charging device for charging, if there is a switch for a holding posture or a set-up angle of the mobile phone, such as switching from a vertical screen to a horizontal screen, the main body 3 of the attraction-attaching assembly is rotated relative to the accommodation trough 11 of the accessory body 1. After each time of rotation, the main body 3 can be retained in position relative to the accommodation trough 11 by means of the positioning structure 6, without causing undesired arbitrary rotation, fulfilling fast adjustment of the rotation angle and positioning of the main body 3. Thus, during a course that the mobile phone is subject to charging with the wireless charging device, re-adjusting an attraction angle of the wireless charging device after each time the use posture of the mobile phone is varied can be avoided. In case of not applied for charging, the support member 21 can be expanded to collaborate with the main body 3 to serve as a mobile phone holder/support for realizing supporting to the mobile phone at various angles.

All technical features of the above embodiments can be combined in an arbitrary manner. To make the description simple, possible combinations of each technical feature of the above embodiments are not all described. However, provided no contradiction exists, such combinations of the technical features should all regarded as the scope of the disclosure.

The above-described embodiments only illustrate some of the embodiments of the application, of which the description is made specific and detailed, but should not be construed as limiting to the scope of protection of the application. It is noted that for those having ordinary skill in the art, various modifications and improvement can be made without departing from the idea of the application, and those all belong to the scope of protection of the application. Thus, the scope of protection of the application is determined only by the appended claims.

What is claimed is:

1. An electronic equipment accessory, comprising an accessory body and a holder assembly connected to the accessory body, the holder assembly comprising a support member and a base, the base being rotatably connected to the accessory body, the support member being rotatable relative to the base between an extended position and a folded position;
    wherein the electronic equipment accessory further comprises a connecting member configured to pivotably connect the support member and the base;
    the connecting member comprises a sheet-shaped first mounting portion connected to the support member, a sheet-shaped second mounting portion connected to a side of the base opposite to or facing the support member, and an axle pivotably connect the sheet-shaped first mounting portion and the sheet-shaped second mounting portion;
    one of the sheet-shaped first mounting portion and the support member comprises holes and another of the sheet-shaped first mounting portion and the support member comprises protrusions engaged in the holes respectively;
    the second mounting portion of the connecting member comprises an axle mounting portion protruding therefrom, and the axle mounting portion defines a hole for receiving the axle; and
    wherein the base comprises a pair of blocking portions facing opposite ends of the axle respectively for limiting movement of the axle in an axis direction of the axle, and the axle mounting portion is located between the blocking portions.

2. The electronic equipment accessory in accordance with claim 1, wherein the base is rotatable about a first rotation axis relative to the accessory body, the support member is rotatable about a second rotation axis relative to the base, and the first and second rotation axis are perpendicular to each other.

3. The electronic equipment accessory in accordance with claim 1, wherein the accessory body is formed with an accommodation trough;
the base is received in the accommodation trough and rotatable relative to the accessory body; and
the support member is stacked on the base at the folded position, and the support member forms a preset angle with respect to the base at the extended position.

4. The electronic equipment accessory in accordance with claim 3, wherein the electronic equipment accessory further comprises another connecting member configured to retain the base in the accommodation trough.

5. The electronic equipment accessory in accordance with claim 4, wherein the accommodation trough and the base are both of an annular form, the accommodation trough comprising an outer side wall and an inner side wall opposite to each other, the base comprising an outer joining surface and an inner joining surface that are respectively arranged adjacent to the outer side wall and the inner side wall; and
the another connecting member is partly received in a recess defined in one of the outer side wall, the outer joining surface, the inner side wall and the inner joining surface.

6. The electronic equipment accessory in accordance with claim 4, wherein the base is formed with a first retention groove with a groove opening and the accommodation trough is formed with a second retention groove with a groove opening, the groove openings of the first retention groove and the second retention groove being arranged to face each other, the another connecting member being arranged in both of the first retention groove and the second retention groove;
the another connecting member is a C-shaped ring; and
the base defines two detachment openings which are in one-to-one correspondence to opposite ends of the C-shaped ring.

7. The electronic equipment accessory in accordance with claim 6, wherein each of the detachment openings is aligned with a corresponding end of the C-shaped ring in a radial direction or an axial direction of the C-shaped ring.

8. The electronic equipment accessory in accordance with claim 1, wherein the base comprises a recessed portion for accommodating the support member when the support member is located at the folded position.

9. The electronic equipment accessory in accordance with claim 8, wherein the base further comprises a mounting trough for receiving the second mounting portion of the connecting member, and the recessed portion and the mounting trough are formed at opposite sides of the base.

10. The electronic equipment accessory in accordance with claim 1, wherein the support member has a ring shape with an outer circumferential surface, and a flatted portion is formed at a position of the outer circumferential surface corresponding to the connecting member, the sheet-shaped first mounting portion of the connecting member extending beyond the flatted portion to be connected with the axle.

11. The electronic equipment accessory in accordance with claim 1, wherein the axle comprises an outer circumferential surface formed with at least one first flatted section, one of the first mounting portion and the second mounting portion of the connecting member comprises a sleeve sleeved on the axle such that said one of the first mounting portion and the second mounting portion of the connecting member together with the sleeve and the axle is rotatable relative to another one of the first mounting portion and the second mounting portion of the connecting member.

12. The electronic equipment accessory in accordance with claim 1, wherein the support member is ring-shaped and comprises an inner periphery, the first mounting portion comprises an arcuate inner edge, and the arcuate inner edge of the first mounting portion bas the same curvature as the inner periphery of the support member.

13. The electronic equipment accessory in accordance with claim 1, wherein a magnetic attraction member is arranged on the support member, wherein the support member is of a circular shape or an annular form; and
the magnetic attraction member is of an arc shape; and the magnetic attraction member comprises a plurality of magnetic segments which are arranged on the support member in a circumferential direction.

14. An electronic equipment accessory, comprising an accessory body and an attraction-attaching assembly rotatably connected to the accessory body, the attraction-attaching assembly comprising a magnetic attraction member;
wherein the accessory body defines an accommodation trough, the attraction-attaching assembly is at least partly received in the accommodation trough, and the attraction-attaching assembly is rotatable relative to the accessory body:
wherein the attraction-attaching assembly comprises a support member and a base, the base is rotatably received in the accommodation trough, the support member is rotatably connected to the base, the magnetic attraction member is disposed at one of the base and the support member, and a protruding part is provided at a location of the base connected with the support member;
wherein when the support member is stacked on the base, the support member covers the protruding part; and
wherein the base and the support member are connected via a mounting portion, the protruding part and the mounting portion are respectively stacked on opposite sides of the base in a thickness direction of the base, the protruding part is located at a side of the base facing the support member, and the mounting portion is received in a mounting trough defined at an opposite side of the base away from the support member.

15. The electronic equipment accessory in accordance with claim 14, wherein the base comprises a recessed portion for accommodating the support member when the support member is located at the folded position, and the protruding part is arranged in the recessed portion.

* * * * *